United States Patent
Tanaka et al.

(10) Patent No.: US 7,500,229 B2
(45) Date of Patent: Mar. 3, 2009

(54) PROGRAM CONVERTING METHOD AND STORAGE MEDIUM

(75) Inventors: Hirohisa Tanaka, Osaka (JP); Kensuke Odani, Kyoto (JP); Akira Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 598 days.

(21) Appl. No.: 10/875,303

(22) Filed: Jun. 25, 2004

(65) Prior Publication Data
US 2004/0268323 A1     Dec. 30, 2004

(30) Foreign Application Priority Data
Jun. 26, 2003   (JP)   ............... 2003-182556

(51) Int. Cl.
*G06F 9/45*   (2006.01)
(52) U.S. Cl. ................. 717/136; 717/101
(58) Field of Classification Search ........... 717/136, 717/137, 140, 141, 142, 151, 152, 153, 154
See application file for complete search history.

(56) References Cited

U.S. PATENT DOCUMENTS

| | | | | |
|---|---|---|---|---|
| 5,418,964 | A * | 5/1995 | Conner et al. | 719/316 |
| 5,535,391 | A * | 7/1996 | Hejlsberg et al. | 717/140 |
| 5,983,020 | A * | 11/1999 | Sweeney et al. | 717/141 |
| 6,182,283 | B1 * | 1/2001 | Thomson | 717/153 |
| 6,230,314 | B1 * | 5/2001 | Sweeney et al. | 717/108 |
| 6,247,175 | B1 * | 6/2001 | Ledford et al. | 717/157 |
| 6,292,937 | B1 * | 9/2001 | Sakata et al. | 717/116 |
| 6,654,951 | B1 * | 11/2003 | Bacon et al. | 717/154 |
| 6,851,106 | B1 * | 2/2005 | Narisawa et al. | 717/108 |
| 6,970,893 | B2 * | 11/2005 | Dahlstedt | 707/206 |
| 6,983,458 | B1 * | 1/2006 | Honda | 717/151 |
| 7,194,494 | B1 * | 3/2007 | Dahlstedt | 707/206 |

FOREIGN PATENT DOCUMENTS

JP   09-269898   10/1997
JP   P2001-14171   1/2001

OTHER PUBLICATIONS

Tip, F., Laffra, C., & Sweeney, P. (1999). Practical Experience with an Application Extractor for Java. ACM SIGPLAN Notices. 34, 292-305.*

* cited by examiner

*Primary Examiner*—Wei Y Zhen
*Assistant Examiner*—Matthew J Brophy
(74) *Attorney, Agent, or Firm*—McDermott Will & Emery LLP

(57) ABSTRACT

According to program converting step S100 of the present invention, classes whose objects are created out of the classes included in a program are detected and the result is recorded in an analysis information storing section 12 at an object analyzing step S104, functions (unnecessary functions) regarding classes whose objects are not created are analyzed in accordance with information held in the analysis information storing section 12 and the result is recorded in the analysis information storing section 12 at an unnecessary function analyzing step S105, and definitions of the unnecessary functions are deleted in accordance with information held in the analysis information storing section 12 at an unnecessary function deleting step S106.

22 Claims, 46 Drawing Sheets

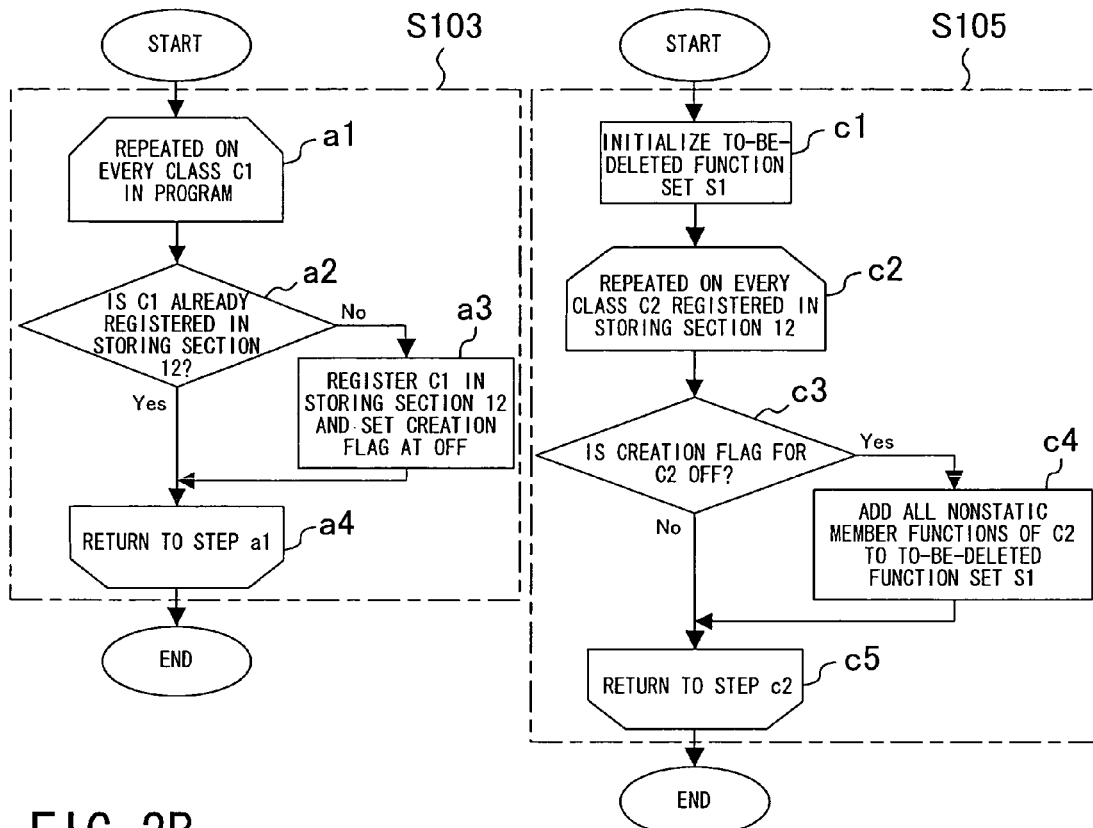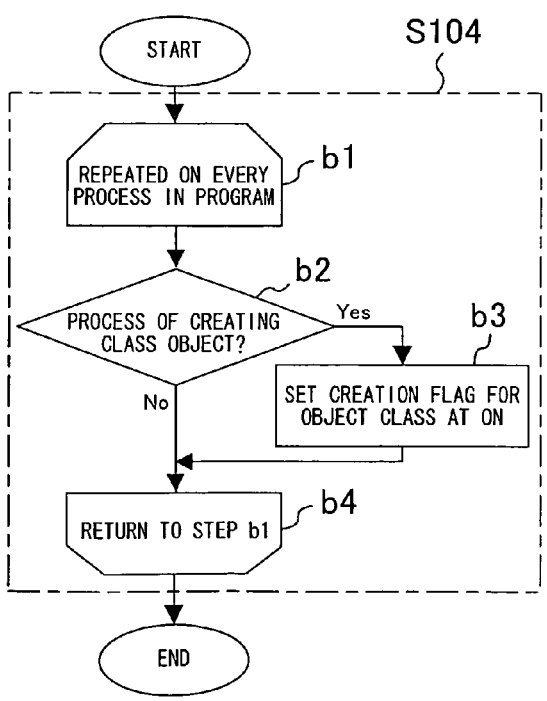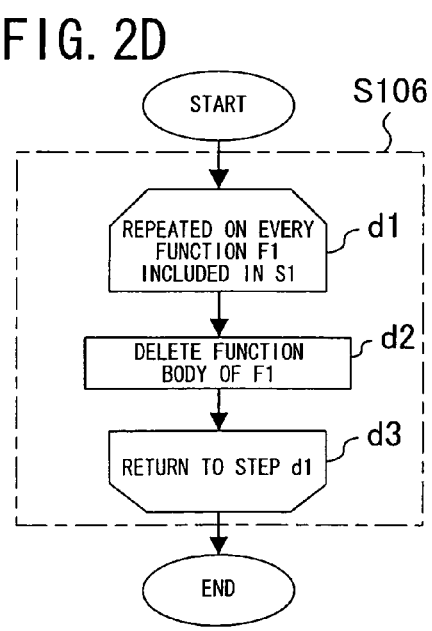

FIG. 3 file1 : a.h
```
class A {
    int a;
public:
    A();
    int f(void);
    int g(int);
};
``` file3 : b.h
```
class B {
    int b;
public:
    B();
    int h(void);
};
``` file5 : main.cc
```
#include "a.h"
#include "b.h"

int main(void) {
    B obj_b;
    return obj_b.h();
}
``` file2 : a.cc
```
#include "a.h"
A::A() { a = 1; }
int A::f(void) { return a*a; }
int A::g(int i) { return a+i; }
```
← FUNCTION(A)

file4 : b.cc
```
#include "b.h"
B::B() { b = 2; }
int B::h(void) { return b+1; }
```

FIG. 4A

CLASS INFORMATION

| CLASS | A | B |
|---|---|---|
| FLAG | OFF | OFF |

FIG. 4B

CLASS INFORMATION

| CLASS | A | B |
|---|---|---|
| FLAG | OFF | ON |

FIG. 4C

TO-BE-DELETED FUNCTION SET S1    A::A(), A::f(void), A::g(int)

CLASS INFORMATION

| CLASS | A | B | C | D | E |
|---|---|---|---|---|---|
| FLAG | OFF | OFF | OFF | OFF | OFF |

CLASS TREE Tr

CLASS INFORMATION

| CLASS | A | B | C | D | E |
|---|---|---|---|---|---|
| FLAG | ON | ON | OFF | OFF | OFF |

S2 | B, D, E    S1 | φ

S2 | D, E    S1 | φ

S2 | E    S1 | D::D(), D::j1(void)

S2 | C    S1 | D::D(), D::j1(void), E::E(), E::k1(void)

S2 | φ    S1 | D::D(), D::j1(void), E::E(), E::k1(void), C::C(), C::h1(void)

FIG. 15 file1 : f.h

```
class F {
    int f;
public:
    F();
    virtual int m1(void);
};
``` file3 : g.h

```
class G : public F {
    int g;
public:
    G();
    virtual int m1(void);
};
``` file5 : h.h

```
class H : public F {
    int h;
public:
    H();
    virtual int m1(void);
};
``` file2 : f.cc

```
#include "f.h"

F::F() {
    f = 6;
}
int F::m1(void) {
    return f*f;
}
```
↑
FUNCTION(c)

file4 : g.cc

```
#include "f.h"
#include "g.h"
G::G() {
    g = 7;
}
int G::m1(void) {
    return g+10;
}
``` file6 : h.cc

```
#include "f.h"
#include "h.h"
H::H() {
    h = 8;
}
int H::m1(void) {
    return h/2;
}
``` file7 : main.cc

```
#include "f.h"
#include "g.h"
#include "h.h"

int main(void) {
    G obj_g;
    H obj_h;
    int i;

i = sub(&obj_g);
    i += sub(&obj_h);
    return i;
}
``` file8 : sub.cc

```
#include "f.h"

int sub(F * p) {
    return p->m1();
}
```

CLASS INFORMATION

| CLASS | F | G | H |
|-------|-----|-----|-----|
| FLAG | OFF | OFF | OFF |

CLASS TREE Tr

CLASS INFORMATION

| CLASS | F | G | H |
|-------|-----|-----|-----|
| FLAG | OFF | ON | ON |

FIG. 17A
VIRTUAL FUNCTION SET S2

| CLASS | VIRTUAL FUNCTION DEFINITION SET | TO-BE-OVERRIDDEN VIRTUAL FUNCTION SET |
|---|---|---|
| F | F::m1(void) | φ |
| G | G::m1(void) | F::m1(void) |
| H | H::m1(void) | F::m1(void) |

FIG. 17B
VIRTUAL FUNCTION SET S2

| CLASS | VIRTUAL FUNCTION DEFINITION SET | TO-BE-OVERRIDDEN VIRTUAL FUNCTION SET |
|---|---|---|
| F | φ | φ |
| G | G::m1(void) | φ |
| H | H::m1(void) | φ |

FIG. 17C
VIRTUAL FUNCTION SET S2

| CLASS | VIRTUAL FUNCTION DEFINITION SET | TO-BE-OVERRIDDEN VIRTUAL FUNCTION SET |
|---|---|---|
| F | φ | φ |
| G | G::m1(void) | φ |
| H | H::m1(void) | φ |

FIG. 17D
VIRTUAL FUNCTION SET S2

| CLASS | VIRTUAL FUNCTION DEFINITION SET | TO-BE-OVERRIDDEN VIRTUAL FUNCTION SET |
|---|---|---|
| F | φ | φ |
| G | G::m1(void) | φ |
| H | H::m1(void) | φ |

FIG. 17E
CLASS SET S3: F
TO-BE-DELETED FUNCTION SET S1: φ

FIG. 17F
CLASS SET S3: F
TO-BE-DELETED FUNCTION SET S1: F::m1(void)

FIG. 17G
CLASS SET S3: G
TO-BE-DELETED FUNCTION SET S1: F::m1(void)

FIG. 17H
CLASS SET S3: H
TO-BE-DELETED FUNCTION SET S1: F::m1(void)

FIG. 21A  TO-BE-DELETED CLASS SET S4  [ F ]

FIG. 21B  VIRTUAL FUNCTION TABLE FOR CLASS F (vtbl) → DATA(D)

| OFFSET |
|---|
| &F::m1(void) |

FIG. 21C  CONSTRUCTOR PROCESSING FOR CLASS F → PROCESS (E)

```
F::F() {
    INITIALIZE BASE CLASS

SET ADDRESS OF VIRTUAL FUNCTION
    TABLE (vtbl)

INITIALIZE MEMBER

PROCESS OF FUNCTION BODY
}
```

FIG. 24A

S1  D::D(), D::j1(void), E::E(), E::k1(void), C::C(), C::h1(void)

FIG. 24B

S1  D::D(), D::j1(void), E::E(), E::k1(void), C::C(), C::h1(void), B::g1(void)

FIG. 28A
a.obj
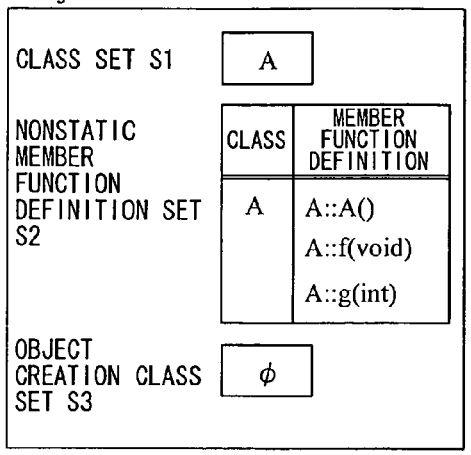
FIG. 28B
b.obj
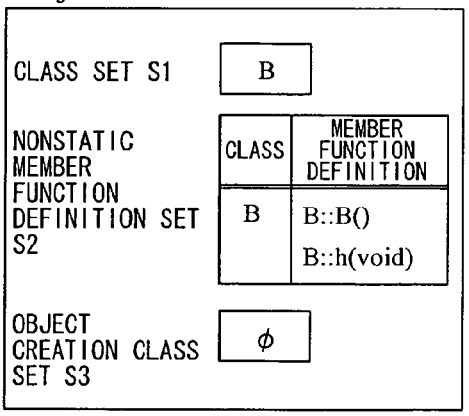
FIG. 28C
main.obj
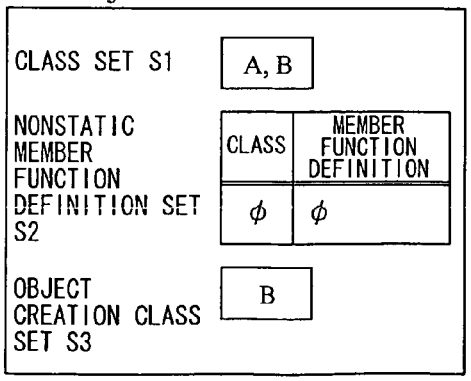
FIG. 28D
| CLASS SET S1' | A, B |
NONSTATIC MEMBER FUNCTION DEFINITION SET S2':
| CLASS | MEMBER FUNCTION DEFINITION |
|---|---|
| A | A::A() |
|   | A::f(void) |
|   | A::g(int) |
| B | B::B() |
|   | B::h(void) |
| OBJECT CREATION CLASS SET S3' | B |
| NO-OBJECT CREATION CLASS SET S4 | A |
| UNNECESSARY FUNCTION SET S5 | A::A(), A::f(void), A::g(int) |

FIG. 32A a.cc

| CLASS SET S1 | CLASS | BASE CLASS |
|---|---|---|
| | A | φ |

| MEMBER FUNCTION DEFINITION SET S2 | CLASS | MEMBER FUNCTION DEFINITION |
|---|---|---|
| | A | A::A() <br> A::f1(void) |

| OBJECT CREATION CLASS SET S3 | φ |
|---|---|

FIG. 32B b.cc

| CLASS SET S1 | CLASS | BASE CLASS |
|---|---|---|
| | B | A |

| MEMBER FUNCTION DEFINITION SET S2 | CLASS | MEMBER FUNCTION DEFINITION |
|---|---|---|
| | B | B::B() <br> B::g1(void) |

| OBJECT CREATION CLASS SET S3 | φ |
|---|---|

FIG. 32C c.cc

| CLASS SET S1 | CLASS | BASE CLASS |
|---|---|---|
| | C | A |

| MEMBER FUNCTION DEFINITION SET S2 | CLASS | MEMBER FUNCTION DEFINITION |
|---|---|---|
| | C | C::C() <br> C::h1(void) |

| OBJECT CREATION CLASS SET S3 | φ |
|---|---|

FIG. 32D d.cc

| CLASS SET S1 | CLASS | BASE CLASS |
|---|---|---|
| | D | C |

| MEMBER FUNCTION DEFINITION SET S2 | CLASS | MEMBER FUNCTION DEFINITION |
|---|---|---|
| | D | D::D() <br> D:j1(void) |

| OBJECT CREATION CLASS SET S3 | φ |
|---|---|

FIG. 32E e.cc

| CLASS SET S1 | CLASS | BASE CLASS |
|---|---|---|
| | E | C |

| MEMBER FUNCTION DEFINITION SET S2 | CLASS | MEMBER FUNCTION DEFINITION |
|---|---|---|
| | E | E::E() <br> E:k1(void) |

| OBJECT CREATION CLASS SET S3 | φ |
|---|---|

FIG. 32F main.cc

| CLASS SET S1 | CLASS | BASE CLASS |
|---|---|---|
| | A | φ |
| | B | A |
| | C | A |
| | D | C |
| | E | C |

| MEMBER FUNCTION DEFINITION SET S2 | CLASS | MEMBER FUNCTION DEFINITION |
|---|---|---|
| | φ | φ |

| OBJECT CREATION CLASS SET S3 | A, B |
|---|---|

FIG. 33A CLASS TREE SET S1'

| CLASS | BASE CLASS |
|-------|------------|
| A | φ |
| B | A |
| C | A |
| D | C |
| E | C |

FIG. 33B MEMBER FUNCTION DEFINITION SET S2'

| CLASS | MEMBER FUNCTION DEFINITION |
|-------|----------------------------|
| A | A::A() |
|   | A::f1(void) |
| B | B::B() |
|   | B::g1(void) |
| C | C::C() |
|   | C::h1(void) |
| D | D::D() |
|   | D::j1(void) |
| E | E::E() |
|   | E::k1(void) |

FIG. 33C OBJECT CREATION CLASS SET S3'

FIG. 34C  S6 | E |   S5 | D::D(), D::j1(void) |

FIG. 34D  S6 | C |   S5 | D::D(), D::j1(void), E::E(), E::k1(void) |

FIG. 34E  S6 | φ |   S5 | D::D(), D::j1(void), E::E(), E::k1(void), C::C(), C::h1(void) |

FIG. 37A f.cc

| CLASS SET S1 | CLASS | BASE CLASS | |
|---|---|---|---|
| | F | φ | |

| VIRTUAL FUNCTION SET S2 | CLASS | VIRTUAL FUNCTION DEFINITION | TO-BE-OVERRIDDEN VIRTUAL FUNCTION |
|---|---|---|---|
| | F | F::m1(void) | φ |

| OBJECT CREATION CLASS SET S3 | φ |
|---|---|

FIG. 37B g.cc

| CLASS SET S1 | CLASS | BASE CLASS | |
|---|---|---|---|
| | G | F | |

| VIRTUAL FUNCTION SET S2 | CLASS | VIRTUAL FUNCTION DEFINITION | TO-BE-OVERRIDDEN VIRTUAL FUNCTION |
|---|---|---|---|
| | G | G::m1(void) | F::m1(void) |

| OBJECT CREATION CLASS SET S3 | φ |
|---|---|

FIG. 37C h.cc

| CLASS SET S1 | CLASS | BASE CLASS | |
|---|---|---|---|
| | H | F | |

| VIRTUAL FUNCTION SET S2 | CLASS | VIRTUAL FUNCTION DEFINITION | TO-BE-OVERRIDDEN VIRTUAL FUNCTION |
|---|---|---|---|
| | H | H::m1(void) | F::m1(void) |

| OBJECT CREATION CLASS SET S3 | φ |
|---|---|

FIG. 37D main.cc

| CLASS SET S1 | CLASS | BASE CLASS |
|---|---|---|
| | F | φ |
| | G | F |
| | H | F |

| VIRTUAL FUNCTION SET S2 | CLASS | VIRTUAL FUNCTION DEFINITION | TO-BE-OVERRIDDEN VIRTUAL FUNCTION |
|---|---|---|---|
| | φ | φ | φ |

| OBJECT CREATION CLASS SET S3 | G, H |
|---|---|

FIG. 37E sub.cc

| CLASS SET S1 | CLASS | BASE CLASS | |
|---|---|---|---|
| | F | φ | |

| VIRTUAL FUNCTION SET S2 | CLASS | VIRTUAL FUNCTION DEFINITION | TO-BE-OVERRIDDEN VIRTUAL FUNCTION |
|---|---|---|---|
| | φ | φ | φ |

| OBJECT CREATION CLASS SET S3 | φ |
|---|---|

CLASS TREE SET S1'

| CLASS | BASE CLASS |
|-------|------------|
| F | $\phi$ |
| G | F |
| H | F |

VIRTUAL FUNCTION SET S2'

| CLASS | VIRTUAL FUNCTION DEFINITION | TO-BE-OVERRIDDEN VIRTUAL FUNCTION |
|-------|------------------------------|-----------------------------------|
| F | F::m1(void) | $\phi$ |
| G | G::m1(void) | F::m1(void) |
| H | H::m1(void) | F::m1(void) |

OBJECT CREATION CLASS SET S3'

VIRTUAL FUNCTION SET S2'

| CLASS | VIRTUAL FUNCTION DEFINITION | TO-BE-OVERRIDDEN VIRTUAL FUNCTION |
|---|---|---|
| F | $\phi$ | $\phi$ |
| G | G::m1(void) | $\phi$ |
| H | H::m1(void) | $\phi$ |

CLASS SET S6 | F |

TO-BE-DELETED FUNCTION SET S5 | F::m1(void) |

FIG. 39B

VIRTUAL FUNCTION SET S2'

| CLASS | VIRTUAL FUNCTION DEFINITION | TO-BE-OVERRIDDEN VIRTUAL FUNCTION |
|---|---|---|
| F | $\phi$ | $\phi$ |
| G | G::m1(void) | $\phi$ |
| H | H::m1(void) | $\phi$ |

CLASS SET S6 | G |

TO-BE-DELETED FUNCTION SET S5 | F::m1(void) |

FIG. 39C

VIRTUAL FUNCTION SET S2'

| CLASS | VIRTUAL FUNCTION DEFINITION | TO-BE-OVERRIDDEN VIRTUAL FUNCTION |
|---|---|---|
| F | $\phi$ | $\phi$ |
| G | G::m1(void) | $\phi$ |
| H | H::m1(void) | $\phi$ |

CLASS SET S6 | H |

TO-BE-DELETED FUNCTION SET S5 | F::m1(void) |

FIG. 44A f.cc

| CLASS SET S1 | CLASS | BASE CLASS | VIRTUAL FUNCTION TABLE |
|---|---|---|---|
| | F | φ | vtbl_F |

| VIRTUAL FUNCTION SET S2 | CLASS | VIRTUAL FUNCTION DEFINITION | TO-BE-OVERRIDDEN VIRTUAL FUNCTION |
|---|---|---|---|
| | F | F::m1(void) | φ |

| OBJECT CREATION CLASS SET S3 | φ |
|---|---|

FIG. 44B g.cc

| CLASS SET S1 | CLASS | BASE CLASS | VIRTUAL FUNCTION TABLE |
|---|---|---|---|
| | G | F | vtbl_G |

| VIRTUAL FUNCTION SET S2 | CLASS | VIRTUAL FUNCTION DEFINITION | TO-BE-OVERRIDDEN VIRTUAL FUNCTION |
|---|---|---|---|
| | G | G::m1(void) | F::m1(void) |

| OBJECT CREATION CLASS SET S3 | φ |
|---|---|

FIG. 44C h.cc

| CLASS SET S1 | CLASS | BASE CLASS | VIRTUAL FUNCTION TABLE |
|---|---|---|---|
| | H | F | vtbl_H |

| VIRTUAL FUNCTION SET S2 | CLASS | VIRTUAL FUNCTION DEFINITION | TO-BE-OVERRIDDEN VIRTUAL FUNCTION |
|---|---|---|---|
| | H | H::m1(void) | F::m1(void) |

| OBJECT CREATION CLASS SET S3 | φ |
|---|---|

FIG. 44D main.cc

| CLASS SET S1 | CLASS | BASE CLASS | VIRTUAL FUNCTION TABLE |
|---|---|---|---|
| | F | φ | vtbl_F |
| | G | F | vtbl_G |
| | H | F | vtbl_H |

| VIRTUAL FUNCTION SET S2 | CLASS | VIRTUAL FUNCTION DEFINITION | TO-BE-OVERRIDDEN VIRTUAL FUNCTION |
|---|---|---|---|
| | φ | φ | φ |

| OBJECT CREATION CLASS SET S3 | G, H |
|---|---|

FIG. 44E sub.cc

| CLASS SET S1 | CLASS | BASE CLASS | VIRTUAL FUNCTION TABLE |
|---|---|---|---|
| | F | φ | vtbl_F |

| VIRTUAL FUNCTION SET S2 | CLASS | VIRTUAL FUNCTION DEFINITION | TO-BE-OVERRIDDEN VIRTUAL FUNCTION |
|---|---|---|---|
| | φ | φ | φ |

| OBJECT CREATION CLASS SET S3 | φ |
|---|---|

FIG. 45A
CLASS TREE SET S1'
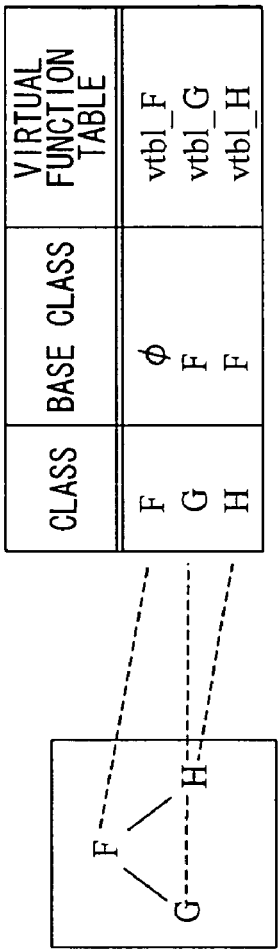
| CLASS | BASE CLASS | VIRTUAL FUNCTION TABLE |
|---|---|---|
| F | φ | vtbl_F |
| G | F | vtbl_G |
| H | F | vtbl_H |
FIG. 45B
VIRTUAL FUNCTION SET S2'
| CLASS | VIRTUAL FUNCTION DEFINITION | TO-BE-OVERRIDDEN VIRTUAL FUNCTION |
|---|---|---|
| F | F::m1(void) | φ |
| G | G::m1(void) | F::m1(void) |
| H | H::m1(void) | F::m1(void) |
FIG. 45C
OBJECT CREATION CLASS SET S3'

FIG. 46A

VIRTUAL FUNCTION SET S2'

| CLASS | VIRTUAL FUNCTION DEFINITION | TO-BE-OVERRIDDEN VIRTUAL FUNCTION |
|---|---|---|
| F | $\phi$ | $\phi$ |
| G | G::m1(void) | $\phi$ |
| H | H::m1(void) | $\phi$ |

CLASS SET S6 — F

TO-BE-DELETED FUNCTION SET S5 — F::m1(void)

TO-BE-DELETED VIRTUAL FUNCTION TABLE SET S7 — vtbl_F

FIG. 46B

VIRTUAL FUNCTION SET S2'

| CLASS | VIRTUAL FUNCTION DEFINITION | TO-BE-OVERRIDDEN VIRTUAL FUNCTION |
|---|---|---|
| F | $\phi$ | $\phi$ |
| G | G::m1(void) | $\phi$ |
| H | H::m1(void) | $\phi$ |

CLASS SET S6 — G

TO-BE-DELETED FUNCTION SET S5 — F::m1(void)

TO-BE-DELETED VIRTUAL FUNCTION TABLE SET S7 — vtbl_F

FIG. 46C

VIRTUAL FUNCTION SET S2'

| CLASS | VIRTUAL FUNCTION DEFINITION | TO-BE-OVERRIDDEN VIRTUAL FUNCTION |
|---|---|---|
| F | $\phi$ | $\phi$ |
| G | G::m1(void) | $\phi$ |
| H | H::m1(void) | $\phi$ |

CLASS SET S6 — H

TO-BE-DELETED FUNCTION SET S5 — F::m1(void)

TO-BE-DELETED VIRTUAL FUNCTION TABLE SET S7 — vtbl_F

PROGRAM CONVERTING METHOD AND STORAGE MEDIUM

The disclosure of Japanese Patent Application No. 2003-182556 filed Jun. 26, 2003 including specification, drawings and claims is incorporated herein by reference in its entirety.

BACKGROUND OF THE INVENTION

The present invention relates to a method for converting a program written in an object-oriented language into an object program, a program for making a computer execute the method and a storage medium for recording the program thereon.

With recent increase in the size of programs, attention has been given to developments of programs using object-oriented languages such as C++ and Java (R), in order to increase the efficiency in developing programs, to reuse programs or to enhance the maintainability of programs.

In a conventional procedural language, emphasis is placed on procedures and a desired process is executed by a combination of procedural calls. On the other hand, in an object-oriented language, stress is laid on classes, which include data and operations of the data, and a desired process is executed by a combination of class objects and operations on them. These operations are called "member functions" in C++ or "methods" in Java (R).

In general, a large number of classes are used in one program, and thus an enormous number of member functions (methods) are used. Accordingly, if the size of a program is large, it is difficult for a programmer to know which member function (method) is actually used, and consequently an object program tends to include code of member functions (methods) which are not actually called. In view of this, a technique for reducing the number of member functions (methods) is significant for a compiler that converts a program written in an object-oriented language into an object program.

Examples of known technique for deleting member functions (methods) include a technique of examining all the programs to know whether member functions (methods) are actually used and of deleting some of the member functions (methods) which are not actually used (see, for example, Japanese Unexamined Patent Publication No. 2001-14171).

Object-oriented languages have the concept of polymorphism in which the behavior of an object changes depending on the entity of the object during execution of a program. In C++, a member function having polymorphism is called a virtual function. In Java (R), every method has polymorphism.

Use of a virtual function changes a member function called depending on an actual type of an object during execution of a program, and thus a static analysis of which member function is called at compile time is difficult. However, even if a virtual function is used, it is still possible to analyze member functions which are never called under some circumstances.

Examples of techniques for deleting uncallale virtual functions include a technique in which attention is directed to calls of virtual functions and member functions which can be called by the calls are tagged (see, for example, Japanese Unexamined Patent Publication No. 9-269898). With this technique, potentially-callable functions out of all the virtual functions are tagged and thereby it is determined that non-tagged functions are not callable.

However, in this known technique, virtual functions which are not actually called are not deleted in some cases because of an insufficient analysis.

In the technique disclosed in Japanese Unexamined Patent Publication No. 2001-14171, addresses of member functions are referred to but uncallable member functions may be determined to be necessary, so that redundant code is generated in some cases. To know whether a member function is actually called or not, it is necessary to analyze the entire program to ascertain how the address of the member function is used. However, this requires considerable time.

In the technique disclosed in Japanese Unexamined Patent Publication No. 9-269898, uncallable virtual functions are erroneously identified as callable functions, resulting in the possibility of unsuccessful deletion of redundant code.

SUMMARY OF THE INVENTION

It is therefore an object of the present invention to provide a more efficient program-converting method by providing means for deleting a larger number of unnecessary member functions (methods). To achieve this object, attention is given to the fact that a member function associated with an object which is not created is unnecessary.

According to the present invention, a first program converting method includes a conversion step of converting an input program which is described in an object-oriented language and includes at least one class, wherein the conversion step includes: an input step of inputting the input program; an object analyzing step of analyzing the class in the input program to find out whether an object of the class is created or not, and of recording an analysis result in an object analysis information storing section; an unnecessary process analyzing step of extracting an unnecessary process in accordance with the analysis result stored in the object analysis information storing section, and of recording an analysis result in an unnecessary process information storing section; an unnecessary process deleting step of deleting the unnecessary process in accordance with the analysis result stored in the unnecessary process information storing section; and an output step of outputting an object program.

With this method, it is determined whether there is a process of creating an object of a class or not, thus ensuring deletion of an unnecessary process. Accordingly, the code size is further reduced easily as compared to conventional techniques.

In addition, constructs and unions can be analyzed as classes, so that code with high efficiency is also generated in general-purpose programs.

If the class is found to be a no-object class whose object is not created in the object analyzing step, a function regarding the no-object class may be extracted as the unnecessary process in the unnecessary process analyzing step. Then, a group of functions can be processed.

The "group of functions regarding a no-object class" refers not only to functions of the no-object class itself but also to functions of classes having an inheritance relationship with the no-object class. These functions include virtual functions.

If the class is found to be a no-object class whose object is not created in the object analyzing step, a function of the no-object class may be extracted as the unnecessary process in the unnecessary process analyzing step. Then, uncallable functions are deleted.

The conversion step may further include a class analyzing step of analyzing an inheritance relationship of the class after the input step has been performed and before the unnecessary process analyzing step is performed, and in the unnecessary process analyzing step, an analysis may be performed to find out whether an object of a leaf class included in a class tree to which the class belongs is created or not, and if no object of the leaf class is created, a process on the leaf class may be extracted as the unnecessary process. This enables an analysis in which an inheritance relationship among classes is taken into consideration. Specifically, even if an object of one of classes included in a class tree is created, an unnecessary process on a leaf class is deleted independently.

The leaf class is preferably a first leaf class, and in the unnecessary process analyzing step, if the class tree includes a second leaf class that becomes a leaf class by deleting the first leaf class and no object of the second leaf class is created, a process on the second leaf class is preferably further extracted as the unnecessary process. Then, a class which becomes a leaf during an analysis is also deleted.

After the input step has been performed and before the unnecessary process analyzing step is performed, the conversion step may further include: a class analyzing step of analyzing an inheritance relationship of the class; and a virtual function analyzing step of analyzing a virtual function of the class, and the unnecessary process analyzing step may include the step of extracting a non-overriding-virtual-function-holding class that inherits characteristics of the class and has a virtual function not overriding the virtual function of the class, and the step of extracting the virtual function of the class as the unnecessary process if neither an object of the class nor an object of the non-overriding-virtual-function-holding class is created. Then, uncallable virtual functions are deleted.

The unnecessary process analyzing step preferably further includes a specific unnecessary process analyzing step, and in the specific unnecessary process analyzing step, it is preferably determined whether all the virtual functions of the class are unnecessary or not and, if all the virtual functions of the class are determined to be unnecessary, a process automatically created in a constructor is preferably extracted as the unnecessary process. Then, a process which becomes unnecessary by deleting all the virtual functions of a class is deleted, so that the code size is further reduced.

The unnecessary process analyzing step preferably further includes a specific unnecessary data analyzing step, and in the specific unnecessary data analyzing step, it is preferably determined whether all the virtual functions of the class are unnecessary or not and, if all the virtual functions of the class are determined to be unnecessary, data on the virtual functions of the class is preferably extracted as the unnecessary process. Then, a process which becomes unnecessary by deleting all the virtual functions of a class is deleted, so that the code size is further reduced.

The conversion step may further include a deletion-designated process analyzing step of analyzing a process designated as a process to be deleted based on a to-be-deleted-process designation by a user. Then, a process which cannot be automatically detected at the conversion step is deleted by designating the process for deletion, so that the code size is further reduced.

The to-be-deleted process designation is preferably a to-be-deleted-process designating description provided in the input program. Then, easiness of describing programs is maintained.

The to-be-deleted-process designation is preferably a command line option. Then, alternation of the input program is unnecessary and designation for deletion is made during the execution of the conversion step.

The conversion step is preferably repeated a plurality of times.

According to the present invention, a second program converting method for converting an input program which is described in an object-oriented language and includes at least one class includes: a translation step including an input step of inputting the input program, an object-related function extracting step of extracting a process regarding an object of the class, an object analyzing step of analyzing the class to find out whether an object of the class is created or not, and of recording an analysis result in an object analysis information storing section, and an output step of outputting the analysis result stored in the object analysis information storing section and a conversion result of the input program; and a concatenation step including an unnecessary process analyzing step of extracting an unnecessary process based on the output of the output step in the translation step, and a linking step of linking a link target in accordance with an analysis result of the unnecessary process analyzing step.

With this method, it is determined whether there is a process of creating an object of a class or not, thus ensuring deletion of an unnecessary process. Accordingly, the code size is further reduced easily as compared to conventional techniques.

In the object analyzing step, if the class is found to be a no-object class whose object is not created, a function of the no-object class may be extracted as the unnecessary process in the unnecessary process analyzing step. Then, uncallable functions are deleted.

The translation step may further include a class analyzing step of analyzing an inheritance relationship of the class, an analysis result of the class analyzing step is also output in the output step, an analysis is performed to find out whether an object of a leaf class included in a class tree to which the class belongs is created or not, in the unnecessary process analyzing step, and if no object of the leaf class is created, a process on the leaf class may be extracted as the unnecessary process. This enables an analysis in which an inheritance relationship among classes is taken into consideration. Specifically, even if an object of one of the classes included in a class tree is created, an unnecessary process on a leaf class is deleted independently.

The leaf class is preferably a first leaf class, and in the unnecessary process analyzing step, if the class tree includes a second leaf class that becomes a leaf class by deleting the first leaf class and no object of the second leaf class is created, a process on the second leaf class is preferably further extracted as the unnecessary process. Then, classes which become leaf classes during analysis are deleted.

The translation step may further include: a class analyzing step of analyzing an inheritance relationship of the class; and a virtual function analyzing step of analyzing a virtual function of the class, in the output step, analysis results of the class analyzing step and the virtual function analyzing step are also output, and the unnecessary process analyzing step includes the step of extracting a non-overriding-virtual-function-holding class that inherits characteristics of the class and has a virtual function not overriding a virtual function of the class, and the step of extracting the virtual function of the class as the unnecessary process if neither an object of the class nor an object of the non-overriding-virtual-function-holding class is created. Then, uncallable virtual functions are deleted.

The unnecessary process analyzing step preferably includes a specific unnecessary data analyzing step, and in the specific unnecessary data analyzing step, it is preferably determined whether all the virtual functions of the class are unnecessary or not and, if all the virtual functions of the class are determined to be unnecessary, data on the virtual functions of the class is preferably extracted as the unnecessary process. Then, data which becomes unnecessary by deleting all the virtual functions of a class is deleted, so that the code size is further reduced.

According to the present invention, a third program converting method for converting an input program which is described in an object-oriented language and includes at least one class includes: a precompile step including a first input step of inputting the input program, an object analyzing step of analyzing the class to find out whether an object of the class is created or not, and of recording an analysis result in an object analysis information storing section, and an unnecessary process analyzing step of extracting an unnecessary process in accordance with the analysis result stored in the object analysis information storing section; and a conversion step including a second input step of inputting the input program and an analysis result of the unnecessary process analyzing step, and an unnecessary process deleting step of deleing an unnecessary process in accordance with the analysis result of the unnecessary process analyzing step.

With this method, it is determined whether there is a process of creating an object of a class or not, thus ensuring deletion of an unnecessary process. Accordingly, the code size is further reduced easily as compared to conventional techniques.

If the class is found to be a no-object class whose object is not created in the object analyzing step, a function of the no-object class may be extracted as the unnecessary process in the unnecessary process analyzing step. Then, uncallable functions are deleted.

The precompile step may further include a class analyzing step of analyzing an inheritance relationship of the class after the first input step has been performed and before the unnecessary process analyzing step is performed, and in the unnecessary process analyzing step, an analysis may be performed to find out whether an object of a leaf class included in a class tree to which the class belongs is created or not, and if no object of the leaf class is created, a process on the leaf class may be extracted as the unnecessary process. This enables an analysis in which an inheritance relationship among classes is taken into consideration. Specifically, even if an object of one of the classes included in a class tree is created, an unnecessary process of a leaf class is deleted independently.

The leaf class is preferably a first leaf class, and in the unnecessary process analyzing step, if the class tree includes a second leaf class that becomes a leaf class by deleting the first leaf class and no object of the second leaf class is created, a process on the second leaf class is preferably further extracted as the unnecessary process. Then, classes which become leaf classes during analysis are deleted.

The precompile step may further include: a class analyzing step of analyzing an inheritance relationship of the class after the first input step has been performed and before the unnecessary process analyzing step is performed; and a virtual function analyzing step of analyzing a virtual function of the class, and the unnecessary process analyzing step includes the step of extracting a non-overriding-virtual-function-holding class that inherits characteristics of the class and has a virtual function not overriding the virtual function of the class, and the step of extracting the virtual function of the class as the unnecessary process if neither an object of the class nor an object of the non-overriding-virtual-function-holding class is created. Then, uncallable virtual functions are deleted.

The unnecessary process analyzing step preferably further includes a specific unnecessary process analyzing step, and in the specific unnecessary process analyzing step, it is preferably determined whether all the virtual functions of the class are unnecessary or not and, if all the virtual functions of the class are determined to be unnecessary, a process automatically created in a constructor is preferably extracted as the unnecessary process. Then, data which becomes unnecessary by deleting all the virtual functions of a class is deleted, so that the code size is further reduced.

The unnecessary process analyzing step preferably further includes a specific unnecessary data analyzing step, and in the specific unnecessary data analyzing step, it is preferably determined whether all the virtual functions of the class are unnecessary or not and, if all the virtual functions of the class are determined to be unnecessary, data on the virtual functions of the class is preferably extracted as the unnecessary process. Then, data which becomes unnecessary by deleting all the virtual functions of a class is deleted, so that the code size is further reduced.

According to the present invention, a first program which makes a computer convert an input program described in an object-oriented language, makes the computer operate as: input means for inputting the input program; object analyzing means for analyzing a class included in the input program to find out whether an object of the class is created or not, and for recording an analysis result in an object analysis information storing section; unnecessary process analyzing means for extracting an unnecessary process in accordance with the analysis result stored in the object analysis information recording section, and for recording an analysis result in an unnecessary process information storing section; and unnecessary process deleting means for deleting the unnecessary process in accordance with the analysis result stored in the unnecessary process information storing section.

When this program is executed by a computer, it is determined whether there is a process of creating an object of a class in the input program or not, thus ensuring deletion of an unnecessary process. Accordingly, the code size is further reduced easily as compared to conventional techniques.

According to the present invention, a second program which makes a computer convert an input program described in an object-oriented language, makes the computer operate as: translation means including input means for inputting the input program, object analyzing means for making an analysis to find out whether an object in the input program is created or not, and for recording an analysis result in an object analysis information storing section, and output means for outputting the analysis result stored in the object analysis information storing section and a conversion result of the input program; and concatenation means including unnecessary process analyzing means for extracting an unnecessary process based on the output of the output means in the translation means, and linking means for linking a link target in accordance with an analysis result of the unnecessary process analyzing means.

When this program is executed by a computer, it is determined whether there is a process of creating an object of a class in the input program or not, thus ensuring deletion of an unnecessary process. Accordingly, the code size is further reduced as compared to conventional techniques.

According to the present invention, a third program which makes a computer convert an input program described in an object-oriented language, makes the computer operate as: precompile means including first input means for inputting the input program, object analyzing means for making an analysis to find out whether an object in the input program is created or not, and for recording an analysis result in an object analysis information storing section, and unnecessary process analyzing means for extracting an unnecessary process in accordance with the analysis result stored in the object analysis information storing section; and conversion means including second input means for inputting the input program and an analysis result of the unnecessary process analyzing means, and unnecessary process deleting means for deleing an unnecessary process in accordance with the analysis result of the unnecessary process analyzing means.

When this program is executed by a computer, it is determined whether there is a process of creating an object of a class in the input program or not, thus ensuring deletion of an unnecessary process. Accordingly, the code size is further reduced easily as compared to conventional techniques.

According to the present invention, a first computer-readable storage medium having a program recorded thereon which makes a computer convert an input program described in an object-oriented language, wherein the program makes the computer operate as: input means for inputting the input program; object analyzing means for analyzing a class included in the input program to find out whether an object of the class is created or not, and for recording an analysis result in an object analysis information storing section; unnecessary process analyzing means for extracting an unnecessary process in accordance with the analysis result stored in the object analysis information storing section, and for recording an analysis result in an unnecessary process information storing section; and unnecessary process deleting means for deleting the unnecessary process in accordance with the analysis result stored in the unnecessary process information storing section.

When a program recorded on this storage medium is executed by a computer, it is determined whether there is a process of creating an object a class in an input program or not, thus ensuring deletion of an unnecessary process. Accordingly, the code size is further reduced easily as compared to conventional techniques.

According to the present invention, a second computer-readable storage medium having a program recorded thereon which makes a computer convert an input program described in an object-oriented language, wherein the program makes the computer operate as: translation means including input means for inputting the input program, object analyzing means for making an analysis to find out whether an object included in the input program is created or not, and for recording an analysis result in an object analysis information storing section, and output means for outputting the analysis result stored in the object analysis information storing section and a conversion result of the input program; and concatenation means including unnecessary process analyzing means for extracting an unnecessary process based on the output of the output means in the translation means, and linking means for linking a link target in accordance with an analysis result of the unnecessary process analyzing means.

When a program recorded on this storage medium is executed by a computer, it is determined whether there is a process of creating an object of a class in an input program or not, thus ensuring deletion of an unnecessary process. Accordingly, the code size is further reduced easily as compared to conventional techniques.

According to the present invention, a third computer-readable storage medium having a program recorded thereon which makes a computer convert an input program described in an object-oriented language, wherein the program makes the computer operate as: precompile means including first input means for inputting the input program, object analyzing means for making an analysis to find out whether an object included in the input program is created or not, and for recording an analysis result in an object analysis information storing section, and unnecessary process analyzing means for extracting an unnecessary process in accordance with the analysis result stored in the object analysis information storing section; and conversion means including second input means for inputting the input program and an analysis result of the unnecessary process analyzing means, and unnecessary process deleting means for deleing an unnecessary process in accordance with the analysis result of the unnecessary process analyzing means.

When a program recorded on this storage medium is executed by a computer, it is determined whether there is a process of creating an object of a class in an input program or not, thus ensuring deletion of an unnecessary process. Accordingly, the code size is further reduced easily as compared to conventional techniques.

BRIEF DESCRIPTION OF THE DRAWINGS

FIGS. 2A through 2D are flowcharts respectively showing structures of a class extracting step S103, an object analyzing step S104, an unnecessary function analyzing step S105 and an unnecessary function deleting step S106.

FIG. 3 shows an example of a program.

FIG. 4A is a table showing information on classes extracted in the class extracting step S103. FIG. 4B is a table showing information on classes analyzed in the object analyzing step S104. FIG. 4C shows a to-be-deleted function set S1 analyzed in the unnecessary function analyzing step S105.

FIG. 15 shows an example of a program.

FIGS. 17A through 17D are tables showing changes in the state of a virtual function set S2. FIGS. 17E through 17H show changes in the states of a class set S3 and a to-be-deleted function set S1.

FIG. 21A shows a state of a to-be-deleted class set S4. FIG. 21B shows a virtual function table for class F. FIG. 21C shows an address setting process on the virtual function table for class F.

FIGS. 24A and 24B show a change in the state of a to-be-deleted function set.

FIGS. 28A through 28C show analysis data stored in an analysis information storing section 22 with respect to files "a.cc", "b.cc" and "main.cc", respectively. FIG. 28D shows an analysis result in an unnecessary function analyzing step S621.

FIGS. 32A through 32F show analysis data stored in an analysis information storing section 22 with respect to files "a.cc" through "main.cc", respectively.

FIG. 33A shows a class tree set S1' obtained at step s1 in the unnecessary function analyzing step S721. FIGS. 33B and 33C show a nonstatic member function definition set S2' and an object creation class set S3', respectively, obtained at step s2 in the unnecessary function analyzing step S721.

FIGS. 34A through 34E show changes in the states of a leaf class set S6 and a to-be-deleted function set S5 in the unnecessary function analyzing step S721.

FIGS. 37A through 37E show class sets S1, virtual function sets S2 and object creation class sets S3 with respect to respective files "f.cc", "g.cc", "h.cc", "main.cc" and "sub.cc" stored in an analysis information storing section 22.

FIGS. 39A through 39C show changes in the states of the virtual function set S2', a to-be-deleted function set S5 and a class set S6.

FIGS. 44A through 44E show a class set S1, a virtual function set S2 and an object creation class set S3 stored in an analysis information storing section 22 with respect to files "f.cc", "g.cc", "h.cc", "main.cc" and "sub.cc", respectively.

FIGS. 45A through 45C respectively show the states of a class tree set S1', a virtual function set S2' and an object creation class set S3' in the ninth embodiment.

FIGS. 46A through 46C show changes in the states of the virtual function set S2', a class set S6, a to-be-deleted function set S5 a to-be-deleted virtual function table set S7.

DESCRIPTION OF THE PREFERRED EMBODIMENTS

In an object-oriented language, data and a member function associated with the data are used in a pair. In the present invention, attention is given to the fact that if there is no class object that holds data, a member function associated with the data has no target for its operation and thus becomes unnecessary.

In the description and drawings of the present invention, terms such as class C1 and class C2 are used. These terms indicate, in a generalized manner, classes to be processed. The same statements are applicable to function F1, class tree T1, path P1 and link target L1.

Embodiment 1

Figure 1:
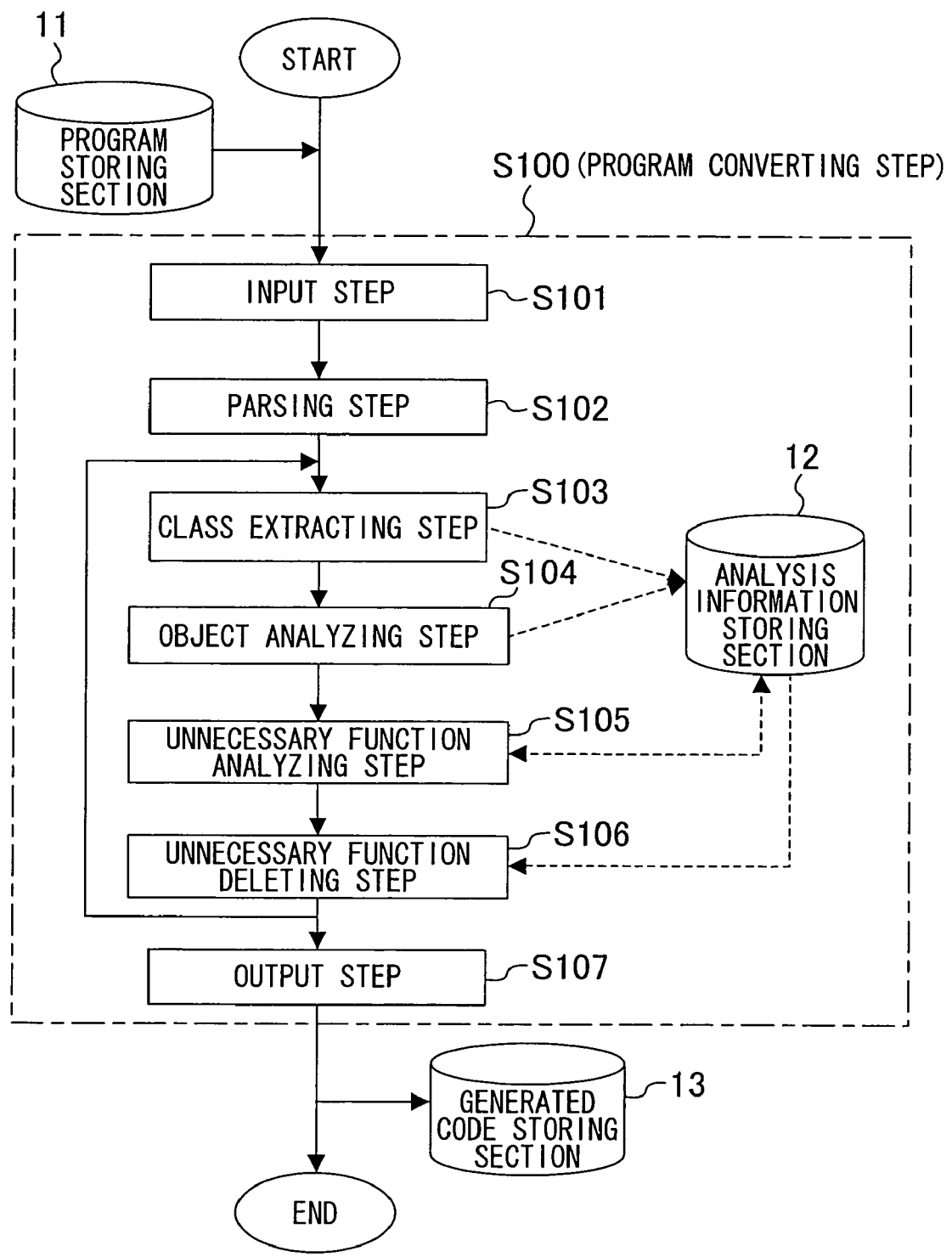
FIG. 1 is a flowchart showing a structure of a program converting step S100 according to a first embodiment.

Hereinafter, a method for converting a program executed by a compiler (not shown) according to a first embodiment of the present invention will be described with reference to the drawings. In this program converting method, a program in which processing has been written is input to the compiler to make the compiler execute the processing. FIG. 1 is a flowchart showing a structure of a program converting step S100 according to the first embodiment.

As shown in FIG. 1, the program converting step S100 of this embodiment includes: an input step S101 of inputting a program to be converted; a parsing step S102 of parsing the program and generating a symbol table, a syntax tree and the like; a class extracting step S103 of recording information on classes included in the program in an analysis information storing section 12; an object analyzing step S104 of detecting classes whose objects are created out of the classes included in the program and of recording the result in the analysis information storing section 12; an unnecessary function analyzing step S105 of receiving information held in the analysis information storing section 12, analyzing functions (unnecessary functions) regarding classes whose objects are not created and recording the result in the analysis information storing section 12; an unnecessary function deleting step S106 of receiving information held in the analysis information storing section 12 and deleting definitions of unnecessary functions; and an output step S107 of outputting a program from which the unnecessary functions have been deleted (hereinafter, referred to as an object program) to a generated code storing section 13. The class extracting step S103 through the unnecessary function deleting step S106 are repeated until the output code becomes uniform.

In the unnecessary function analyzing step S105, unnecessary functions are analyzed based on information on classes extracted in the class extracting step S103 and information on classes analyzed in the object analyzing step S104 from the analysis information storing section 12.

Now, operations in the input step S101 through the output step S107 of the program converting step S100 will be described in further detail with reference to an example of a program. FIG. 3 shows an example of a program.

When the program converting step S100 is initiated, the input step S101 and the parsing step S102 are performed. There steps are not principal features of the present invention, and thus detailed description thereof will be omitted.

Then, the class extracting step S103 will be described with reference to FIGS. 2A, 3 and 4A. FIG. 2A is a flowchart showing a structure of the class extracting step S103.

As shown in FIG. 2A, in the class extracting step S103, the loop from step a1 through step a4 is repeatedly executed on every class C1 included in a program analyzed in the parsing step S102.

In the program shown in FIG. 3, class C1 is only class A and class B. According to the program shown in FIG. 3, in the class extracting step S103, class A, for example, is extracted at step a1 and then, at step a2, it is determined whether class A has been already registered in the analysis information storing section 12. At the first-time determination of class A, the determination result is No and the process proceeds to step a3. At each of the subsequent determinations of class A, class A has been already registered in the analysis information storing section 12, so that the determination result is Yes and the process proceeds to step a4.

At step a3, class A is registered in the analysis information storing section 12, a creation flag associated with class A is initialized, and then the process proceeds to step a4.

When the process proceeds to step a4, the loop from step a1 through step a4 is repeatedly executed on a class different from class A, e.g., class B in this case. When the foregoing process terminates, the creation flags in the analysis information storing section 12 are in the respective states shown in FIG. 4A. FIG. 4A is a table showing information on classes extracted in the class extracting step S103.

Now, operations in the object analyzing step S104 will be described with reference to FIGS. 2B and 3. FIG. 2B is a flowchart showing a structure of the object analyzing step S104.

As shown in FIG. 2B, in the object analyzing step S104, the loop from step b1 through step b4 is repeatedly executed on every process (the body of a function) included in the program.

Examples of a process to be analyzed in the program shown in FIG. 3 include a statement "a=1;" in a file "a.cc" or a statement "B obj_b;" in a file "main.cc". According to the program shown in FIG. 3, in the object analyzing step S104, the statement "a=1;", for example, is extracted at step b1 and it is determined whether or not the statement "a=1;" is a process of creating a class object, at step b. Since no class object is created by the statement "a=1;" the determination result is No and the process proceeds to step b4. A process of creating a class object is herein such a process that creates an object by generation of a variable of a class type, generation of a member or type conversion into a class type. This embodiment is not applicable to sub-objects such as base classes in derived classes.

When the process proceeds to step b4, the loop from step b1 through step b4 is repeatedly executed on the other processes included in the program. Out of the processes included in the program shown in FIG. 3, a process of creating a class object is only the statement "B obj_b;" in the file "main.cc". Therefore, if the determination is performed on the statement at step b2, the result is Yes and the process proceeds to step b3.

At step b3, class information regarding class B whose object is created by the statement "B obj_b;" is acquired from the analysis information storing section 12 and a creation flag for class B is set at ON. When the foregoing process terminates, the states of creation flags in the analysis information storing section 12 are in the respective states shown in FIG. 4B. FIG. 4B is a table showing class information analyzed in the object analyzing step S104.

Now, operations in the unnecessary function analyzing step S105 will be described with reference to FIGS. 2C, 3 and 4C. FIG. 2C is a flowchart showing a structure of the unnecessary function analyzing step S105.

As shown in FIG. 2C, in the unnecessary function analyzing step S105, a to-be-deleted function set S1 is initialized to be an empty set at step c1. Then, the loop from step c2 through step c5 is repeatedly executed on every class C2 stored in the analysis information storing section 12.

In the program shown in FIG. 3, class C2 is only classes A and B. According to the program shown in FIG. 3, in the unnecessary function analyzing step S105, class A is extracted at step c2 and then, at step c3, it is determined whether a creation flag for class A is OFF or not. As shown in FIG. 4B, since the creation flag for class A is OFF, the process proceeds to step c4.

At step c4, all the nonstatic member functions of class A are added to the to-be-deleted function set S1. As a result, as shown in FIG. 4C, "A::A( )", "A::f(void)" and "A:g(int)", which are nonstatic member functions of class A, are added to the to-be-deleted function set S1. FIG. 4C shows the to-be-deleted function set S1 analyzed in the unnecessary function analyzing step S105. Thereafter, the process proceeds to step c5.

When the process proceeds to step c5, the loop from step c2 through step c5 is repeatedly executed on a class different from class A, e.g., class B in this case. If a creation flag for class B is ON as shown in FIG. 4B, the determination result at step c3 is No and the process proceeds to step c5.

Now, operations in the unnecessary function deleting step S106 will be described with reference to FIGS. 2D and 3. FIG. 2D is a flowchart showing a structure of the unnecessary function deleting step S106.

As shown in FIG. 2D, in the unnecessary function deleting step S106, the loop from step d1 through step d3 is repeatedly executed on every function F1 included in the to-be-deleted function set S1.

In the program shown in FIG. 3, function F1 is "A::A( )", "A::f(void)" and "A::g(int)". According to the program shown in FIG. 3, in the unnecessary function deleting step S106, the function body (function definition) "A::A( )", for example, is extracted at step d1 and is erased at step d2. Thereafter, the process proceeds to step d4, and the process from step d1 through step d3 is repeated, thereby deleting "A::f(void)" and "A::g(int)" in order.

In this embodiment, attention is given to the fact that if objects are not created, functions associated with these objects are not called. In view of this, it is determined whether or not there is a process of creating an object of each class in a program, thus ensuring deletion of unnecessary functions. Accordingly, the code size is further reduced more easily than in conventional techniques.

In this embodiment, the class extracting step S103 through the unnecessary function deleting step S106 are repeated until the output code becomes uniform. This ensures even deletion of functions which have become unnecessary by removing function definitions. Accordingly, a program is converted more effectively. Alternatively, according to the present invention, in order to reduce the time required for compiling, the series of operations from the class extracting step S103 through the unnecessary function deleting step S106 may be performed predetermined times or only once.

Embodiment 2

Figure 5:
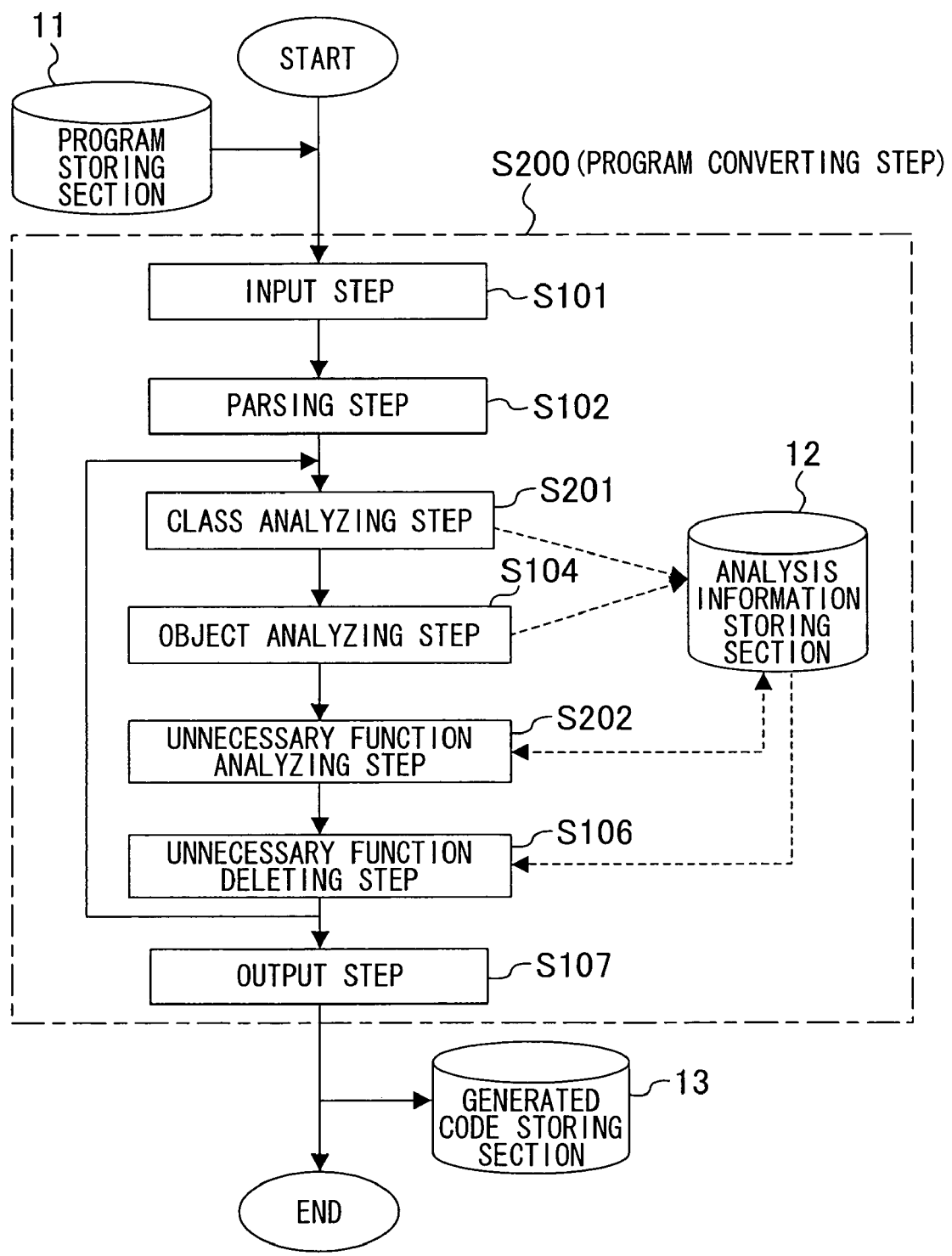
FIG. 5 is a flowchart showing a structure of a program converting step S200 according to a second embodiment.

Hereinafter, a method for converting a program executed by a compiler (not shown) according to a second embodiment of the present invention will be described with reference to the drawings. In this program converting method, a program in which processing has been written is input to the compiler and to make the compiler execute the processing. FIG. 5 is a flowchart showing a structure of a program converting step S200 according to the second embodiment.

As shown in FIG. 5, the program converting step S200 of this embodiment includes: an input step S101 of inputting a program to be converted; a parsing step S102 of parsing the program and generating a symbol table, a syntax tree and the like; a class analyzing step S201 of extracting information on classes included in the program, analyzing definitions of classes, storing an inheritance relationship among the classes in an analysis information storing section 12; an object analyzing step S104 of detecting classes whose objects are created out of the classes included in the program and of recoding the detection result in the analysis information storing section 12; an unnecessary function analyzing step S202 of receiving information held in the analysis information storing section 12, analyzing functions (unnecessary functions) regarding classes whose objects are not created and storing the result in the analysis information storing section 12; an unnecessary function deleting step S106 of receiving information held in the analysis information storing section 12 and deleting definitions of unnecessary functions; and an output step S107 of outputting a program from which the unnecessary functions have been deleted (hereinafter, referred to as an object program) to a generated code storing section 13. The class analyzing step S201 through the unnecessary function deleting step S106 are repeated until the output code becomes uniform.

In this embodiment, in the class analyzing step S201, information on classes included in the program is extracted and, in addition, class definitions are analyzed so that an inheritance relationship among the classes is recoded in the analysis information storing section 12. In the unnecessary function analyzing step S202, unnecessary functions are analyzed based on information on classes extracted in the class analyzing step S201 and the inheritance relationship among classes and information on classes analyzed in the object analyzing step S104 in the analysis information storing section 12, and the analysis result is held in the analysis information storing section 12.

Figure 8:
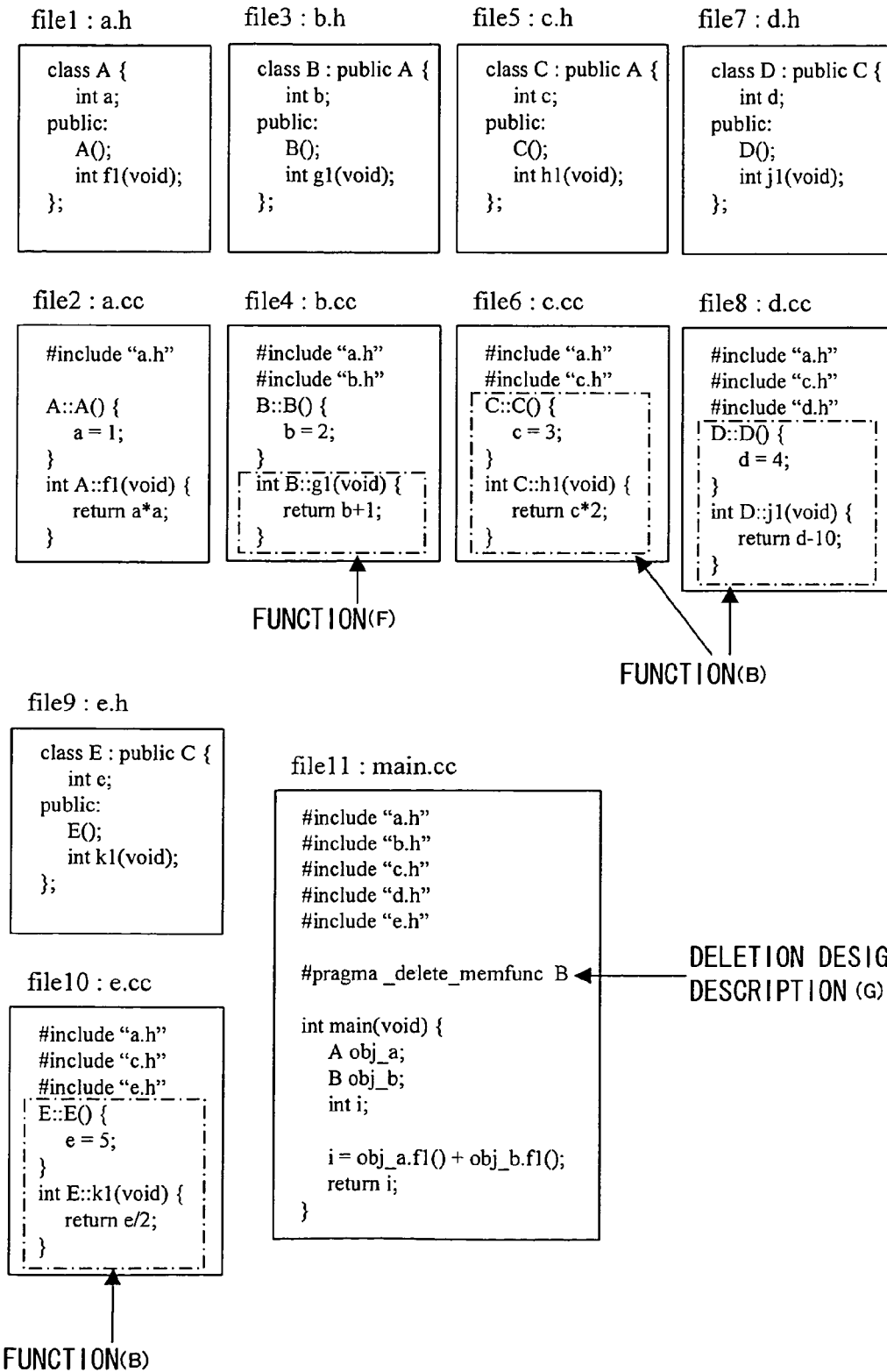
FIG. 8 shows an example of a program.

Now, operations in the input step S101 through the unnecessary function deleting step S106 will be described in detail with reference to an example of a program. Out of these steps, description of the steps already described in the first embodiment will be omitted. FIG. 8 shows en example of a program.

First, the input step S101 and the parsing step S102 are performed in the same manner as in the first embodiment.

Figure 6:
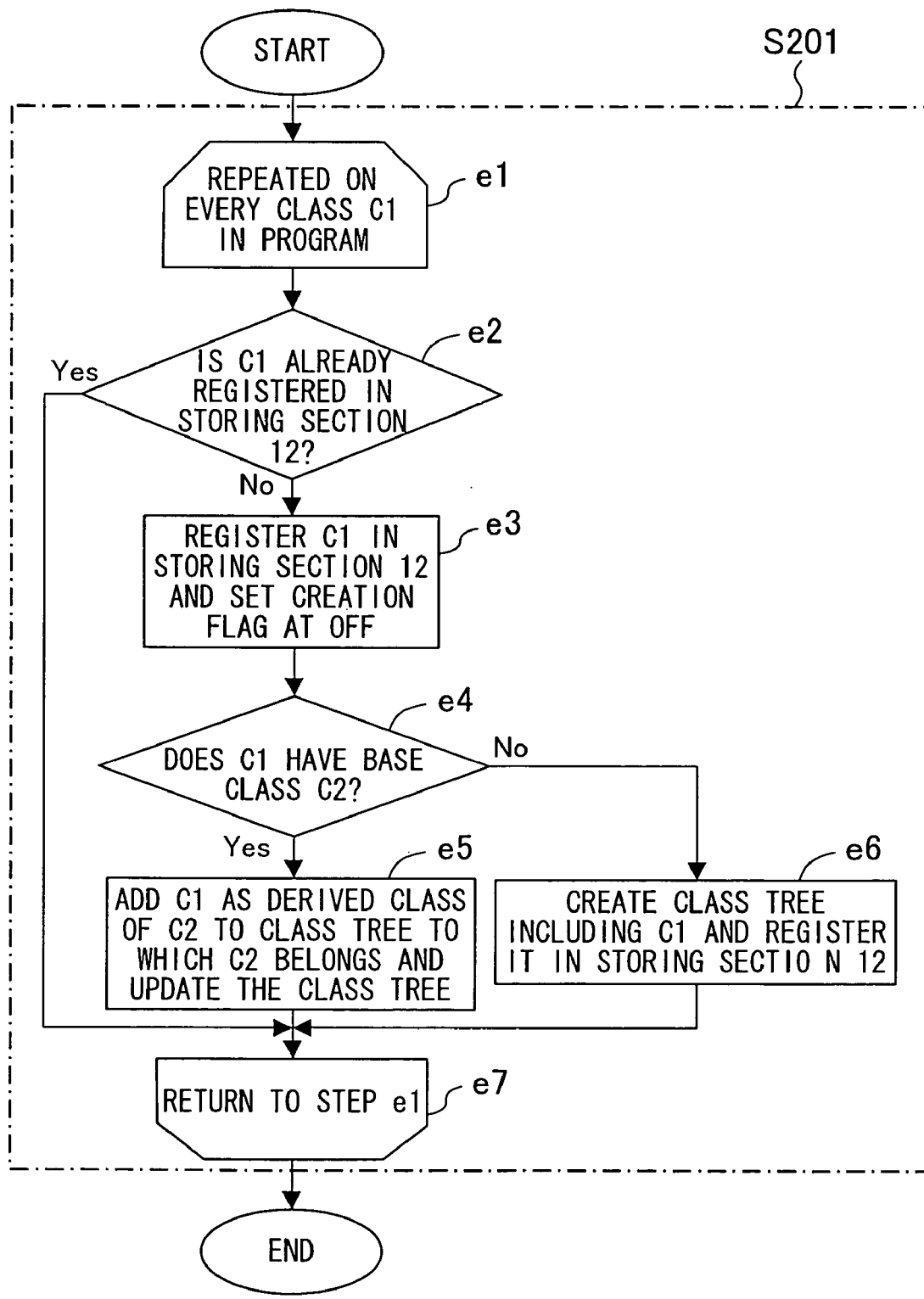
FIG. 6 is a flowchart showing a structure of a class analyzing step S201.

Then, operations in the class analyzing step S201 will be described with reference to FIG. 6. FIG. 6 is a flowchart showing a structure of the class analyzing step S201. As shown in FIG. 6, in the class analyzing step S201, the loop from step e1 through step e7 is repeatedly executed on every class C1 included in a program.

In the program shown in FIG. 8, class C1 is class A, class B, class C, class D and class E. According to the program shown in FIG. 8, in the class analyzing step S201, class A, for example, is extracted at step e1 and then, at step e2, it is determined whether class A has been already registered in the analysis information storing section 12 or not. At the first-time determination of class A, the determination result is No, and the process proceeds to step e3. At each of the subsequent determinations of class A, class A has been already registered in the analysis information storing section 12, so that the determination result is Yes and the process proceeds to step e7.

At step e3, class A is registered in the analysis information storing section 12, a creation flag associated with class A is initialized to be OFF, and then the process proceeds to step e4.

At step e4, it is determined whether class A includes base class C2 or not. As shown in FIG. 8, class A does not include a base class, so that the determination result at step e4 is No and the process proceeds to step e6.

At step e6, class tree Tr for class A is newly created and is held in the analysis information storing section 12, so that the process proceeds to step e7. A class tree is herein a tree showing an inheritance relationship among classes. The class tree Tr at this time includes only class A.

When the process proceeds to step e7, the loop from step e1 through step e7 is repeatedly executed on a class different from class A, e.g., class B in this case. As shown in FIG. 8, class B is derived from class A. That is, the base class of class B is class A. Accordingly, the determination result at step e4 is Yes and the process proceeds to step e5. At step e5, class B is added as a derived class to the class tree Tr including class A and held in the analysis information storing section 12, and the process proceeds to step e7.

Figures 9A, 9B, 9C, 10A, 10B, 10C, 10D, 10E:
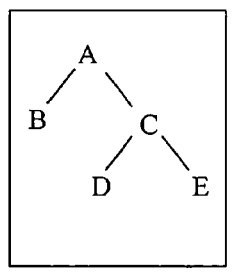
FIG. 9A is a table showing information on classes extracted in the class analyzing step S201.
FIG. 9B shows a class tree Tr including classes analyzed in the class analyzing step S201.
FIG. 9C is a table showing information on classes analyzed in the object analyzing step S104.
FIGS. 10A through 10E show changes in the state of a to-be-deleted function set S1.

Thereafter, the loop from step e1 through step e7 is repeatedly executed on classes C, D and E. In this case, as shown in FIG. 8, the base class of class C is class A and the base class of classes D and E is class C. Therefore, classes C, D and E are added to the class tree Tr in which the base class is class A at step e5. When the foregoing operations terminate, creation flags in the analysis information storing section 12 are in the respective states shown in FIG. 9A, and the class tree Tr in which the base class is class A is in the state shown in FIG. 9B. FIG. 9A is a table showing information on classes extracted in the class analyzing step S201. FIG. 9B shows the class tree Tr including classes analyzed in the class analyzing step S201.

Then, in the object analyzing step S104, an analysis is performed to find classes whose objects are created, in the same manner as in the first embodiment (shown in FIG. 2B). As a result, since objects of only classes A and B out of classes A through E are created, creation flags in the analysis information storing section 12 are in the respective states shown in FIG. 9C. FIG. 9C is a table showing information on classes analyzed in the object analyzing step S104.

Figure 7:
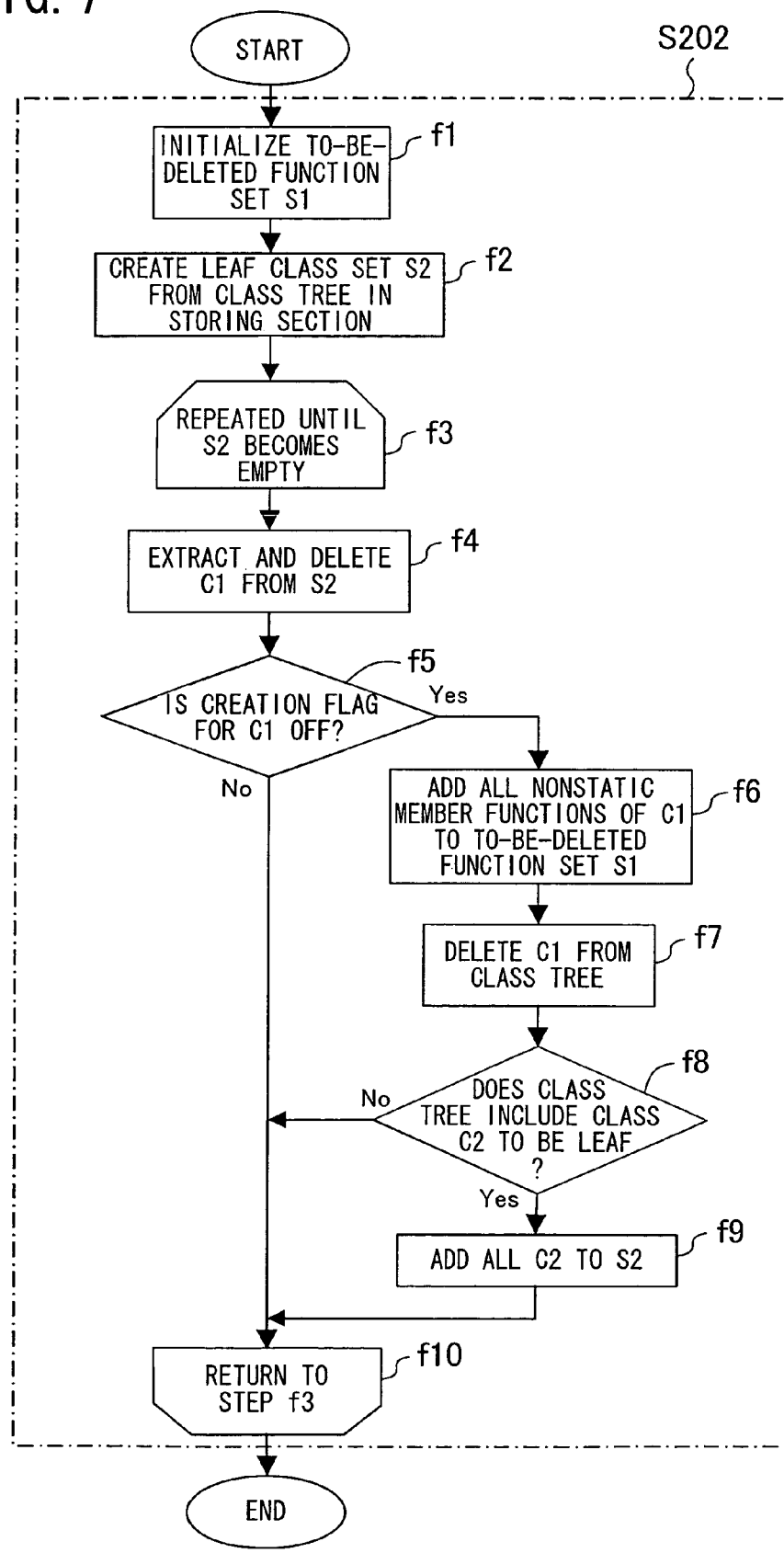
FIG. 7 is a flowchart showing a structure of an unnecessary function analyzing step S202.

Now, operations in the unnecessary function analyzing step S202 will be described with reference to FIGS. 7 and 8. FIG. 7 is a flowchart showing a structure of the unnecessary function analyzing step S202.

As shown in FIG. 7, in the unnecessary function analyzing step S202, first, a to-be-deleted function set S1 is initialized to be an empty set at step f1. Then, at step 12, a leaf class in the class tree Tr is added to a leaf class set S2. A leaf class is herein a class having no children (derived classes) in a class tree. In the class tree Tr shown in FIG. 9B, classes B, D and E are leaf classes. In this case, the to-be-deleted function set S1 and the leaf class set S2 are in the respective states shown in FIG. 10A. FIGS. 10A through 10E show changes in the states of the to-be-deleted function set S1 and the leaf class set S2. The loop from step f3 through step f10 is repeatedly executed on every class included in the leaf class set S2.

First, class B is extracted and is deleted from the leaf class set S2 at step f4. Then, at step f5, it is determined whether a creation flag for class B is OFF or not. As shown in FIG. 9C, the creation flag for class B is ON, so that the determination result is No and the process proceeds to step f10. At this time, the to-be-deleted function set S1 and the leaf class set S2 are in the respective states shown in FIG. 10B.

Next, the loop from step f3 through step f10 is repeatedly executed on another class, e.g., class D, included in the leaf class set S2. First, at step f4, class D is extracted and deleted from the leaf class set S2. Then, at step f5, since a creation flag for class D is OFF (shown in FIG. 9C), the process proceeds to step f6. At step f6, all the nonstatic member functions of class D are added to the to-be-deleted function set S1. At this time, the to-be-deleted function set S1 and the leaf class set S2 are in the respective states shown in FIG. 10C. At step f7, class D is deleted from the class tree Tr shown in FIG. 9B.

At step f8, it is determined whether or not the class tree Tr includes a class which has become a leaf. As shown in FIG. 9B, deletion of class D makes no class become a leaf, so that the determination result is No and the process proceeds to step f10.

Then, the loop from step f3 through step f10 is repeatedly executed on class E, which is the other class included in the leaf class set S2. First, at step f4, class E is extracted and deleted from the leaf class set S2. Then, at step f5, since a creation flag for class E is OFF (shown in FIG. 9C), the process proceeds to step f6. At step f6, all the nonstatic member functions of class E are added to the to-be-deleted function set S1. At step f7, class E is deleted from the class tree Tr shown in FIG. 9B.

At step f8, it is determined whether or not the class tree Tr includes a class which has become a leaf As shown in FIG. 9B, the deletion of class E causes class C to be a leaf class, so that the determination result is Yes and the process proceeds to step f9. At step f9, class C that has become a leaf is added to the leaf class set S2 and the process proceeds to step f10. At this time, the to-be-deleted function set S1 and the leaf class set S2 are in the respective states shown in FIG. 10D.

Thereafter, the loop from step f3 through step f10 is repeatedly executed on class C which has been newly added to the leaf class set S2.

First, class C is extracted and deleted from the leaf class set S2 at step f4. Then, at step f5, since a creation flag for class C is OFF (shown in FIG. 9C), the process proceeds to step f6. At step f6, all the nonstatic member functions of class C are added to the to-be-deleted function set S1. At step 17, class C is deleted from the class tree Tr shown in FIG. 9B.

At step f8, it is determined whether or not the class tree Tr includes a class which has become a leaf. As shown in FIG. 9B, the deletion of class C does not cause any class to be a leaf, so that the determination result is No and the process proceeds to step f10. At this time, the to-be-deleted function set S1 and the leaf class set S2 are in the respective states shown in FIG. 10E and the leaf class set S2 is an empty class. Accordingly, the process in the unnecessary function analyzing step S202 terminates.

After the foregoing steps, in the unnecessary function deleting step S106, function definitions included in the to-be-deleted function set S1 (e.g., function (B) shown in FIG. 8) are deleted in the same manner as in the first embodiment (shown in FIG. 2D)

In this embodiment, if classes in the program exhibit an inheritance relationship, the relationship is analyzed so that a class tree is created. Then, it is determined whether an object of a leaf class in the class tree is created or not. In this manner, a function regarding the leaf class is deleted. Then, it is determined whether the deletion of the leaf class causes a class to be a leaf or not and it is also determined whether an object of the class which has become a leaf is created or not. Accordingly, functions of the class which has become a leaf are also deleted. That is, classes which have become leaves during the analysis are deleted.

This embodiment enables an analysis in which an inheritance relationship is taken into consideration, so that deletable functions (i.e., capable of being deleted) and undeletable functions (i.e., incapable of being deleted) are appropriately distinguished and thereby functions are deleted more effectively. Accordingly, the code size is further reduced more easily than in conventional techniques.

In this embodiment, the class analyzing step S201 through the unnecessary function deleting step S106 are repeated until the output code becomes uniform. This ensures even deletion of functions which have become unnecessary by removing function definitions. Accordingly, a program is converted more effectively. Alternatively, according to the present invention, in order to reduce the time required for compiling, the series of operations from the class analyzing step S201 through the unnecessary function deleting step S106 may be performed predetermined times or only once.

Embodiment 3

Figure 11:
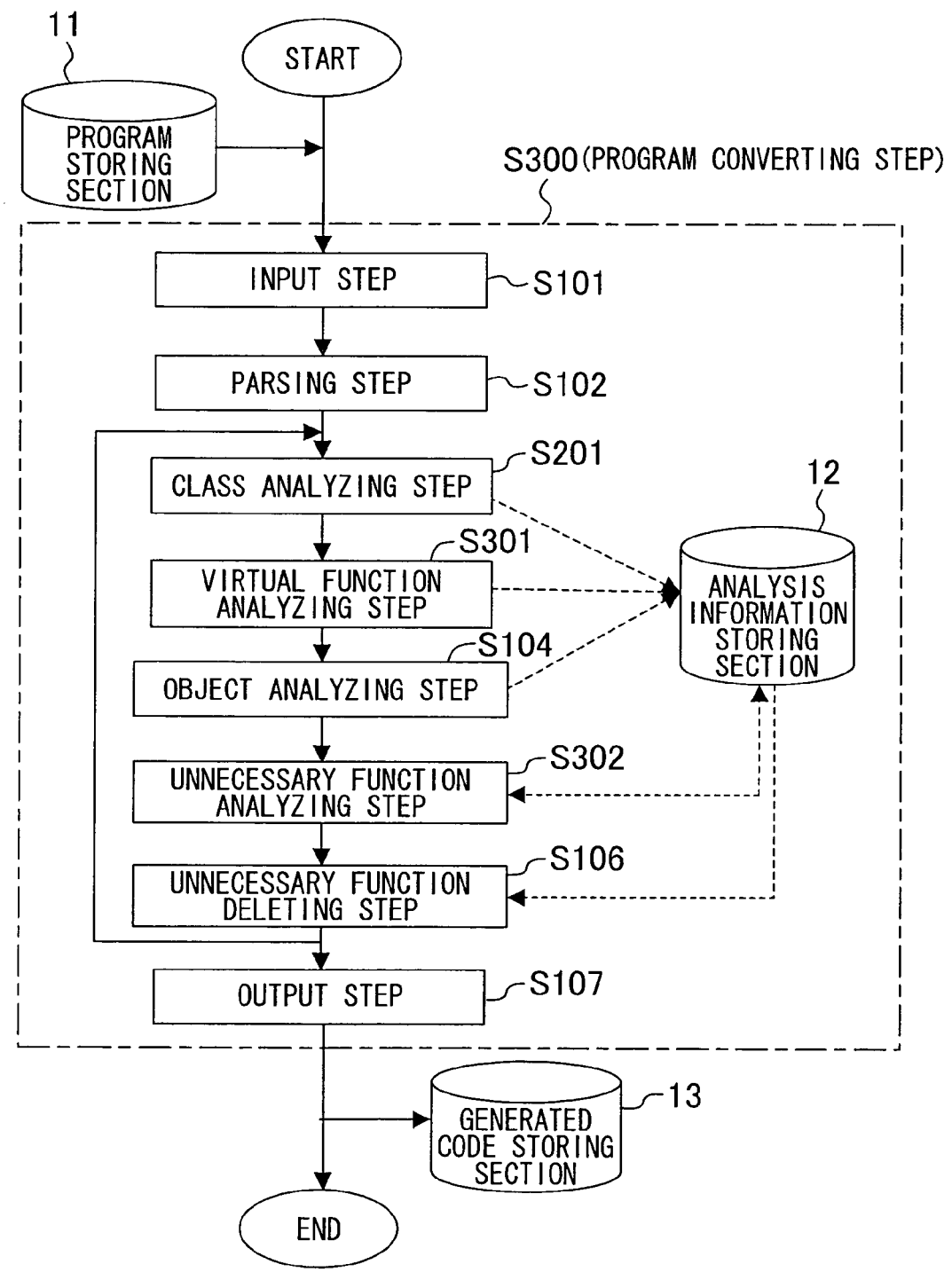
FIG. 11 is a flowchart showing a structure of a program converting step S300 according to a third embodiment.

Hereinafter, a method for converting a program executed by a compiler (not shown) according to a third embodiment of the present invention will be described with reference to the drawings. In this program converting method, a program in which processing has been written is input to the compiler to make the compiler execute the processing. FIG. 11 is a flowchart showing a structure of a program converting step S300 according to the third embodiment.

As shown in FIG. 11, the program converting step S300 of this embodiment includes: an input step S101 of inputting a program to be converted; a parsing step S102 of parsing the program and generating a symbol table, a syntax tree and the like; a class analyzing step S201 of extracting information on classes included in the program, extracting and analyzing a class definition and storing an inheritance relationship among the classes in an analysis information storing section 12; a virtual function analyzing step S301 of analyzing virtual functions; an object analyzing step S104 of detecting classes whose objects are created out of the classes included in the program and of recording the result in the analysis information storing section 12; an unnecessary function analyzing step S302 of receiving information held in the analysis information storing section 12, analyzing functions (unnecessary functions) regarding classes whose objects are not created and storing the result in the analysis information storing section 12; an unnecessary function deleting step S106 of receiving information held in the analysis information storing section 12 and deleting definitions of unnecessary functions; and an output step S107 of outputting a program from which the unnecessary functions have been deleted (hereinafter, referred to as an object program) to a generated code storing section 13. The class analyzing step S201 through the unnecessary function deleting step S106 are repeated until the output code becomes uniform.

In this embodiment, in the virtual function analyzing step S301, a virtual function of a class included in a program is analyzed. If the class is a derived class inheriting characteristics of another class, a virtual function of the derived class may or may not override a virtual function of its base class. In view of this, in the virtual function analyzing step S301, it is determined whether the virtual function of the derived class overrides the virtual function of the base class or not.

In the unnecessary function analyzing step S302, unnecessary functions are analyzed based on information from the analysis information storing section 12 obtained in the respective class analyzing step S201, virtual function analyzing step S301 and object analyzing step S104, and the analysis result is held in the analysis information storing section 12.

Now, operations in the input step S101 through the unnecessary function deleting step S106 will be described in detail with reference to an example of a program. Out of these steps, detailed description of the steps already described in the first or second embodiment will be omitted. FIG. 15 shows an example of a program.

First, the input step S101 and the parsing step S102 are performed in the same manner as in the first embodiment.

Figures 16A, 16B, 16C:
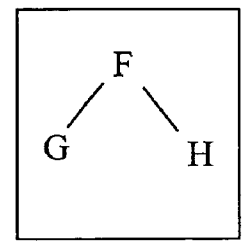
FIG. 16A is a table showing information on classes extracted in a class analyzing step S201.
FIG. 16B shows a class tree Tr including classes analyzed in the class analyzing step S201.
FIG. 16C is a table showing information on classes analyzed in an object analyzing step S104.

Then, in the class analyzing step S201, information on classes C1 included in a program and an inheritance relationship among these classes are analyzed in the same manner as in the second embodiment (shown in FIG. 6) and the analysis result is stored in the analysis information storing section 12. As a result, as shown in FIG. 16A, creation flags for class F, class G and class H in the analysis information storing section 12 are initialized to be OFF. In the program shown in FIG. 15, class G and class H are derived from class F, so that a class tree Tr whose base class is class F is in the state shown in FIG. 16B. FIG. 16A is a table showing information on classes extracted in the class analyzing step S201. FIG. 16B is a table showing the class tree Tr including classes to be analyzed in the class analyzing step S201.

Figure 12:
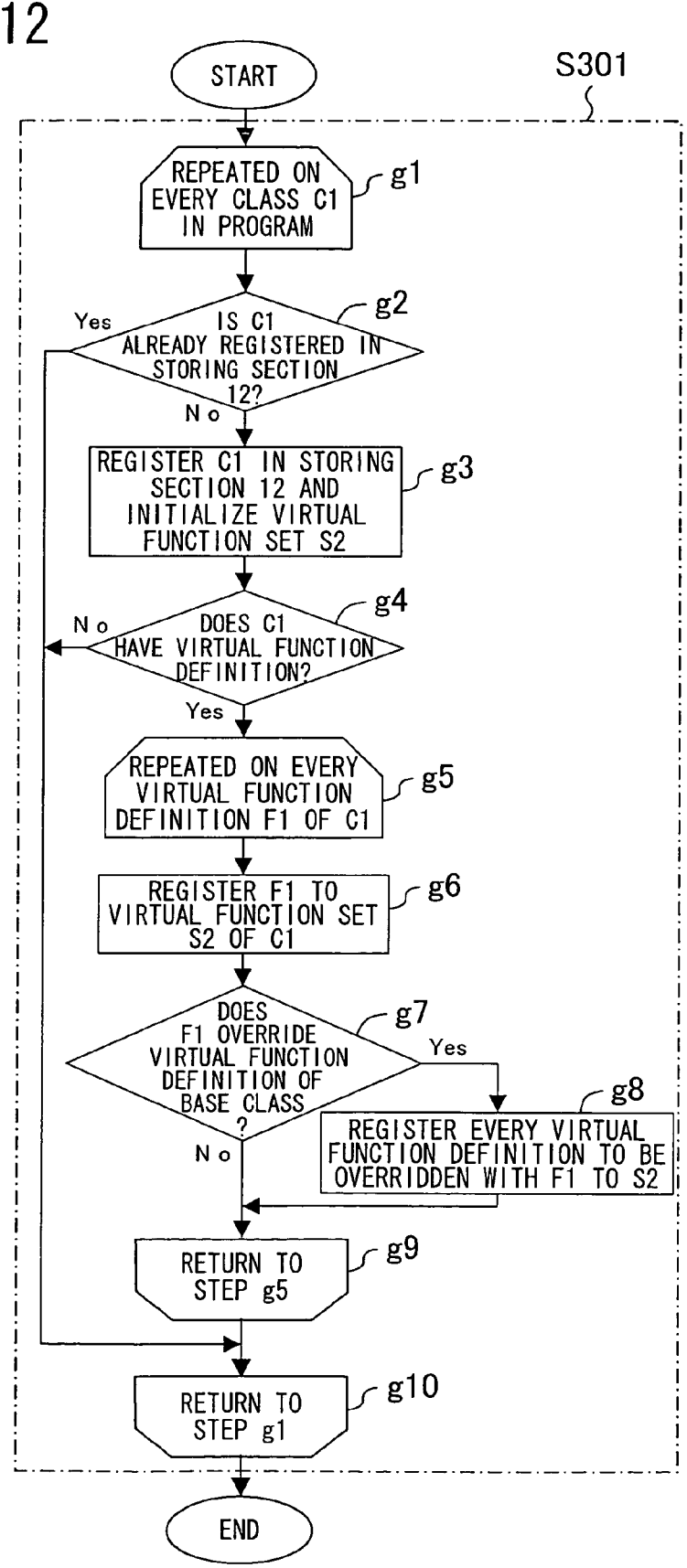
FIG. 12 is a flowchart showing a structure of a virtual function analyzing step S301.

Then, operations in the virtual function analyzing step S301 will be described with reference to FIGS. 12 and 15. FIG. 12 is a flowchart showing a structure of the virtual function analyzing step S301.

As shown in FIG. 12, in the virtual function analyzing step S301, the loop from step g1 through step g10 is repeatedly executed on every class C1 included in a program.

In the program shown in FIG. 15, class C1 is only classes F, G and H. According to the program shown in FIG. 15, in the virtual function analyzing step S301, class F, for example, is extracted at step g1 and then, at the step g2, it is determined whether class F has been already registered in the analysis information storing section 12 or not. At the first-time determination of class F, the determination result is No, and the process proceeds to step g3. At each of the subsequent determinations of class F, class F has been already registered in the analysis information storing section 12, so that the determination result is Yes and the process proceeds to step g10.

At step g3, information on class F is registered in a virtual function set S2. In addition, a virtual function definition set and a to-be-overridden virtual function definition set for class F in the virtual function set S2 are initialized to be empty sets. At this time, the virtual function set S2 has been stored in the analysis information storing section 12. Subsequently, at step g4, it is determined whether class F has a virtual function definition or not. As shown in FIG. 15, class F has a virtual function definition in this case, so that the determination result is Yes and the process proceeds to step g5.

Then, the loop from step g5 through step g9 is repeatedly executed on every virtual function definition F1 of class F.

At step g6, a virtual function definition "F:ml" included in class F is added to the virtual function definition set for class F in the virtual function set S2. At step g7, it is determined whether the virtual function definition "F:ml" overrides a virtual function definition of a base class or not. At this time, class F has no base class, so that the determination result is No and the process proceeds to step g9. Since class F does not have any other virtual function definitions, the process from steps g5 through g9 for class F terminates and the process proceeds to step g10.

Thereafter, the process from step g1 through step g9 is repeatedly performed on a class different from class F, e.g., class G. As shown in FIG. 15, class G has a virtual function definition, so that the determination result at step g4 is Yes and, at the step g6, a virtual function determination "G:ml" of class G is registered in the virtual function determination set in the virtual function set S2. In addition, the base class of class G is class F as shown in FIG. 16B, so that a virtual function definition of class G overrides a virtual function definition of class F. Accordingly, the determination result at step g7 is Yes and the process proceeds to step g8. At step g8, a virtual function definition "F:ml" which is to be overridden with the virtual function definition "G:ml" is recorded in the to-be-overridden virtual function definition set in the virtual function set S2.

Thereafter, the process from steps g1 through step g9 is repeatedly performed on class H. Since class H has a virtual function definition as shown in FIG. 15, the determination result at step g4 is Yes and, at step g6, a virtual function determination "H:ml" of class H is registered in the virtual function definition set in the virtual function set S2. In addition, the base class of class H is class F as shown in FIG. 16B, so that a virtual function definition of class H overrides a virtual function of class F. Accordingly, the determination result at step g7 is Yes and the process proceeds to step g8. At step g8, a virtual function definition ("F:ml") which is to be overridden with the virtual function definition "H:ml" is recorded in the to-be-overridden virtual function definition set in the virtual function set S2. Through the foregoing operations, the virtual function definition sets and the to-be-overridden virtual function definition sets for respective classes F, G and H are in the states shown in FIG. 17A. FIGS. 17A through 17D respectively show the states of the virtual function set S2.

Then, in the object analyzing step S104, classes whose objects are created are analyzed in the same manner as in the first embodiment (shown in FIG. 2B). Out of classes F, G and H, objects only of classes G and H are created, so that creation flags in the analysis information storing section 12 are in the states shown in FIG. 16C. FIG. 16C is a table showing information on classes analyzed in the object analyzing step S104.

Figure 13:
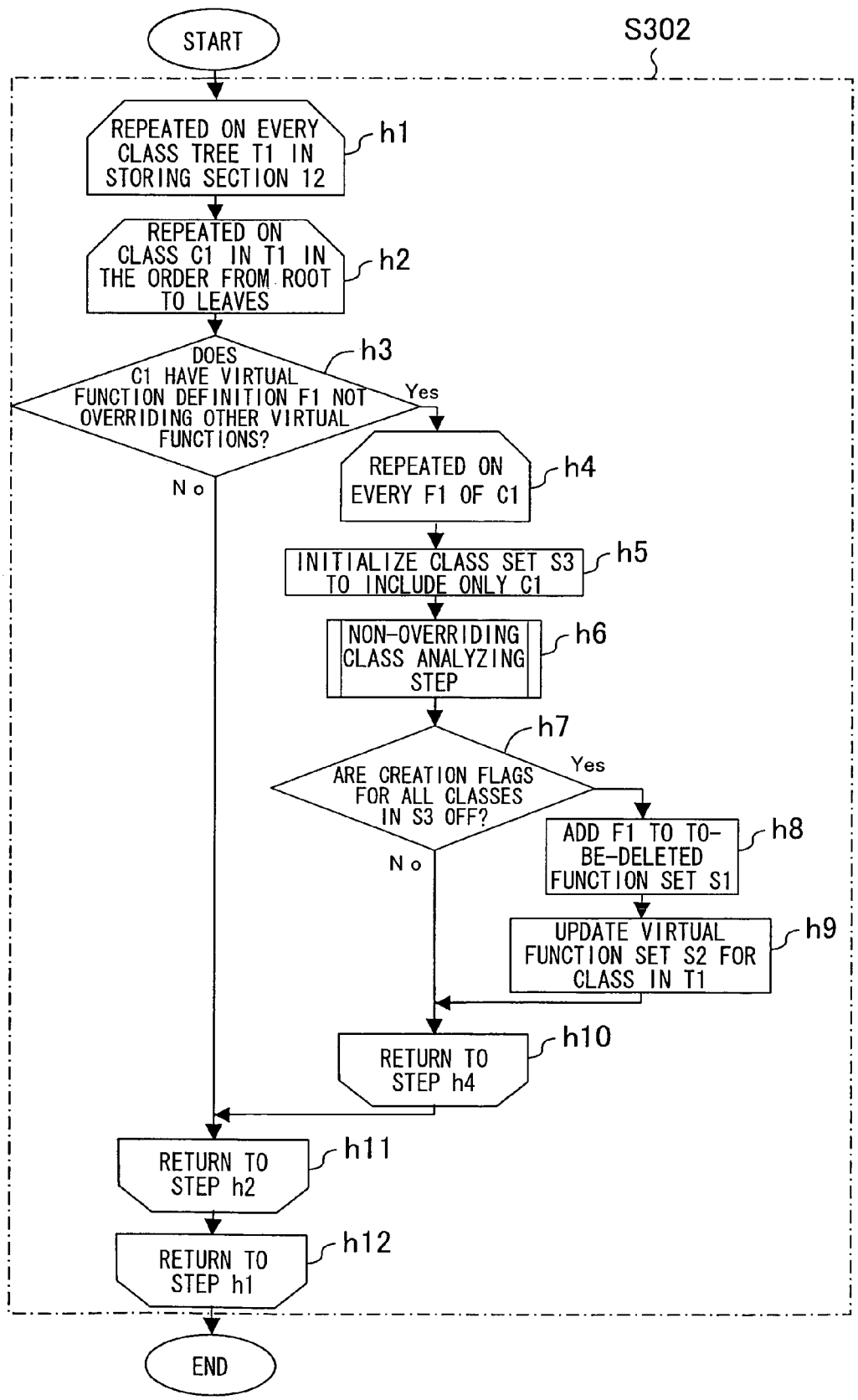
FIG. 13 is a flowchart showing a structure of an unnecessary function analyzing step S302.
Figure 14:
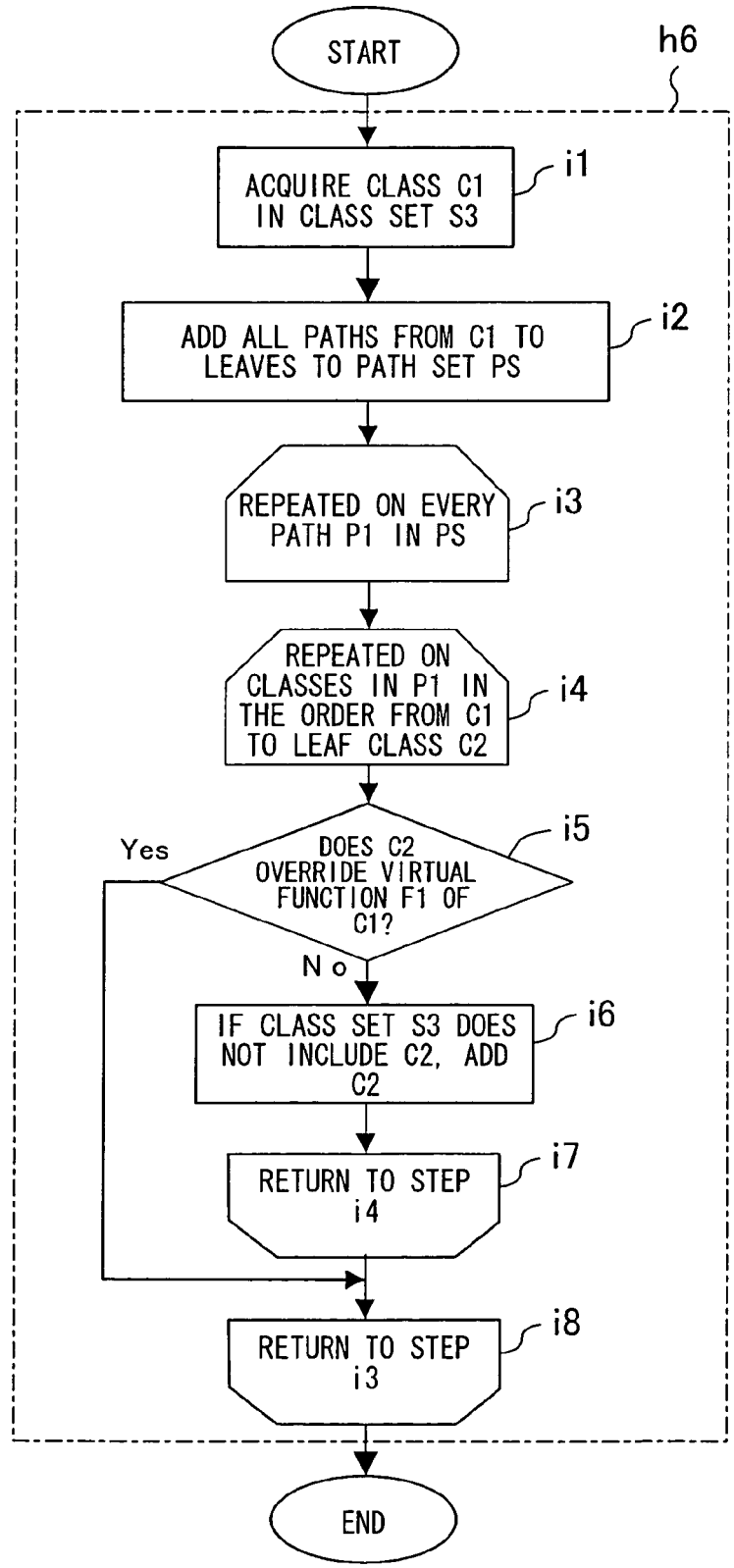
FIG. 14 is a flowchart showing a structure of step h6 of the unnecessary function analyzing step S302.

Now, operations in the unnecessary function analyzing step S302 will be described with reference to FIGS. 13, 14 and 17A through 17D. FIG. 13 is a flowchart showing a structure of the unnecessary function analyzing step S302. FIG. 14 is a flowchart showing a structure of step h6 in the unnecessary function analyzing step S302.

As shown in FIG. 13, in the unnecessary function analyzing step S302, the loop from step h1 through step h12 is repeatedly executed on every class tree T1 stored in the analysis information storing section 12.

In the program shown in FIG. 15, only the class tree Tr shown in FIG. 16B is a class tree T1. The class tree Tr is extracted at step h1, and then, at step h2, the loop from step h2 through step h11 is repeatedly executed on classes included in the class tree Tr in the order from a root class to leaf classes. Specifically, class F, which is a root class, is processed and then classes G and H, which are leaf classes, are processed.

In the case where step h3 is performed on class F, it is determined whether or not class F has a virtual function definition which does not override other virtual function definitions. As shown in FIG. 17A, class F has "F:ml" as a virtual function definition and a to-be-overridden virtual function definition set for class F is an empty set, so that it is determined that "F:ml" does not override other virtual function definitions. Accordingly, the determination result is Yes and the process proceeds to step h4.

Then, the loop from step h4 through step h10 is repeatedly executed on every virtual function definition of class F. Class F has only the virtual function definition "F:ml", so that "F:ml" is processed.

At step h5, a class set S3 in the analysis information storing section 12 is initialized to include only class F. At this time, as shown in FIG. 17E, only class F is included in the class set S3. FIGS. 17E through 17H show changes in the states of the class set S3 and a to-be-deleted function set S1. At step h6, non-overriding classes are analyzed. This process will be described later.

At step h7, it is examined whether creation flags for all the classes included in the class set S3 are OFF or not. As shown in FIG. 16C, the class set S3 includes only class F and the creation flag for class F is OFF. Accordingly, the determination result is Yes and the process proceeds to step h8.

At step h8, the virtual function definition "F:ml" of class F is added to the to-be-deleted function set S1. At this time, the class set S3 and the to-be-deleted function set S1 are in the states shown in FIG. 17F.

At step h9, as shown in FIG. 17B, information regarding the virtual function definition "F:ml" is deleted from the virtual function set S2. At this time, as the information regarding the virtual function definition "F:ml", "F:ml" stored in the virtual function definition set and "F:ml" stored in the to-be-overridden virtual function definition set are deleted. Thereafter, the process proceeds to step h10. Since class F does not include any virtual function definition other than "F:ml", the loop from step h4 through step h10 for class F terminates.

Subsequently, the process returns from step h11 to step h2, and the loop from step h2 through step h11 is repeatedly executed on classes G and H which are leaves in the class tree Tr.

In the case where class G is processed, it is determined whether or not class G has a virtual function definition which does not override other virtual function definitions. At this time, the to-be-overridden virtual function definition set for class G is an empty set as shown in FIG. 17B, so that the determination result is Yes and the process proceeds to step h4. At step h5, the class set S3 is initialized to include only class G. At step h7, the creation flag for class G is ON as shown in FIG. 16C, so that the determination result is No and the process proceeds to step h10. At this time, the virtual function set S2 remains in the previous state as shown in FIG. 17C and the class set S3 and the to-be-deleted function set S1 are in the respective states shown in FIG. 17G. When the process from step h2 through step h11 on class G terminates, the same process is performed on class H. As a result, the virtual function set S2 remains in the previous state as shown in FIG. 17D and the class set S3 and the to-be-deleted function set S1 are in the respective states shown in FIG. 17H.

Then, operations in step h6 (non-overriding class analyzing step) in the unnecessary function analyzing step S302 will be described with reference to FIG. 14. FIG. 14 is a flowchart showing a structure of step h6 of the unnecessary function analyzing step S302.

Classes F, G and H are processed in this step. In the following description, a process on class F is taken as an example.

As shown in FIG. 14, first, classes stored in the class set S3 are acquired at step i1. When class F is processed, the class set S3 includes only class F as shown in FIG. 17E, so that class F is acquired. At step i2, all the paths P1 extending from class F to leaf classes are added to a path set PS (not shown). Class F is included in the class tree Tr (shown in FIG. 16B) and the leaf classes are classes G and H, so that a path "FG" from class F to class G and a path "FH" from class F to class H are included in the path set PS.

Next, the loop from step i3 through step i8 is repeatedly executed on every path P1 included in the path set PS. When the path "FG" is processed, the process from step i4 to step i7 is repeatedly performed on class F and class G in this order.

In the case where step i5 is performed on class F, the determination result is No and the process proceeds to step i6. At the step i6, if class F is not included in the class set S3, class F is added thereto. However, the class F is already included in the class set S3 in this case as shown in FIG. 17E, so that the state remains unchanged.

In the case where step i5 is performed on class G, the to-be-overridden virtual function definition set for class G at this time already includes "F:ml" (shown in FIG. 17B), so that the determination result at step i5 is Yes and the process from step i5 through step i7 terminates. Thereafter, the process proceeds to step i8.

When the process returns from step i8 through step i3, a path other than the path "FG" in the path set PS, i.e., "FH", is processed in the same manner. Accordingly, the non-overriding class analyzing step h6 on class F terminates.

Thereafter, in the unnecessary function deleting step S106 shown in FIG. 11, the bodies of functions registered in the to-be-deleted function set S1 are deleted in the same manner as in the first embodiment (shown in FIG. 2D). In the program shown in FIG. 15, the function definition shown as function (C) is deleted.

In this embodiment, if classes exhibit an inheritance relationship, this relationship is analyzed so that a class tree is created. Then, in a case where at least one of virtual functions of a derived class in the class tree does not override a virtual function of its base class, if objects of both the derived class and the base class are not created, the virtual function of the base class is deleted.

On the other hand, in a case where all the virtual functions of derived classes in the class tree override virtual functions of the base class, if an object of the base class is not created, the virtual functions of the base class are deleted. The determination of this deletion is irrelevant to whether the objects of the derived classes are created or not.

In this manner, in a program including a virtual function, deletable functions and undeletable functions are also distinguished appropriately, so that functions are deleted more effectively. Accordingly, the code size is further reduced more easily than in conventional techniques.

In this embodiment, the class analyzing step S201 through the unnecessary function deleting step S106 are repeated until the output code becomes uniform. This ensures even deletion of functions which have become unnecessary by removing function definitions. Accordingly, a program is converted more effectively. Alternatively, according to the present invention, in order to reduce the time required for compiling, the series of operations from the class analyzing step S201 through the unnecessary function deleting step S106 may be performed predetermined times or only once.

Embodiment 4

Figure 18:
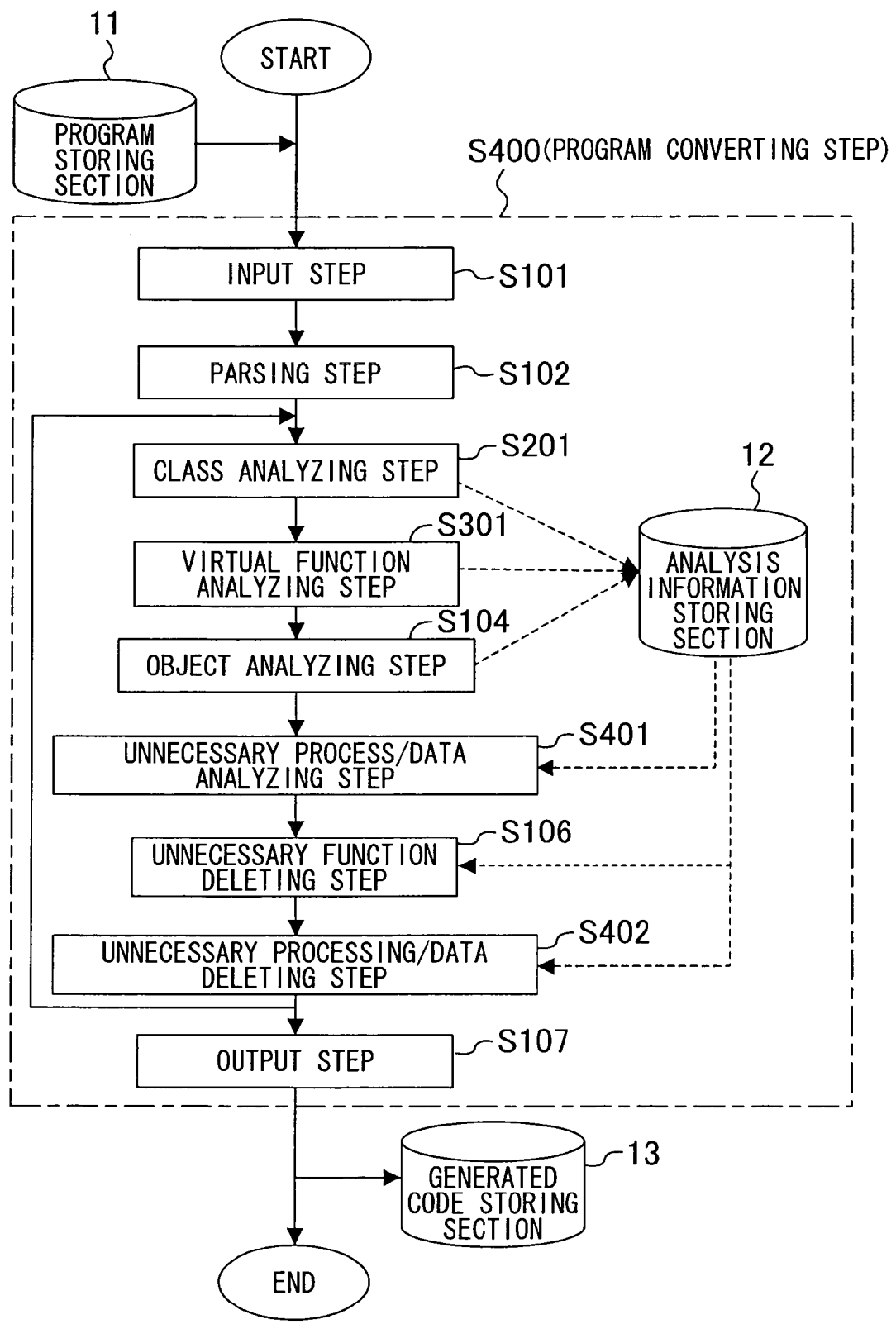
FIG. 18 is a flowchart showing a structure of a program converting step S400 according to a fourth embodiment.

Hereinafter, a method for converting a program executed by a compiler (not shown) according to a fourth embodiment of the present invention will be described with reference to the drawings. In this program converting method, a program in which processing has been written is input to the compiler to make the compiler execute the processing. FIG. 18 is a flowchart showing a structure of a program converting step S400 according to the fourth embodiment.

As shown in FIG. 18, the program converting step S400 of this embodiment includes: an input step S101 of inputting a program to be converted; a parsing step S102 of parsing the program and generating a symbol table, a syntax tree and the like; a class analyzing step S201 of extracting information on classes included in the program, analyzing class definitions and storing an inheritance relationship among the classes in an analysis information storing section 12; a virtual function analyzing step S301 of analyzing virtual functions; an object analyzing step S104 of detecting classes whose objects are created out of the classes included in the program and of recording the result in the analysis information storing section 12; an unnecessary process/data analyzing step S401 of receiving information held in the analysis information storing section 12, analyzing unnecessary functions, extracting classes including the unnecessary functions and storing the result in the analysis information storing section 12; an unnecessary function deleting step S106 of receiving information held in the analysis information storing section 12 and deleting definitions of the unnecessary functions; an unnecessary process/data deleting step S402 of deleting an unnecessary process and unnecessary data from analysis information stored in the analysis information storing section 12; and an output step S107 of outputting a program from which the unnecessary process and data have been deleted (hereinafter, referred to as an object program) to a generated code storing section 13. The class analyzing step S201 through the unnecessary process/data deleting step S402 are repeated until the output code becomes uniform.

In this embodiment, in the unnecessary process/data analyzing step S401, unnecessary functions are analyzed in the same manner as in the third embodiment and, in addition, classes whose virtual function definitions are determined to be deletable are extracted.

In the unnecessary process/data deleting step S402, a virtual function table for a class whose virtual function definitions are all determined to be deletable is deleted and the associated address setting process is also deleted.

Now, operations in the input step S101 through the unnecessary process/data deleting step S402 will be described in detail with reference to an example of a program. Out of these steps, description of the steps already described in the first through third embodiments will be omitted. To show the example of a program, FIG. 15 used in the third embodiment is referred to again. Regarding the information to be stored in the analysis information storing section 12, FIGS. 16 and 17 used in the third embodiment are referred to again.

First, the input step S101 and the parsing step S102 are performed in the same manner as in the first embodiment.

Next, in the class analyzing step S201, information on classes included in a program and an inheritance relationship among the classes are analyzed in the same manner as in the second embodiment (shown in FIG. 6), and the analysis result is stored in the analysis information storing section 12. As a result, as shown in FIG. 16A, creation flags for class F, class G and class H in the analysis information storing section 12 are initialized to be OFF. In the program shown in FIG. 15, classes G and H are derived from class F, so that a class tree Tr whose base class is class F is in the sate shown in FIG. 16B.

Then, in the virtual function analyzing step S301, virtual function definitions and virtual function definitions to be overridden are analyzed in the same manner as in the third embodiment (shown in FIG. 12), and the analysis result is stored in the analysis information storing section 12. As a result, virtual function definition sets and to-be-overridden virtual function definition sets are in the states shown in FIG. 17A.

Thereafter, in the object analyzing step S104, classes whose objects are created are analyzed in the same manner as in the first embodiment (shown in FIG. 2B). Out of classes F, G and H, objects only of classes G and H are created, so that creation flags in the analysis information storing section 12 are in the states shown in FIG. 16C.

Figure 19:
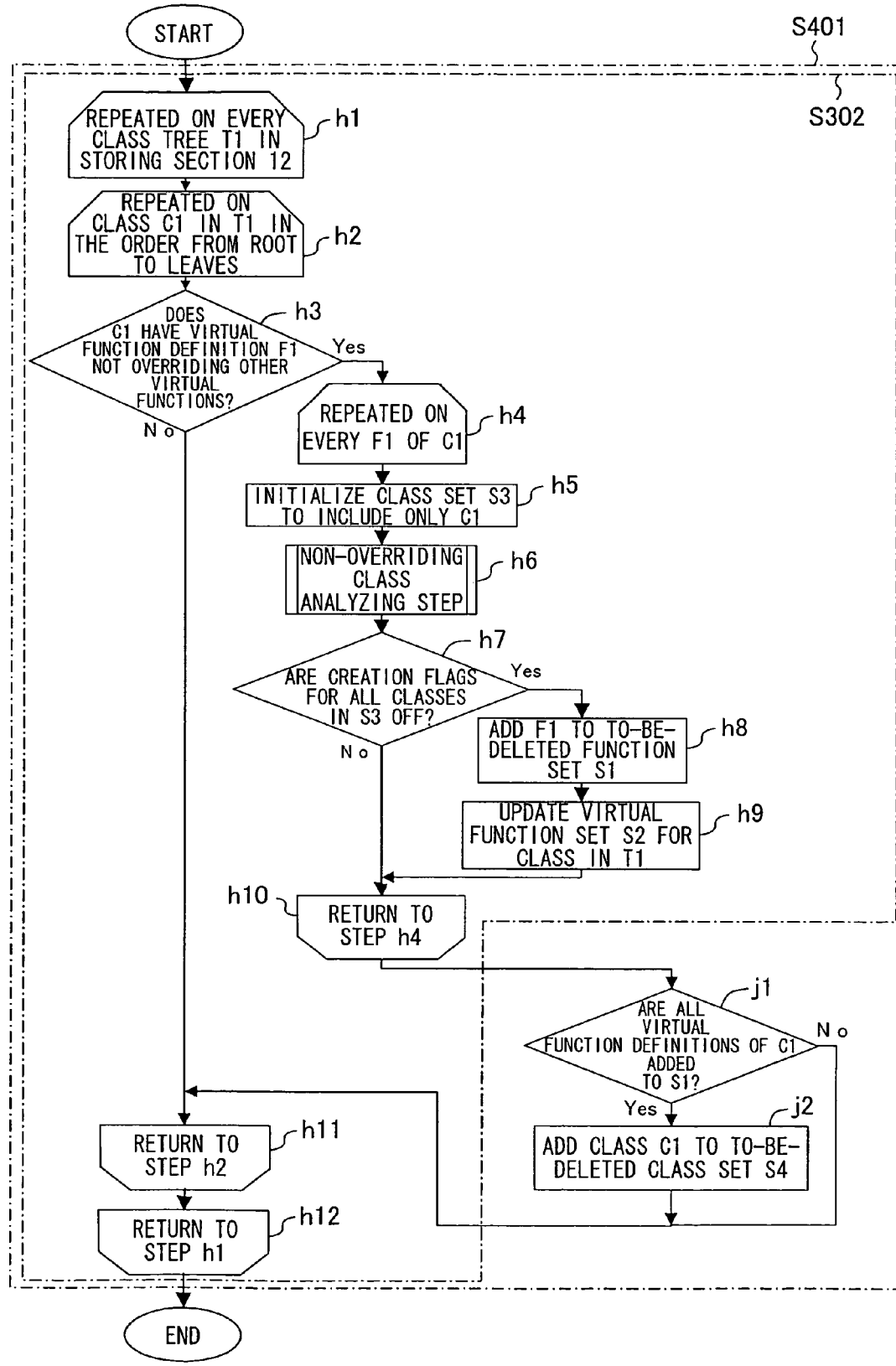
FIG. 19 is a flowchart showing a structure of an unnecessary process/data analyzing step S401.

Now, operations in the unnecessary process/data analyzing step S401 will be described with reference to FIG. 19. FIG. 19 is a flowchart showing a structure of the unnecessary process/data analyzing step S401.

As shown in FIG. 19, in the unnecessary process/data analyzing step S401, steps h1 through h12 and steps j1 and j2 are performed.

Out of these steps, descriptions of steps h1 through h12, which have been already described in the third embodiment, will be omitted and steps j1 and j2 will be described. In the program shown in FIG. 15, steps j1 and j2 are performed on class F, which is a root class, and then on classes G and H, which are leaf classes, in this order.

First, when step j1 is performed on class F, a virtual function definition "F:ml" of class F has been already added to a to-be-deleted function set S1 as shown in FIG. 17F. Accordingly, the determination result at step j1 is Yes and the process proceeds to step j2. At step j2, as shown in FIG. 21A, class F is added to a to-be-deleted class set S4 and the process proceeds to step h11. The to-be-deleted class set S4 is held in the analysis information storing section 12. FIG. 21A shows a state of the to-be-deleted class set S4.

Next, when step j1 is performed on class G, no virtual function definition of class G has been added as shown in FIG. 17G. Accordingly, the determination result at step j1 is No and the process proceeds to step h11. The same process is also performed on class H.

Figure 20:
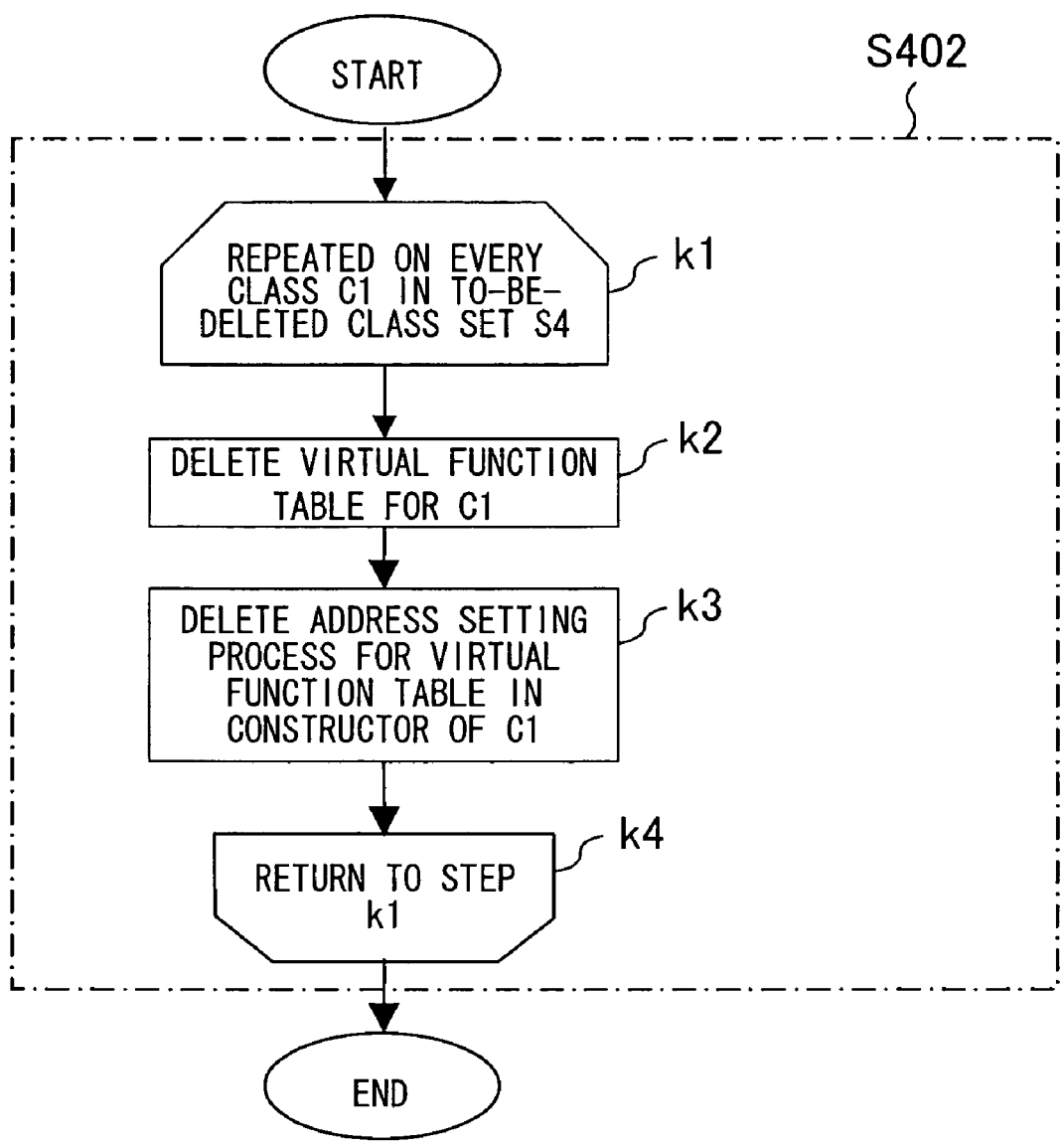
FIG. 20 is a flowchart showing a structure of an unnecessary process/data deleting step S402.

Now, operations in the unnecessary process/data deleting step S402 will be described with reference to FIG. 20. FIG. 20 is a flowchart showing a structure of the unnecessary process/data deleting step S402.

As shown in FIG. 20, in the unnecessary process/data deleting step S402, the loop from step k1 through step k4 is repeated.

At step k1, class F included in the to-be-deleted class set S4 is extracted and then, at step k2, data (D) on a virtual function table for class F as shown in FIG. 21B is deleted. FIG. 21B shows a virtual function table for class F. Then, at step k3, a process (E) for class F out of address setting processes for virtual function tables is deleted from a constructor as shown in FIG. 21C. FIG. 21C shows the address setting process on the virtual function table for class F. Subsequently, the process proceeds to step k4 and then to the output step S107 shown in FIG. 18.

In this embodiment, the same effects as in the third embodiment are obtained. In addition, the data (D) automatically generated by a compiler and the process (E) are deleted. The deletion of the process of setting addresses allows generation of smaller-size code at a smaller number of execution steps.

In this embodiment, the class analyzing step S201 through the unnecessary process/data deleting step S402 are repeated until the output code becomes uniform. This ensures even deletion of functions which have become unnecessary by removing function definitions. Accordingly, a program is converted more effectively. Alternatively, according to the present invention, in order to reduce the time required for compiling, the series of operations from the class analyzing step S201 through the unnecessary function deleting step S106 may be performed predetermined times or only once.

Embodiment 5

Figure 22:
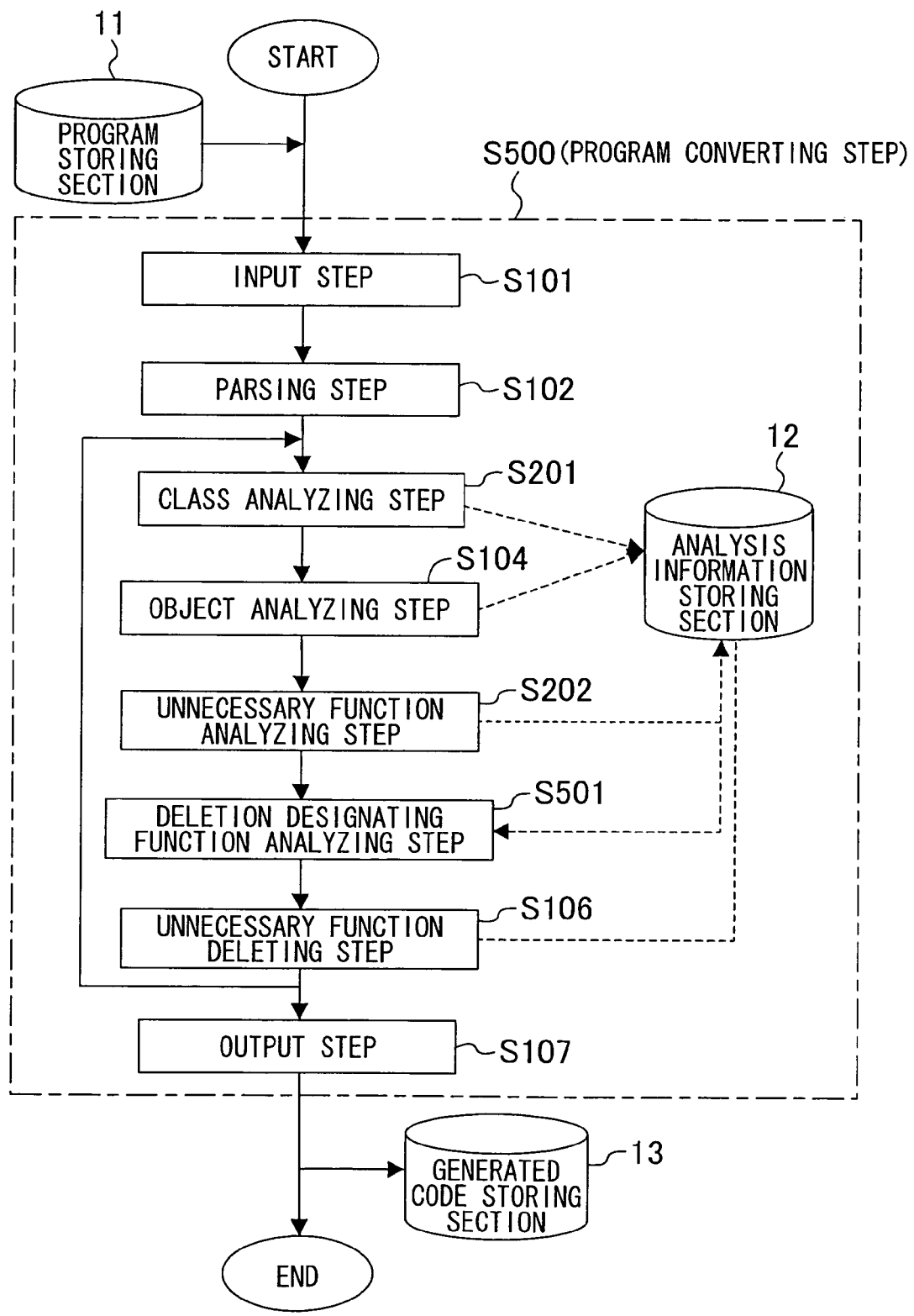
FIG. 22 is a flowchart showing a structure of a program converting step S500 according to a fifth embodiment.

Hereinafter, a method for converting a program executed by a compiler (not shown) according to a fifth embodiment of the present invention will be described with reference to the drawings. In this program converting method, a program in which processing has been written is input to the compiler to make the compiler execute the processing. FIG. 22 is a flowchart showing a structure of a program converting step S500 according to the fifth embodiment.

As shown in FIG. 22, the program converting step S500 of this embodiment includes: an input step S101 of inputting a program to be converted; a parsing step S102 of parsing the program and generating a symbol table, a syntax tree and the like; a class analyzing step S201 of extracting information on classes included in the program, analyzing class definitions and storing an inheritance relationship among the classes in an analysis information storing section 12; an object analyzing step S104 of detecting classes whose objects are created out of the classes included in the program and of recording the result in the analysis information storing section 12; an unnecessary function analyzing step S202 of receiving information held in the analysis information storing section 12, analyzing functions (unnecessary functions) regarding classes whose objects are not created and storing the result in the analysis information storing section 12; a deletion-designated function analyzing step S501 of analyzing functions of classes designated as classes to be deleted; an unnecessary function deleting step S106 of receiving information held in the analysis information storing section 12 and deleting definitions of the unnecessary functions; and an output step S107 of outputting a program from which the unnecessary functions have been deleted (hereinafter, referred to as an object program) to a generated code storing section 13. The class analyzing step S201 through the unnecessary function deleting step S106 are repeated until the output code becomes uniform.

Now, operations in the input step S101 through the unnecessary function deleting step S106 will be described in detail with reference to an example of a program. Out of these steps, detailed description of the steps already described in the first or second embodiment will be omitted. To show the example of a program, FIG. 8 used in the second embodiment is referred to again.

First, in the input step S101, all the programs stored in a program storing section 11 are sequentially input. In this case, if a function to be deleted is designated by a command line option, the option is recognized and the designated function is stored. For example, if a user designates the deletion of class B by a command line option, the option is described as "-delete_memfunc=B". This option is recognized and a function of class B is stored.

Next, in the parsing step S102, the program received from the input step S101 is parsed so that a symbol table, a syntax tree and the like are generated, and the result is sent to the class analyzing step S201. At this time, if the user designates a function to be deleted using a deletion designating description in the program, the deletion designating description is recognized and the designated function is stored. In the program shown in FIG. 8, the user designates the deletion of a nonstatic member function of class B by deletion designating description (G), and this function is stored.

In the class analyzing step S201, information on classes included in the program and an inheritance relationship among the classes are analyzed in the same manner as in the second embodiment (shown in FIG. 6) and the analysis result is stored in the analysis information storing section 12. As a result, creation flags for classes A through E and a class tree Tr are in the respective states shown in FIGS. 9A and 9B used in the second embodiment.

Then, in the object analyzing step S104, classes whose objects are created are analyzed in the same manner as in the first embodiment (shown in FIG. 2B). As a result, the creation flags for classes A through E are in the states shown in FIG. 9C used in the second embodiment.

Thereafter, in the unnecessary function analyzing step S202, unnecessary functions are analyzed in the same manner as in the second embodiment (shown in FIG. 7). As a result, functions of classes C, D and E are stored in a to-be-deleted function set S1 as shown in FIG. 24A. Functions similar to those shown in FIG. 10E are stored in the to-be-deleted function set S1 shown in FIG. 24A. FIGS. 24A and 24B show changes in the state of the to-be-deleted function set.

Figure 23:
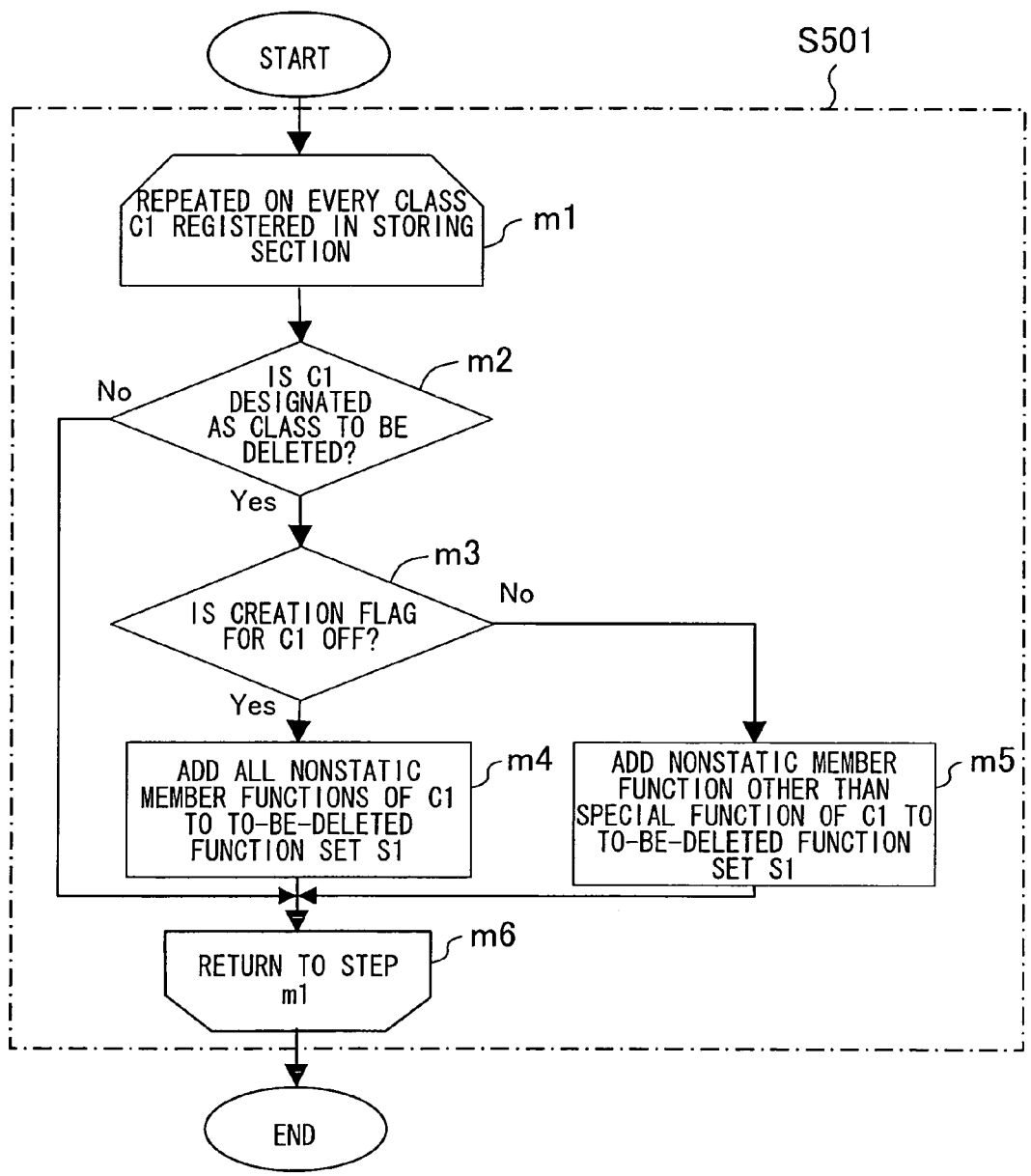
FIG. 23 is a flowchart showing a structure of a deletion-designated function analyzing step S501.

Now, operations in the deletion-designated function analyzing step S501 will be described with reference to FIG. 23. FIG. 23 is a flowchart showing a structure of the deletion-designated function analyzing step S501.

As shown in FIG. 23, in the deletion-designated function analyzing step S501, the loop from step m1 through step m6 is repeatedly executed on every class C1 held in the analysis information storing section 12.

In the program shown in FIG. 8, class C1 is classes A through E. According to the program shown in FIG. 8, in the deletion-designated function analyzing step S501, class A, for example, is extracted at step m1, and it is determined whether or not class A is designated as a class to be deleted, at step m2. As shown in a file "main.cc" shown in FIG. 8, class B is designated as a class to be deleted by the deletion designating description (G) and class A is not designated as a class to be deleted, so that the determination result is No and the process proceeds to step m6.

When the process returns from step m6 to step m1, class B is then extracted and it is determined whether or not class B is designated as a class to be deleted. As shown in the file "main.cc" in FIG. 8, class B is designated as a class to be deleted, so that the determination result is Yes and the process proceeds to step m3.

At step m3, it is determined whether a creation flag for class B is OFF or not. Since the creation flag for class B is ON (shown in FIG. 9C used in the second embodiment), the determination result is No and the process proceeds to step m5.

At step m5, out of the functions of class B, nonstatic member functions except for special functions such as a constructor and an assignment operator are added to the to-be-deleted function set S1. In this case, special functions are not added to the to-be-deleted function set S1 because an object of class B is to be created and therefore a constructor for creating the object is needed. Specifically, as shown in FIG. 24B, a nonstatic member function "B::gl" of class B except for special functions thereof is added to the to-be-deleted function set S1. Thereafter, the process proceeds to step m6.

At step m3, if the creation flag for class B is OFF, the determination result is Yes and the process proceeds to step m4. At step m4, all the nonstatic member functions of class B are added to the to-be-deleted function set S1. Subsequently, the process proceeds to step m6.

When the process returns from step m6 to step m1, the same process is performed on classes C through E. Since classes C through E are not designated as classes to be deleted, the determination result at step m2 is No, so that functions of classes C through E are not added to the to-be-deleted function set S1.

Then, in the unnecessary function deleting step S106, function definitions included in the to-be-deleted function set S1 are deleted in the same manner as in the first embodiment (shown in FIG. 2D). Through the foregoing processes, not only function (B) shown in FIG. 8 but also function (F), which is not determined to be automatically deletable in the second embodiment, is deleted.

In this embodiment, the same effects as in the second embodiment are obtained. In addition, functions of classes designated as classes to be deleted by a user are deleted. In this case, if an object of a class designated as a class to be deleted is created, special functions are not deleted. Accordingly, the code size is reduced more effectively.

In this embodiment, if an object of a class designated as a class to be deleted is created, special functions of this class are not added to the to-be-deleted function set S1 but is left at step m5. Alternatively, according to the present invention, out of special functions, an assignment operator may be deleted with only a constructor necessary for creating an object left.

In this embodiment, the class analyzing step S201 through the unnecessary process/data deleting step S402 are repeated until the output code becomes uniform. This ensures even deletion of functions which have become unnecessary by removing function definitions. Accordingly, a program is converted more effectively. Alternatively, according to the present invention, in order to reduce the time required for compiling, the series of operations from the class analyzing step S201 through the unnecessary function deleting step S106 may be performed predetermined times or only once.

Embodiment 6

Figure 25:
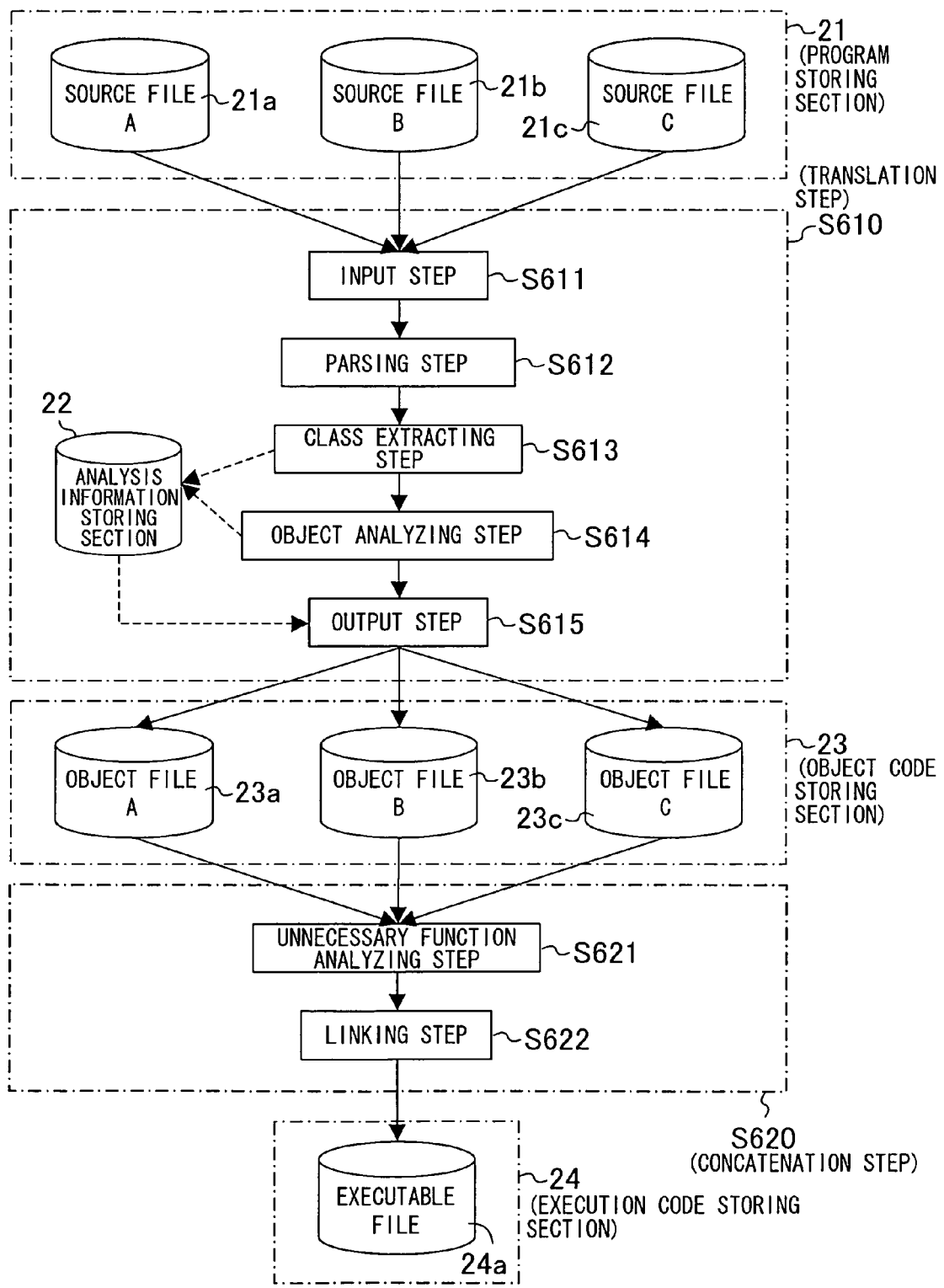
FIG. 25 is a flowchart showing structures of a translation step S610 and a concatenation step S620 and a storing section for holding information generated in steps S610 and S620 according to a sixth embodiment.

Hereinafter, a method for converting a program executed by a compiler (not shown) according to a sixth embodiment of the present invention will be described with reference to the drawings. In this program converting method, a program in which processing has been written is input to the compiler to make the compiler execute the processing. FIG. 25 is a flowchart showing structures of a translation step S610 and a concatenation step S620 and a storing section for holding information generated in steps S610 and S620 according to the sixth embodiment.

As shown in FIG. 25, according to this embodiment, a program held in a program storing section 21 is translated in the translation step S610, and object code is generated and held in an object code storing section 23. The object code is subjected to a linking process in the concatenation step S620 and then held in an execution code storing section 24.

The object code storing section 21 holds a program to be converted by dividing it into source files 21a, 21b and 21c.

The translation step S610 includes: an input step S611 of inputting a program to be converted; a parsing step S612 of parsing the program and generating a symbol table, a syntax tree and the like; a class extracting step S613 of recording, in an analysis information storing section 22, information on classes included in the program; an object analyzing step S614 of detecting classes whose objects are created out of the classes included in the program and of recording the result in the analysis information storing section 22; and an output step S615 of outputting, as object code, a program converted through the foregoing steps and analysis information stored in the analysis information storing section 22 to a generated code storing section 23.

The object code storing section 23 holds object code by dividing it into object files 23a, 23b and 23c.

The concatenation step S620 includes: an unnecessary function analyzing step S621 of reading the object files 23a through 23c stored in the object code storing section 23 and extracting analysis information from the object files 23a through 23c to analyze unnecessary functions; and a linking step S622 of linking only necessary code or data using the analysis result obtained at the unnecessary function analyzing step S621 and outputting the linked code or data to the execution code storing section 24.

The execution code storing section 24 stores, as an executable file 24a, execution code concatenated in the concatenation step S620.

Now, operations at the respective steps in the translation step S610 and the concatenation step S620 will be described in further detail with reference to an example of a program. To show the example of a program, FIG. 3 used in the first embodiment is referred to again.

First, when the translation step S610 is initiated, the input step S611 and the parsing step S612 are performed. There steps are not principal features of the present invention, and thus detailed description thereof will be omitted.

Figure 26B:
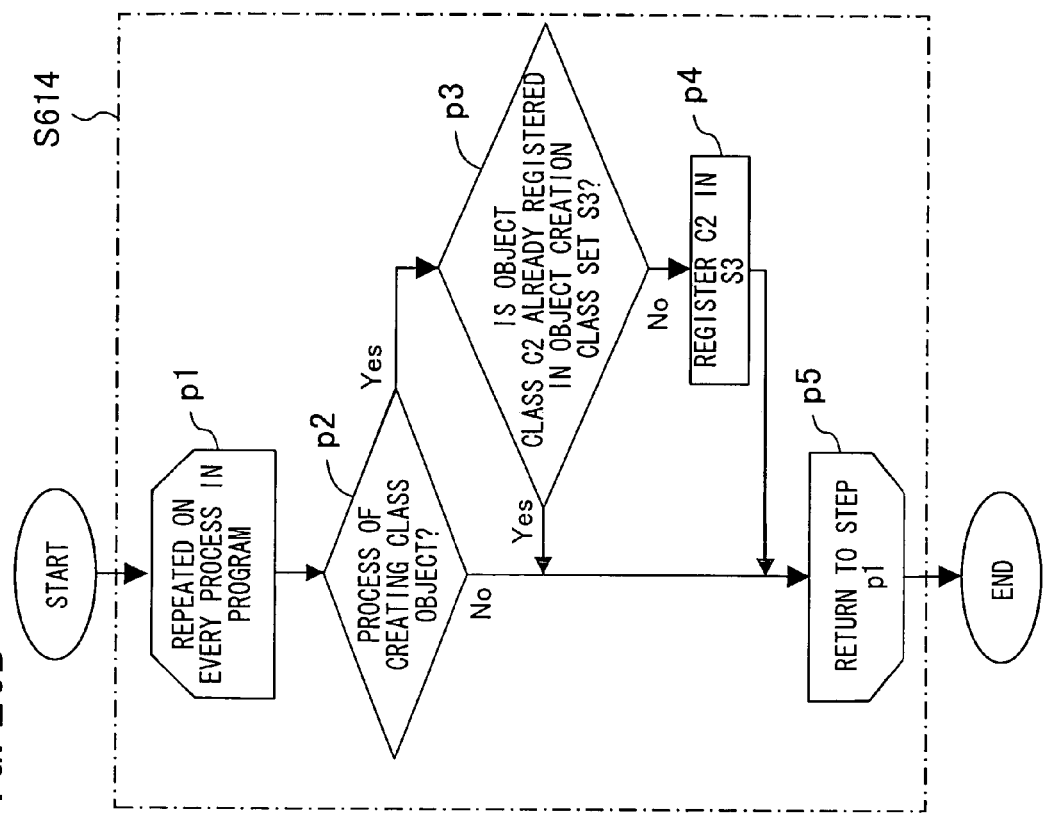
FIG. 26B is a flowchart showing a structure of an object analyzing step S614.
Figure 26A:
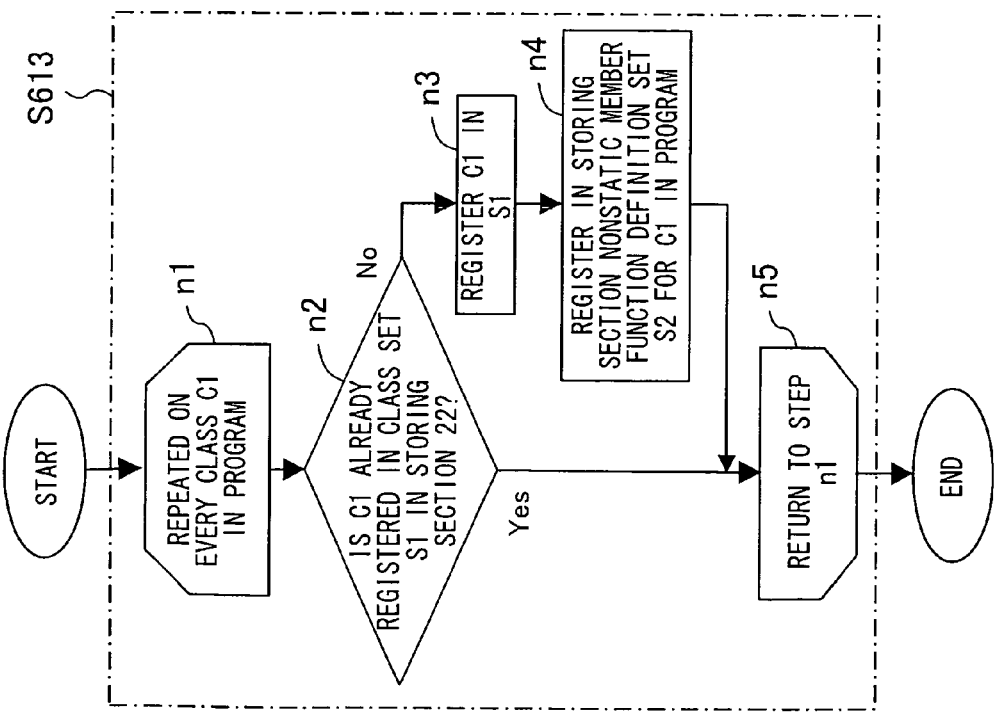
FIG. 26A is a flowchart showing a structure of a class extracting step S613.

Next, the class extracting step S613 will be described with reference to FIG. 26A. FIG. 26A is a flowchart showing a structure of the class extracting step S613.

As shown in FIG. 26A, in the class extracting step S613, the loop from step n1 through step n5 is repeatedly executed on every class C1 included in the program analyzed in the parsing step S612.

In the program shown in FIG. 3, when a file "a.cc", for example, is processed, class A included in the file "a.cc" is extracted at step n1 and, at step n2, it is determined whether class A has been already registered in the analysis information storing section 22 or not. At the first-time determination of class A, the determination result is No, and the process proceeds to step n3. At each of the subsequent determinations of class A, the class A has been already registered in the analysis information storing section 22, so that the determination result is Yes and the process proceeds to step n5.

At step n3, class A is registered in a class set S1 in the analysis information storing section 22, and then the process proceeds to step n4.

At step n4, all the nonstatic member function definitions of class A are detected and registered in a member function definition set S2 in the analysis information storing section 22. Specifically, nonstatic member functions "A::A( )", "A::f(void)" and "A::g(int)" of class A in the file "a.cc" are registered in the member function definition set S2. Thereafter, the process returns from step n5 to step n1.

Then, the class extracting step S613 is performed on a file "b.cc", and the same process is performed on class B. Thereafter, the class extracting step S613 is performed on a file "main.cc", and the same process is performed on classes A and B.

Now, operations in the object analyzing step S614 will be described with reference to FIG. 26B. FIG. 26B is a flowchart showing a structure of the object analyzing step S614.

As shown in FIG. 26B, in the object analyzing step S614, the loop from step p1 through step p5 is repeatedly executed on a process included in the program.

Examples of processes to be analyzed in the program shown in FIG. 3 include a statement "a=1;" in the file "a.cc". When the object analyzing step S614 is performed on the file "a.cc", the statement "a=1;", for example, is extracted at step p1, and whether a class object is created or not by the statement "a=1;" is determined at step p2. Since no class object is created by the statement "a=1;", the determination result is No and the process proceeds to step p5.

When the process proceeds to step p5, the loop from step p1 through step p5 is repeatedly executed on another process included in the program. The file "b.cc" in the program shown in FIG. 3 does not include a process of creating an object. On the other hand, the file "main.cc" includes a statement "B obj_b;" of creating an object, so that the determination result of this statement at step p2 is Yes and the process proceeds to step p3.

At step p3, it is determined whether or not class B whose object is created by the statement "B obj_b;" has been already registered in an object creation class set S3 in the analysis information storing section 22. At the first-time determination of class B, the determination result is No, and the process proceeds to step p4. At each of the subsequent determinations of class B, class B has been already registered in the analysis information storing section 22, so that the determination result is Yes and the process proceeds to step p5.

At step p4, class B is registered in the object creation class set S3 in the analysis information storing section 22 and the process proceeds to step p5.

As a result of these analyses, analysis information on the files "a.cc", "b.cc" and "main.cc" in the analysis information storing section 22 are in the state shown in FIGS. 28A through 28C, respectively. FIGS. 28A through 28C show analysis data stored in the analysis information storing section 22 with respect to files "a.cc", "b.cc" and "main.cc", respectively.

Then, in the output step S615, a result of conversion of the program and analysis data stored in the analysis information storing section 22 are output to the object code storing section 23. The object code storing section 23 holds the conversion result and analysis information with respect to the files "a.cc", "b.cc" and "main.cc" as files "a.obj", "b.obj" and "main.obj".

Figure 27:
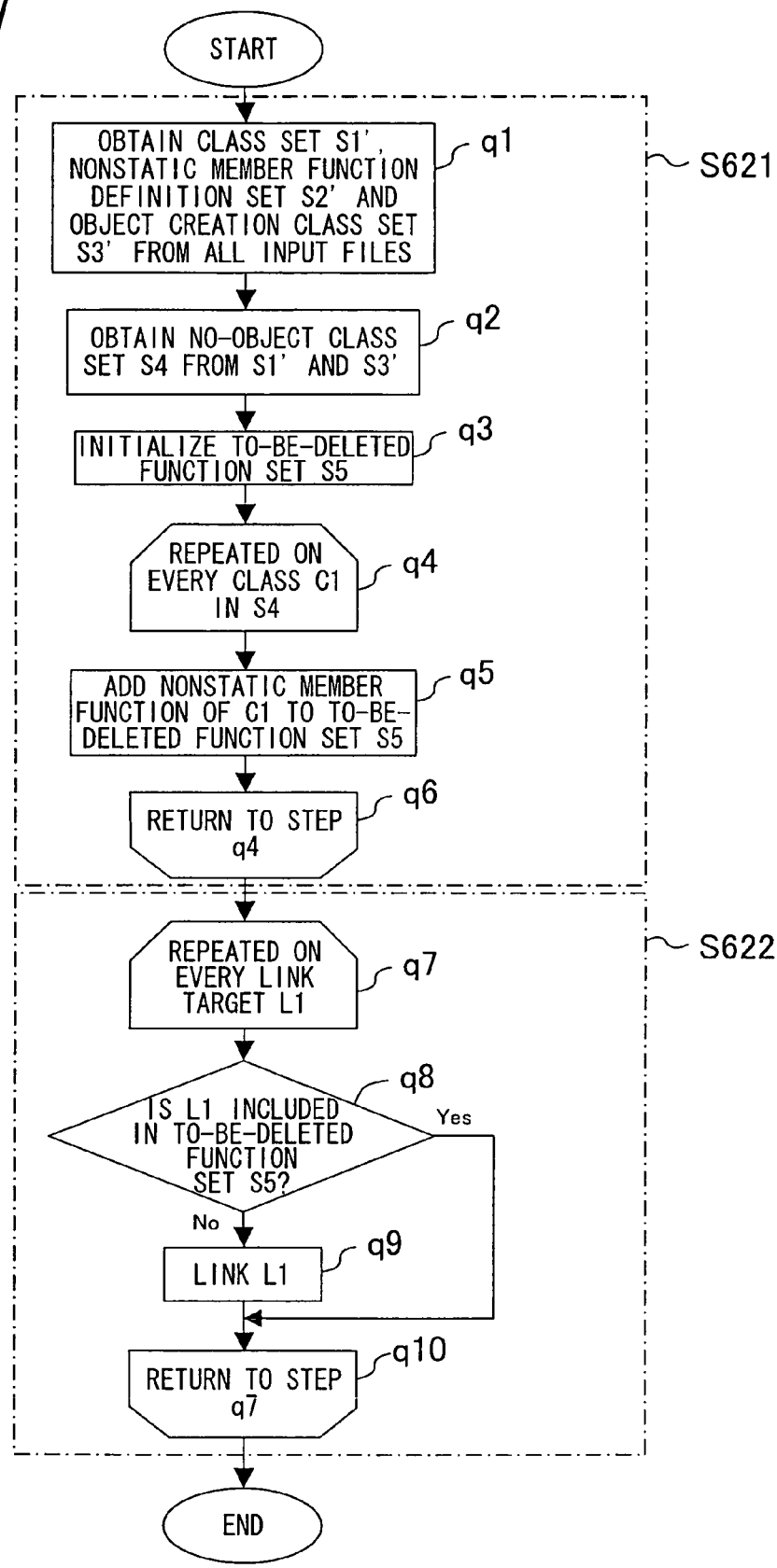
FIG. 27 is a flowchart showing structures of an unnecessary function analyzing step S621 and a linking step S622 in the concatenation step S620.

Now, the concatenation step S620 will be described with reference to FIG. 27. FIG. 27 is a flowchart showing structures of the unnecessary function analyzing step S621 and the linking step S622 in the concatenation step S620.

As shown in FIG. 27, in the unnecessary function analyzing step S621, a class set S1', a nonstatic member function definition set S2' and an object creation class set S3' are obtained at step q1 based on the analysis information held in the object code storing section 23. Accordingly, the class sets S1, the nonstatic member function definition sets S2 and the object creation class sets S3, each of which were separately held in the respective files, are united as the class set S1', the nonstatic member function definition set S2' and the object creation class set S3', respectively, as shown in FIG. 28D. FIG. 28D shows an analysis result in the unnecessary function analyzing step S621.

At step q2, as shown in FIG. 28D, class A, which is a class out of classes A and B included in the class set S1' except for class B included in the object creation class set S3' is registered in a no-object class set S4. Thereafter, the process proceeds to step q3 and an unnecessary function set S5 is initiated to be an empty set.

Then, the loop from step q4 through step q6 is repeatedly executed on every class included in the no-object class set S4.

In a process performed on class A, at step q5, all the nonstatic member functions of class A are acquired from the nonstatic member function definition set S2' shown in FIG. 28D and added to the unnecessary function set S5. Subsequently, the process proceeds to step q6. The no-object class set S4 includes only class A, so that the process from step q4 through step q6 terminates.

Thereafter, when the process proceeds to the linking step S622, the process from step q7 through step q10 is repeatedly performed on all the link targets L1 in the program.

After step q7 has been performed on the program shown in FIG. 3, at step q8, if "A::A( )", for example, is a link target, it is determined whether "A::A( )" is a function included in the unnecessary function set S5 or not. Since "A::A( )" is included in the unnecessary function set S5, the process proceeds to step q10. "A::f(void)" and "A::g(int)" are also included in the unnecessary function set S5, so that the same process is performed.

In this case, if a nonstatic member function such as "B:B( )" which is not included in the unnecessary function set S5 is a link target, the determination result at step q8 is No and the process proceeds to step q9. In such a case, at step q9, a general linking process is performed on "B:B( )" and the process proceeds to step q10. The result of this process is output to the execution code storing section 24.

In this embodiment, it is determined whether or not each of the classes in the program includes a process of creating an object, thus ensuring deletion of unnecessary functions. Accordingly, the code size is further reduced more easily than in conventional techniques.

Embodiment 7

Figure 29:
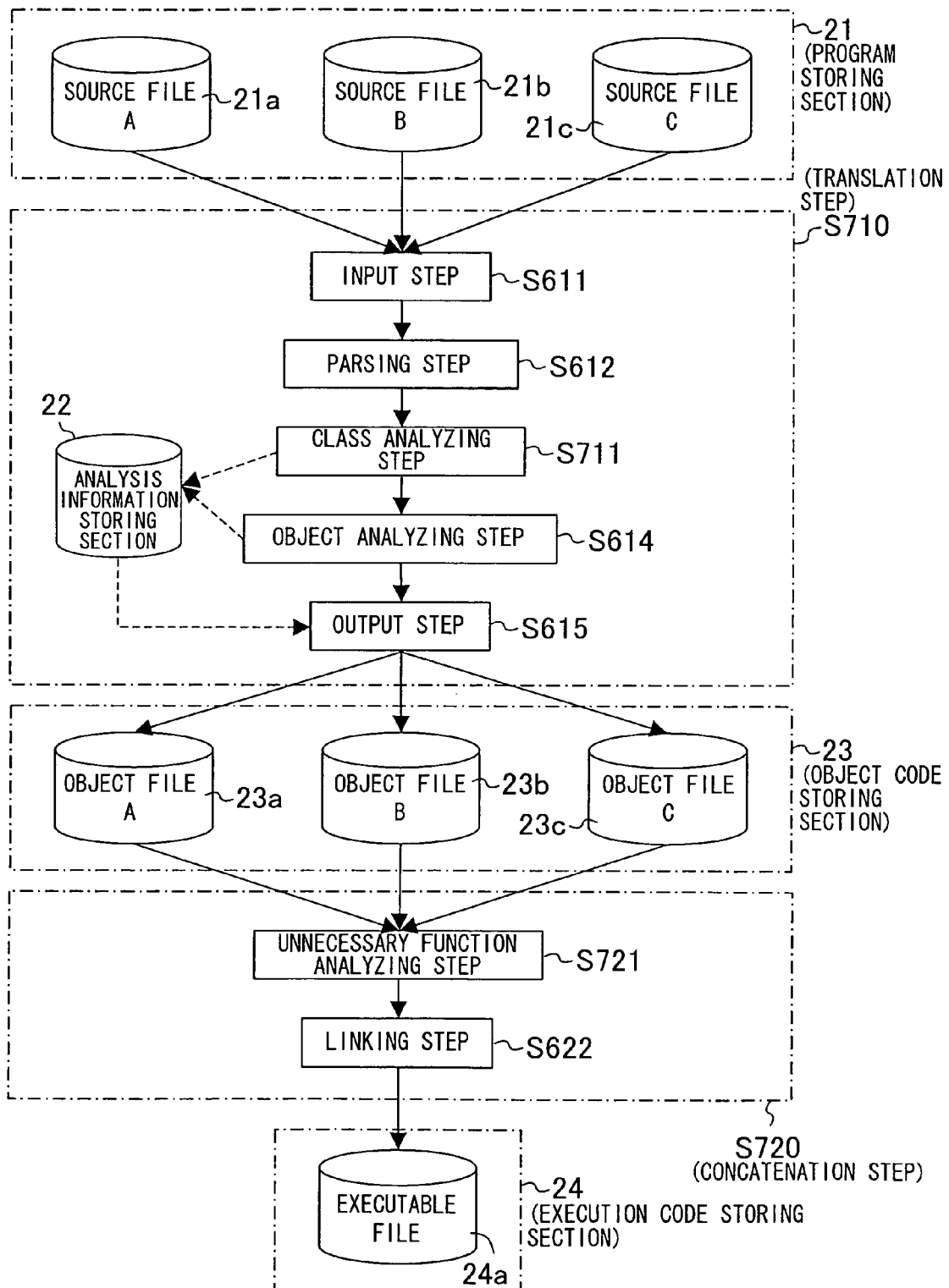
FIG. 29 is a flowchart showing structures of a translation step S710 and a concatenation step S720 and a storing section for holding information generated in steps S710 and S720 according to a seventh embodiment.

Hereinafter, a method for converting a program executed by a compiler (not shown) according to a seventh embodiment of the present invention will be described with reference to the drawings. In this program converting method, a program in which processing has been written is input to the compiler to make the compiler execute the processing. FIG. 29 is a flowchart showing structures of a translation step S710 and a concatenation step S720 and a storing section for holding information generated in steps S710 and S720 according to the seventh embodiment.

As shown in FIG. 29, according to this embodiment, a program held in a program storing section 21 is translated in the translation step S710, and object code is generated and held in an object code storing section 23. The object code is subjected to a linking process in the concatenation step S720 and then held in an execution code storing section 24.

The object code storing section 21 holds a program to be converted by dividing it into source files 21a, 21b and 21c.

The translation step S710 includes: an input step S611 of inputting a program to be converted; a parsing step S612 of parsing the program and generating a symbol table, a syntax tree and the like; a class analyzing step S711 of extracting information on classes included in the program, analyzing class definitions and storing an inheritance relationship among the classes in an analysis information storing section 22; an object analyzing step S614 of detecting classes whose objects are created out of the classes included in the program and of recording the result in the analysis information storing section 22; and an output step S615 of outputting, as object code, a program converted through the foregoing steps and analysis information stored in the analysis information storing section 22 to a generated code storing section 23.

The object code storing section 23 holds object code by dividing it into object files 23a, 23b and 23c.

The concatenation step S720 includes: an unnecessary function analyzing step S721 of reading the object files 23a through 23c stored in the object code storing section 23 and extracting analysis information in the object files 23a through 23c to analyze unnecessary functions; and a linking step S622 of linking only necessary code or data using the analysis result obtained at the unnecessary function analyzing step S721 and outputting the linked code or data to the execution code storing section 24.

The execution code storing section 24 holds, as an executable file 24a, execution code linked in the concatenation step S720.

In this embodiment, in the class analyzing step S711, information on classes included in the program is extracted and, in addition, class definitions are analyzed so that an inheritance relationship among the classes is recorded in the analysis information storing section 22. In the unnecessary function analyzing step S721, unnecessary functions are analyzed based on information on the inheritance relationship among the classes and information on whether objects are created or not.

Now, operations at respective steps in the translation step S710 and the concatenation steps S720 will be described in further detail with reference to an example of a program. Out of these steps, description of the steps already described in the sixth embodiment will be omitted. To show the example of a program, FIG. 8 used in the second embodiment is referred to again.

The input step S611 and the parsing step S612 are performed in the same manner as in the sixth embodiment.

Figure 30:
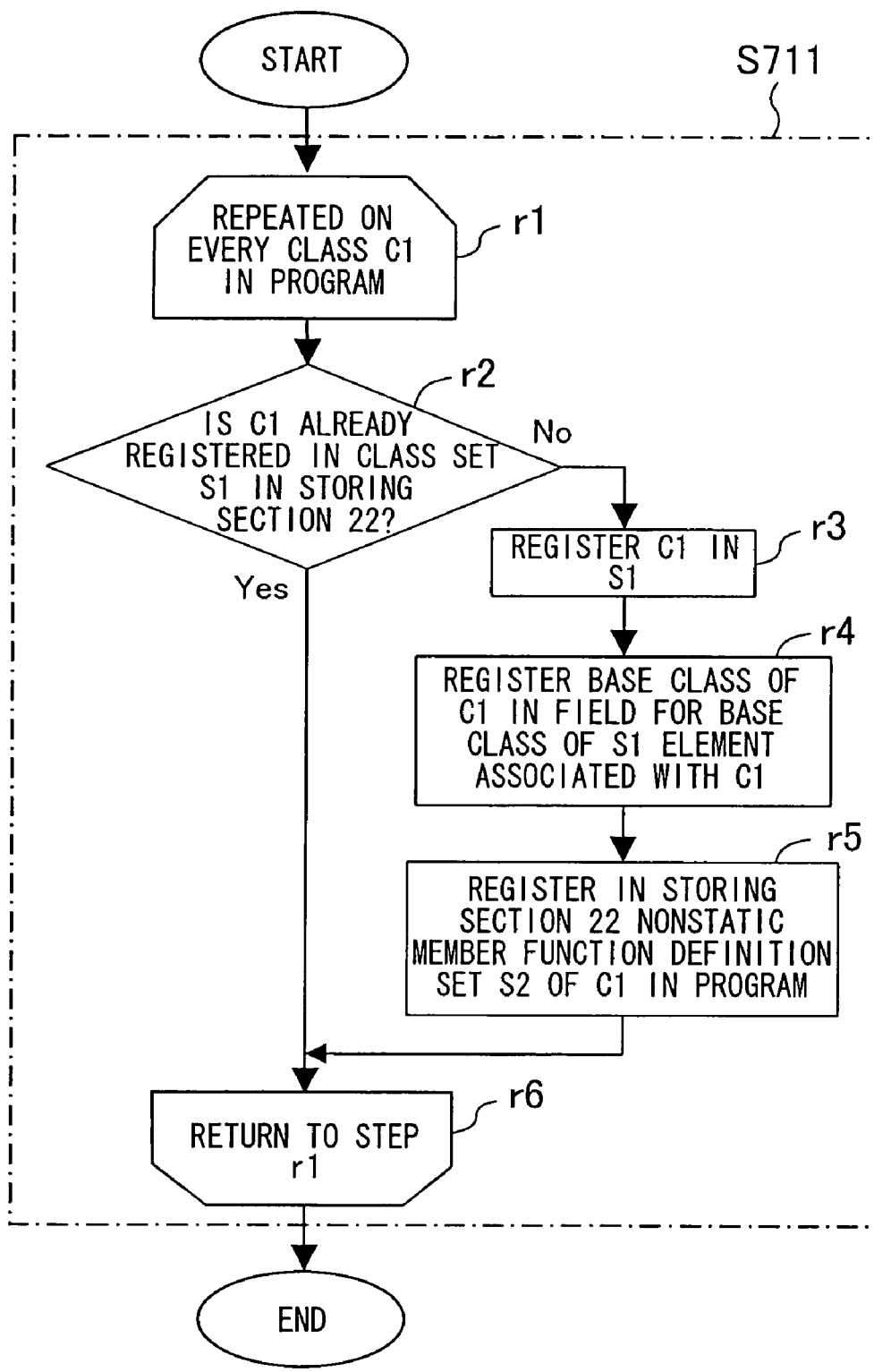
FIG. 30 is a flowchart showing a structure of a class analyzing step S711.

Now, operations in the class analyzing step S711 will be described with reference to FIG. 30. FIG. 30 is a flowchart showing a structure of the class analyzing step S711. As shown in FIG. 30, the loop from step r1 through step r6 is repeatedly executed on every class C1 included in the program analyzed in the parsing step S612.

In the program shown in FIG. 8, when a file "a.cc", for example, is processed, class A included in the file "a.cc" is extracted at step r1 and, at step r2, it is determined whether class A has been already registered in the analysis information storing section 22. At the first-time determination of class A, the determination result is No, and the process proceeds to step r3. At each of the subsequent determinations of class A, class A has been already registered in the analysis information storing section 22, so that the determination result is Yes and the process proceeds to step r6.

At step r3, class A is registered in a class set S1 in the analysis information storing section 22, and then the process proceeds to step r4.

At step r4, it is determined whether class A has a base class or not. If class A has a base class, all the base classes of class A are registered in a field for base classes in the class set S1. Since class A has no base classes, nothing is registered in the field for base classes in the class set S1. In other words, a base class set in the class set S1 is an empty set.

At step r5, all the nonstatic member function definitions of class A are detected and registered in a nonstatic member function definition set S2 in the analysis information storing section 22. Files "A::A( )" and "A::f1", which are nonstatic member functions of class A in the file "a.cc", are registered in the nonstatic member function definition set S2.

Thereafter, the process returns from step r6 to step r1, and the loop from step r1 through step r6 is repeatedly executed on a file other than the file "a.cc". Class B included in a file "b.cc" is derived from class A, and thus class A is registered in a field for base classes of class B in the class set S1. Subsequently, files "c.cc", "d.cc", "e.cc" and "main.cc" are also processed in the same manner.

Then, in the object analyzing step S614, classes whose objects are created are analyzed in the same manner as in the sixth embodiment (shown in FIG. 26B) and registered in an object creation class set S3. Among these files, objects only of classes A and B in the file "main.cc" are created, so that object creation class sets S3 for the respective files "a.cc", "b.cc", "c.cc", "d.cc" and "e.cc" are empty sets and classes A and B are registered in the object creation class set S3 for the file "main.cc".

As a result of analyses at the class analyzing step S711 and the object analyzing step S614, the class set S1, the nonstatic member function set S2 and the object creation class set S3 in the analysis information storing section 22 are in the states shown in FIGS. 32A through 32F. FIGS. 32A through 32F show analysis data stored in the analysis information storing section 22 with respect to the files "a.cc" through "main.cc", respectively.

Then, in the output step S615, a result of conversion of the program and analysis data stored in the analysis information storing section 22 are output to the object code storing section 23, in the same manner as in the sixth embodiment.

The object code storing section 23 holds the conversion results and analysis information on the files "a.cc", "b.cc", "c.cc", "d.cc", "e.cc" and "main.cc" as files "a.obj", "b.obj", "c.obj", "d.obj", "e.obj" and "main.obj".

Figures 31A, 31B:
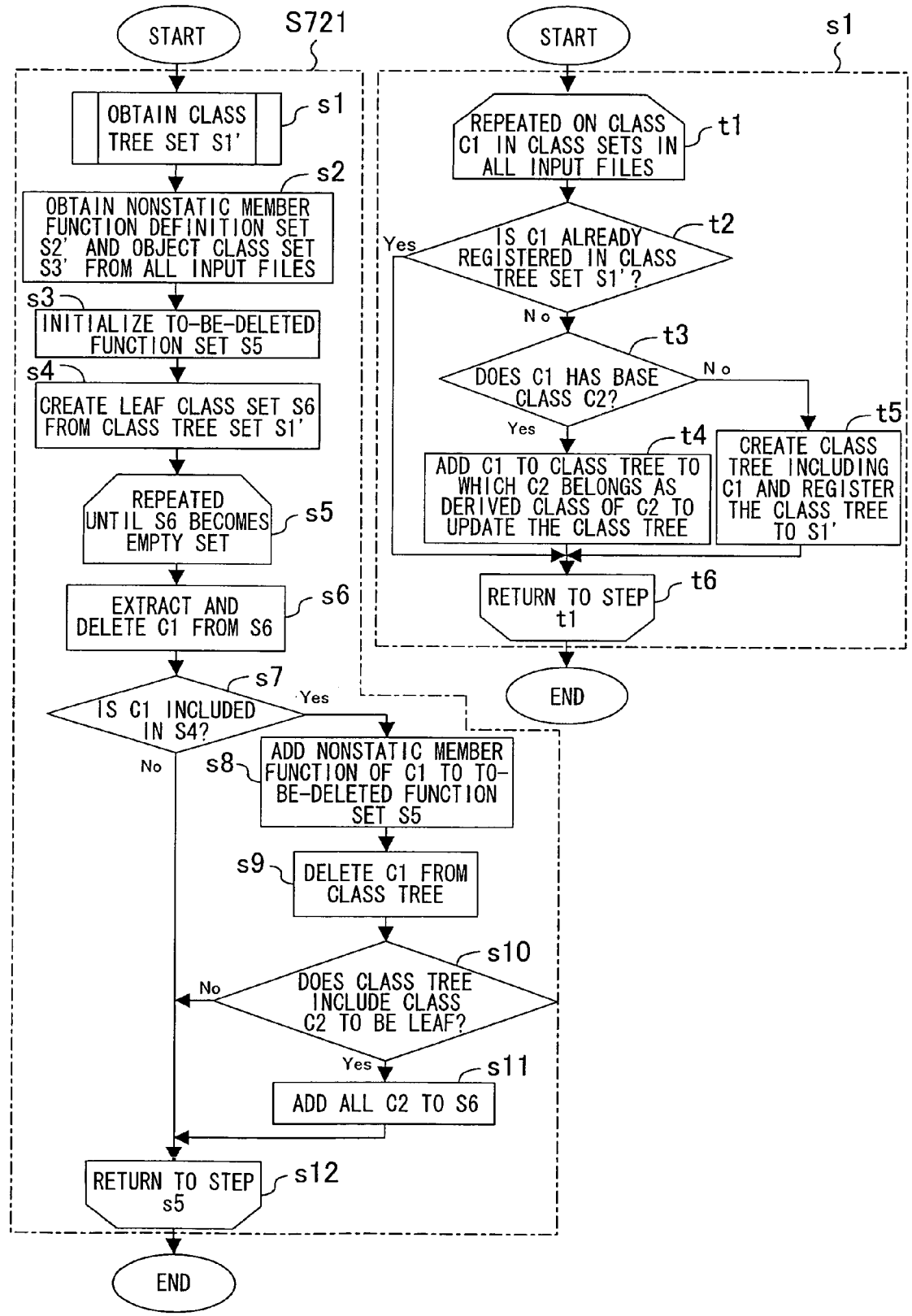
FIG. 31A is a flowchart showing a structure of an unnecessary function analyzing step S721.
FIG. 31B is a flowchart showing a structure of step s1 (class-tree-set-S1' obtaining step) in the unnecessary function analyzing step S721.

Now, operations in the unnecessary function analyzing step S721 will be described with reference to FIG. 31A. FIG. 31A is a flowchart showing a structure of the unnecessary function analyzing step S721.

As shown in FIG. 31A, in the unnecessary function analyzing step S721, a series of operations is performed to obtain a class tree set S1' at step s1, which will be described later. By this series of operations, the class tree set S1' shown in FIG. 33A is obtained. FIG. 33A shows the class tree set S1' obtained at step s1 in the unnecessary function analyzing step S721.

At step s2, as shown in FIGS. 33B and 33C, a nonstatic member function definition set S2' and an object creation class set S3' are calculated based on analysis information held in the object code storing section 23. FIGS. 33B and 33C show the nonstatic member function definition set S2' and the object creation class set S3', respectively, obtained at step s2 in the unnecessary function analyzing step S721.

At step s3, a to-be-deleted function set S5 is initialized to be an empty set. At step s4, class B, class D and class E, which are leaf classes, are registered from the class tree set S1' in a leaf class set S6. At this time, the leaf class set S6 and the to-be-deleted function set S5 are in the respective states shown in FIG. 34A. FIGS. 34A through 34E show changes in the states of the leaf class set S6 and the to-be-deleted function set S5 in the unnecessary function analyzing step S721.

Then, the loop from step s5 through step s12 is repeatedly executed on every class included in the leaf class set S6. This loop is repeated until all the classes are deleted from the leaf class set S6.

At this time, classes B, D and E are included in the leaf class set S6. First, when class B is processed, class B is deleted from the leaf class set S6 as shown in FIG. 34B at step s6. At step s7, it is determined whether class B is included in a no-object class set S4 (not shown) or not. Since an object of class B has been created, the determination result is No and the process proceeds to step s12.

When the process returns from step s12 to step s5, the loop from step s5 through step s12 is repeatedly executed on class D included in the leaf class set S6. Since no object of class D is created, the determination result at step s7 is Yes and the process proceeds to step s8. At step s8, as shown in FIG. 34C, nonstatic member functions of class D are added to the to-be-deleted function set S5. Thereafter, at step s9, class D is deleted from the class tree set S1. At step s10, it is determined whether or not the class tree includes a class to be a leaf or not.

Since the class tree includes no class to be a leaf, the determination result is No and the process proceeds to step s12.

Then, the loop from step s5 through step s12 is also repeatedly executed on class E. Since no object of class E is created, the determination result at step s7 is Yes. At step s8, nonstatic member functions of class E are added to the to-be-deleted function set S5. Thereafter, at step s10, class E is deleted from the class tree set S1'. This causes class C to become a leaf class, so that the determination result at step s10 is Yes and the process proceeds to step s11. At step s11, class C which has become a leaf is added to a leaf class set S6 as shown in FIG. 34D.

Thereafter, when the process returns from step s12 to step s5, the loop from step s5 through step s12 is repeatedly executed on class C. Since no object of class C is created, the determination result at step s7 is Yes. Then, at step s8, nonstatic member functions of class C are added to the to-be-deleted function set S5. At step s9, class C is deleted from the class tree set S1'. This deletion of class C causes no class to become a leaf, so that the determination result at step s10 is No. Through the foregoing process, the leaf class set S6 becomes an empty set and the to-be-deleted function set S5 includes nonstatic member functions of classes D, E and C, as shown in FIG. 34E.

Now, a process at step s1 (class-tree-set-S1' obtaining step) in the unnecessary function analyzing step S721 will be described with reference to FIG. 31B. FIG. 31B is a flowchart showing a structure of step s1 (class-tree-set-S1' obtaining step) in the unnecessary function analyzing step S721. In step s1, the loop from step t1 through step t6 is repeatedly executed on every class included in the object code storing section 23.

In a process performed on class A, at step t2, it is determined whether class A has been already registered in the class tree set S1' or not. If class A has been already registered, the process proceeds to step t6, and otherwise proceeds to step t3.

At step t3, it is determined whether class A has a base class or not. Since class A has no base class, the determination result is No and the process proceeds to step t5. At step t5, a class tree including class A is created and registered in the class tree set S1'. At this time, only class A is included in this class tree.

When the process returns from step t6 to step t1, the loop from step t1 through step t6 is also repeatedly executed on class B. Since the base class of class B is class A, the determination result at step t3 is Yes and the process proceeds to step t4. At step t4, the class tree set S1' is searched to find a class tree to which class A belongs, and class B is added to the class tree as a class derived from class A.

Classes C, D and E are also added to the class tree including class A in the same manner as for class B. Through the foregoing process, the class tree set S1' shown in FIG. 33A is obtained.

In the linking step S622, a linking process is performed on all the link targets in the program in the same manner as in the sixth embodiment.

In this embodiment, if classes in a program exhibit an inheritance relationship, the inheritance relationship is analyzed and a class tree is created. Then, it is determined whether an object of a leaf class in the class tree is created or not. This allows deletion of functions of this leaf class. In addition, it is determined whether or not the class tree includes a class which becomes a leaf by the deletion of the leaf class, and if the class tree includes such a class, it is further determined whether an object of the class to be a leaf is created or not. Accordingly, functions of the class to be a leaf are also deleted. That is, a class which has become a leaf during an analysis is also deleted.

This embodiment enables an analysis in which an inheritance relationship is taken into consideration, so that deletable functions and undeletable functions are appropriately distinguished in a crass tree and thereby functions are deleted more effectively. Accordingly, the code size is further reduced more easily than in conventional techniques.

Embodiment 8

Figure 35:
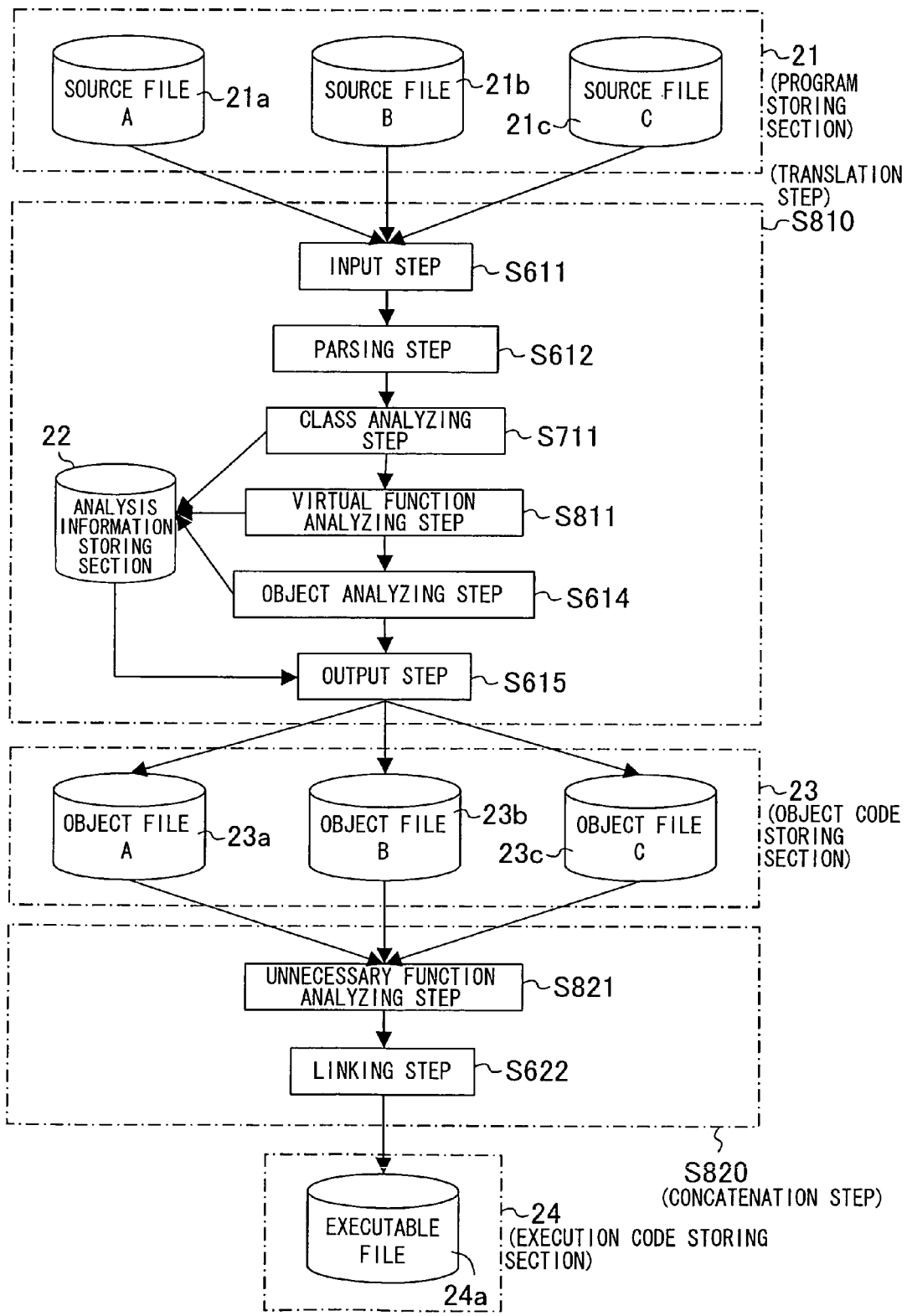
FIG. 35 is a flowchart showing structures of a translation step S810 and a concatenation step S820 and a storing section for holding information generated in steps S810 and S820 according to an eighth embodiment.

Hereinafter, a method for converting a program executed by a compiler (not shown) according to an eighth embodiment of the present invention will be described with reference to the drawings. In this program converting method, a program in which processing has been written is input to the compiler to make the compiler execute the processing. FIG. 35 is a flowchart showing structures of a translation step S810 and a concatenation step S820 and a storing section for holding information generated in steps S810 and S820 according to the eighth embodiment.

As shown in FIG. 35, according to this embodiment, a program held in a program storing section 21 is translated in the translation step S810, and object code is generated and is held in an object code storing section 23. The object code is subjected to a linking process in the concatenation step S820 and then held in an execution code storing section 24.

The object code storing section 21 holds a program to be converted by dividing it into source files 21a, 21b and 21c.

The translation step S810 includes: an input step S611 of inputting a program to be converted; a parsing step S612 of parsing the program and generating a symbol table, a syntax tree and the like; a class analyzing step S711 of extracting information on classes included in the program, analyzing class definitions and storing an inheritance relationship among the classes in an analysis information storing section 22; a virtual function analyzing step S811 of analyzing virtual functions; an object analyzing step S614 of detecting classes whose objects are created out of the classes included in the program and of recording the result in the analysis information storing section 22; and an output step S615 of outputting, as object code, a program converted through the forgoing steps and analysis information stored in the analysis information storing section 22 to a generated code storing section 23.

The object code storing section 23 holds object code by dividing it into object files 23a, 23b and 23c.

The concatenation step S820 includes: an unnecessary function analyzing step S821 of reading the object files 23a through 23c stored in the object code storing section 23 and extracting analysis information in the object files 23a through 23c to analyze unnecessary functions; and a linking step S622 of linking only necessary code or data using the analysis result obtained in the unnecessary function analyzing step S821 and outputting the linked code or data to the execution code storing section 24.

The execution code storing section 24 stores, as an executable file 24a, execution code linked in the concatenation step S820.

In this embodiment, in the virtual function analyzing step S811, virtual functions of a class included in the program is analyzed. If the class is a derived class that inherits characteristics of another class, virtual functions of the derived class may or may not override virtual functions of its base class. In view of this, in the virtual function analyzing step S811, it is determined whether the virtual functions of the derived class override the virtual functions of the base class or not.

In the unnecessary function analyzing step S821, unnecessary functions are analyzed based on information obtained in the class analyzing step S711, the virtual function analyzing step S811 and the object analyzing step S614.

Now, operations at respective steps in the translation step S810 and the concatenation step S820 will be described in further detail with reference to an example of a program. Out of these steps, detailed description of the steps already described in the third, sixth or seventh embodiment will be omitted. To show the example of a program, FIG. 15 used in the third embodiment is referred to again.

First, the input step S611 and the parsing step S612 are performed in the same manner as in the sixth embodiment.

Then, in the class analyzing step S711, information on classes included in the program and an inheritance relationship among the classes are analyzed and the analysis result is stored in a class set S1 in the analysis information storing section 22, in the same manner as in the seventh embodiment (shown in FIG. 30).

Thereafter, in the virtual function analyzing step S811, virtual function definitions and virtual functions to be overridden of all the classes included in the program are analyzed in the same manner as in the third embodiment (shown in FIG. 12), and the analysis result is stored in a virtual function set S2 held in the analysis information storing section 22.

Subsequently, in the object analyzing step S614, classes whose objects are created are analyzed and registered in an object creation class set S3 held in the analysis information storing section 22, in the same manner as in the sixth embodiment (shown in FIG. 26B).

As a result of analyses in the class analyzing step S711, the virtual function analyzing step S811 and the object analyzing step S614, information shown in FIGS. 37A through 37E is held in the analysis information storing section 22. FIGS. 37A through 37E show the class sets S1, the virtual function sets S2 and the object creation class sets S3 with respect to respective files "f.cc", "g.cc", "h.cc", "main.cc" and "sub.cc" stored in the analysis information storing section 22.

Then, in the output step S615, a result of conversion of the program and analysis data stored in the analysis information storing section 22 are output to the object code storing section 23 in the same manner as in the sixth embodiment. The object code storing section 23 holds the conversion results and analysis information on the files "f.cc", "g.cc", "h.cc", "main.cc" and "sub.cc" as files "f.obj", "g.obj", "h.obj", "main.obj" and "sub.obj".

Figure 36:
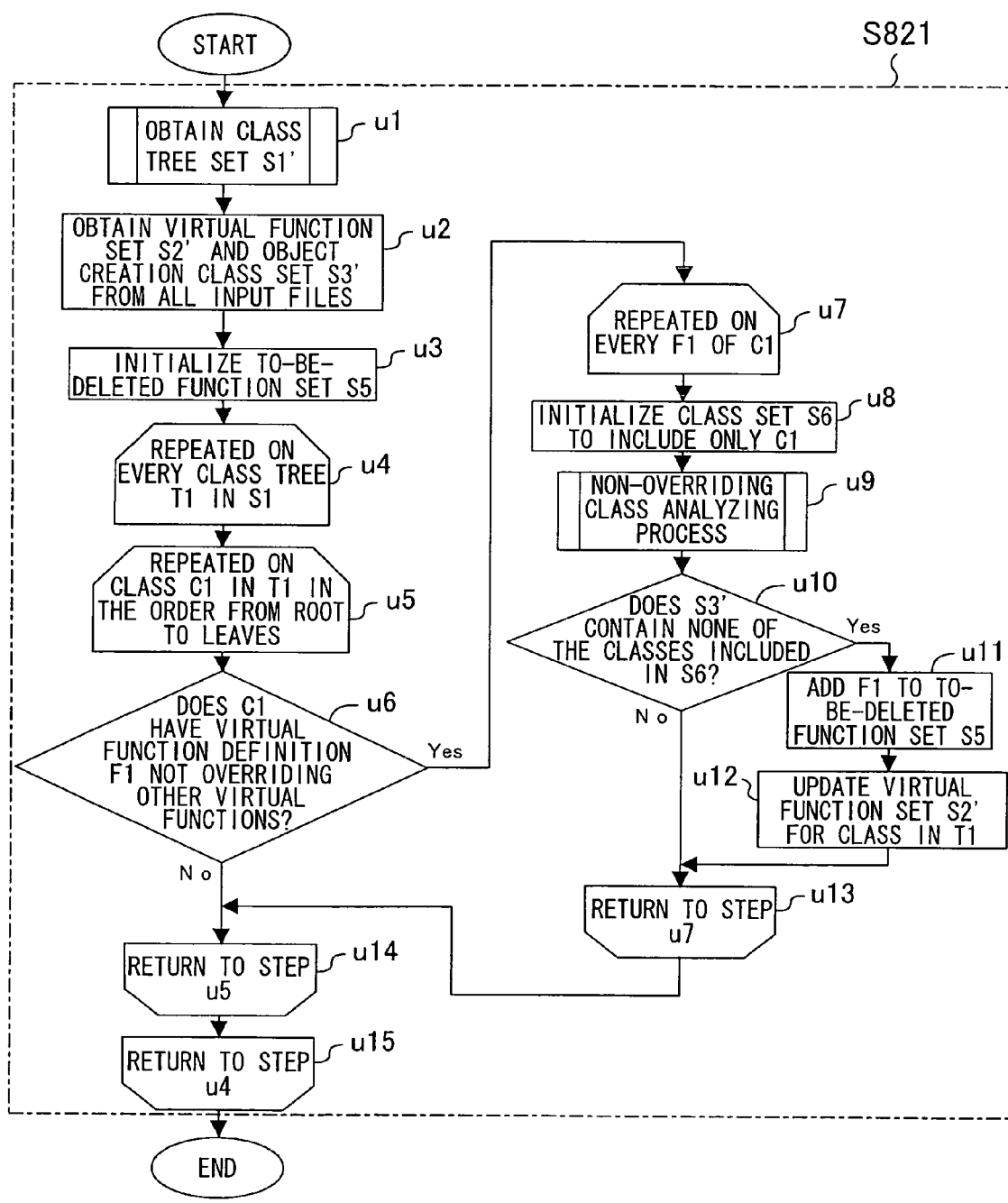
FIG. 36 is a flowchart showing a structure of an unnecessary function analyzing step S821.

Now, operations in the unnecessary function analyzing step S821 will be described with reference to FIG. 36. FIG. 36 is a flowchart showing a structure of the unnecessary function analyzing step S821.

Figures 38A, 38B, 38C:
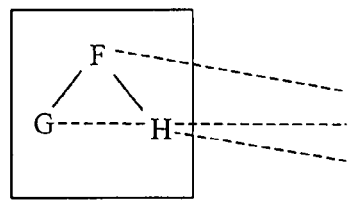
FIG. 38A shows a class tree set S1' obtained at step u1 in the unnecessary function analyzing step S821.
FIGS. 38B and 38C show a vertical function set S2' and an object creation class set S3', respectively, obtained at step u2 in the unnecessary function analyzing step S821.

As shown in FIG. 36, first, a class tree set S1' is obtained at step u1 in the same manner as in the seventh embodiment (shown in FIG. 31B). Accordingly, a class tree Tr including class F, class G and class H is created in the class tree set S1' as shown in FIG. 38A. FIG. 38A shows the class tree set S1' obtained at step u1 in the unnecessary function analyzing step S821.

At step u2, as shown in FIGS. 38B and 38C, a virtual function set S2' and an object creation class set S3' are obtained based on analysis information held in the object code storing section 23. FIGS. 38B and 38C show the vertical function set S2' and the object creation class set S3', respectively, obtained at step u2 in the unnecessary function analyzing step S821.

At step u3, a to-be-deleted function set S5 is initialized to be an empty set. Then, the loop from step u4 through step u15 is repeatedly executed on every class tree T1 in the class tree set S1'. In the program shown in FIG. 15, only class tree Tr is included in the class tree set S1'.

When the process proceeds to step s5, the loop from step u5 through step u14 is repeatedly executed on classes in the class tree Tr in the order from a root class to leaf classes. Specifically, class F, which is a root class, is processed and then classes G and H, which are leaf classes, are processed.

In a process performed on class F, the virtual function set S2 for class F is examined to determine whether or not class F has a virtual function definition which does not override another virtual function definition. As shown in FIG. 38B, class F has "F:ml" as a virtual function definition, and a to-be-overridden virtual function definition set for class F is an empty set, so that it is determined that "F:ml" does not override another virtual function definition. Accordingly, the determination result is Yes and the process proceeds to step u7.

Then, the loop from the step u7 through the step u13 is repeatedly executed on all the virtual function definitions of class F.

At step u8, a class set S6 is initialized to include only class F. At step u9, non-overriding classes are analyzed in the same manner as in the third embodiment (shown in FIG. 14). At step u10, it is determined whether all the classes included in the class set S6 are included in the object creation class set S3' or not. At this time, the class set S6 includes only class F, which is not included in the object creation class set S3', so that the determination result is Yes and the process proceeds to step u11.

At step u11, the virtual function definition "F:ml" of class F is added to a to-be-deleted function set S5. At step u12, information on the virtual function definition "F:ml" of class F is deleted from the virtual function set S2' for classes F, G and H included in the class tree Tr, thereby updating the virtual function set S2'. At this time, "F:ml" stored in a virtual function definition set and "F:ml" stored in a to-be-overridden virtual function definition set as information on the virtual function definition "F:ml" are deleted. As a result of the foregoing process, the virtual function set S2', the to-be-deleted function set S5 and the class set S6 are in the respective states shown in FIG. 39A. FIGS. 39A through 39C show changes in the states of the virtual function set S2', the to-be-deleted function set S5 and the class set S6.

Thereafter, the process proceeds to step u13. Since class F includes no virtual function definitions other than "F:ml", the loop from step u7 through step u13 performed on class F terminates.

Then, the process returns from step u14 to step u5, and the loop from step u5 through step u14 is also repeatedly executed on classes G and H, which are leaf classes in the class tree Tr.

In a process performed on class G, at step u6, it is determined whether or not class G has a virtual function definition which does not override another virtual function definition. At this time, as shown in FIG. 39A, a to-be-overridden virtual function definition set for class G is an empty set, so that the determination result is Yes and the process proceeds to step u7. Thereafter, at step u8, the class set S6 is initialized to include only class G. Accordingly, the class set S6 includes only class G, which is included in the object creation class set S3', so that the determination result at step u10 is No and the process returns to step u7. At this time, as shown in FIG. 39B, the virtual function set S2' and the to-be-deleted function set S5 remain in the previous states.

Subsequently, the same process is performed on class H. As a result, as shown in FIG. 39C, the virtual function set S2' and the to-be-deleted function set S5 remain in the previous states.

Thereafter, the process proceeds to step u15. Then, the unnecessary function analyzing step S821 terminates.

Subsequently, in the linking step S622, a linking process is performed on all the link targets in the program in the same manner as in the sixth embodiment.

In this embodiment, if classes in a program exhibit an inheritance relationship, the inheritance relationship is analyzed so that a class tree is created. In a case where at least one virtual function of a derived class in the class tree does not override a virtual function of its base class, if neither an object of the derived class nor an object of the base class is created, virtual functions of the base class are deleted.

On the other hand, in a case where all the virtual functions of the derived classes in the class tree override virtual functions of the base class, if no object of the base class is created, virtual functions of the base class are deleted. Determination of this deletion is irrelevant of whether objects of the derived classes are created or not.

Therefore, in a program including virtual functions, deletable functions and undeletable functions are also appropriately distinguished and thereby functions are deleted more effectively. Accordingly, the code size is further reduced more easily than in conventional techniques.

Embodiment 9

Figure 40:
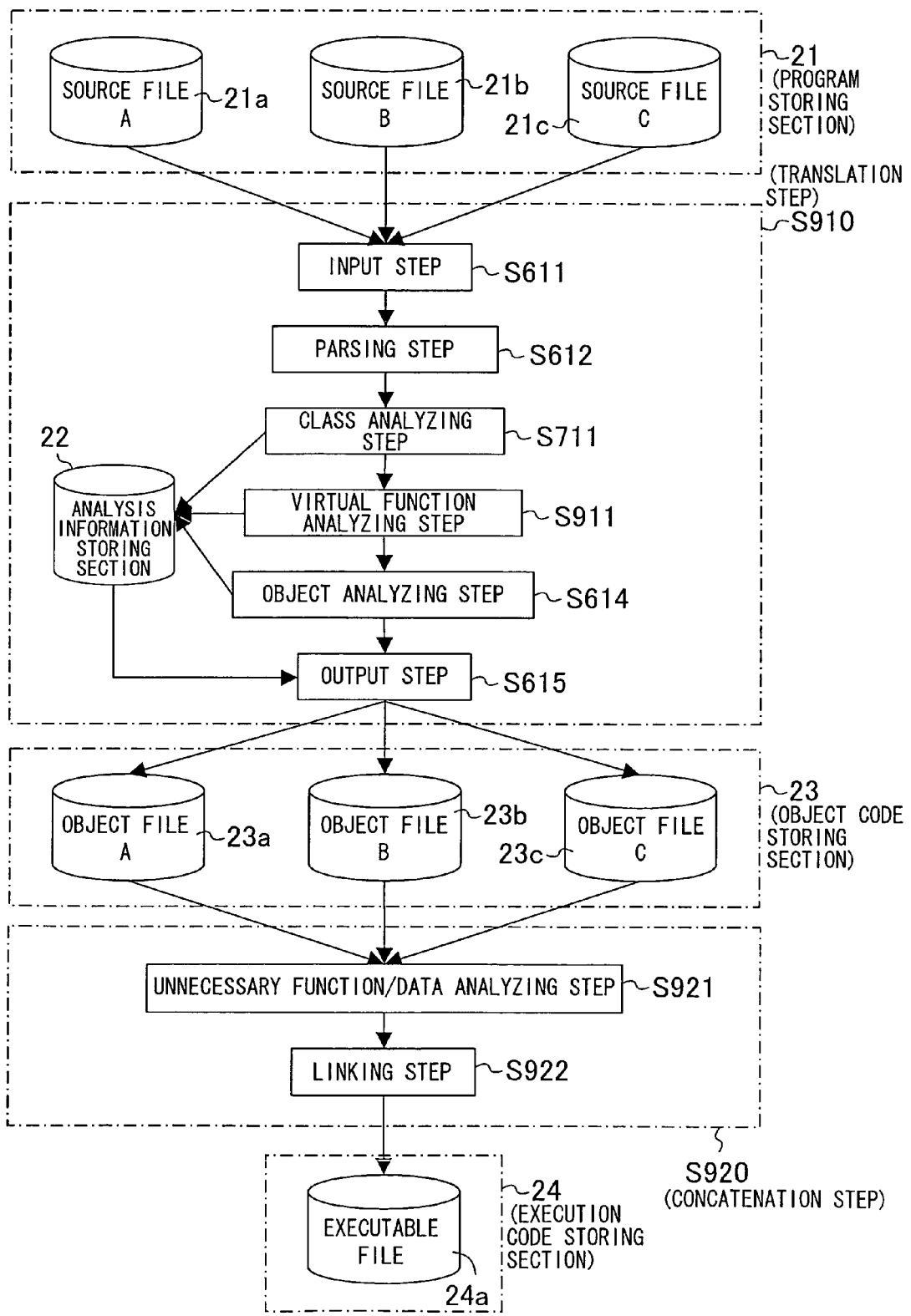
FIG. 40 is a flowchart showing structures of a translation step S910 and a concatenation step S920 and a storing section for holding information generated in steps S910 and S920 according to a ninth embodiment.

Hereinafter, a method for converting a program executed by a compiler (not shown) according to a ninth embodiment of the present invention will be described with reference to the drawings. In this program converting method, a program in which processing has been written is input to the compiler to make the compiler execute the processing. FIG. 40 is a flowchart showing structures of a translation step S910 and a concatenation step S920 and a storing section for holding information generated in steps S910 and S920 according to the ninth embodiment.

As shown in FIG. 40, according to this embodiment, a program held in a program storing section 21 is translated in the translation step S910, and object code is generated and held in an object code storing section 23. The object code is subjected to a linking process in the concatenation step S920 and then held in an execution code storing section 24.

The object code storing section 21 holds a program to be converted by dividing it into source files 21a, 21b and 21c.

The translation step S910 includes: an input step S611 of inputting a program to be converted; a parsing step S612 of parsing the program and generating a symbol table, a syntax tree and the like; a class analyzing step S711 of extracting information on classes included in the program, analyzing class definitions and storing an inheritance relationship among the classes in an analysis information storing section 22; a virtual function analyzing step S911 of analyzing virtual functions; an object analyzing step S614 of detecting classes whose objects are created out of the classes included in the program and of recording the result in the analysis information storing section 22; and an output step S615 of outputting, as object code, a program converted through the foregoing steps and analysis information stored in the analysis information storing section 22 to a generated code storing section 23.

The object code storing section 23 holds object code by dividing it into object files 23a, 23b and 23c.

The concatenation step S920 includes: an unnecessary function/data analyzing step S921 of reading the object files 23a through 23c stored in the object code storing section 23 and extracting analysis information in the object files 23a through 23c to analyze unnecessary functions and data; and a linking step S922 of linking only necessary code or data using an analysis result obtained in the unnecessary function/data analyzing step S921 and outputting the linked code or data to an execution code storing section 24.

The execution code storing section 24 stores, as an executable file 24a, execution code linked at the concatenation step S920.

In this embodiment, in the virtual function analyzing step S911, virtual functions are analyzed in the same manner as in the eighth embodiment and, in addition, a virtual function table is extracted.

Then, in the unnecessary function/data analyzing step S921, a virtual function table for a class whose virtual function definitions are determined to be all deletable is added to a to-be-deleted virtual function table set. Subsequently, in the linking step S922, the virtual function table added to the to-be-deleted virtual function table set is analyzed, and the address is changed into an invalid value.

Now, operations at the respective steps in the translation step S910 and the concatenation step S920 will be described in further detail with reference to an example of a program. Out of these steps, detailed description of the steps already described in the third, fourth, sixth, seventh or eighth embodiment will be omitted. To show the example of a program, FIG. 15 used in the third embodiment is referred to again.

First, the input step S611 and the parsing step S612 are performed in the same manner as in the sixth embodiment.

Next, in the class analyzing step S711, information on classes included in the program and an inheritance relationship among the classes are analyzed and the analysis result is stored in a class set S1 in the analysis information storing section 22, in the same manner as in the seventh embodiment (shown in FIG. 30).

Figure 41:
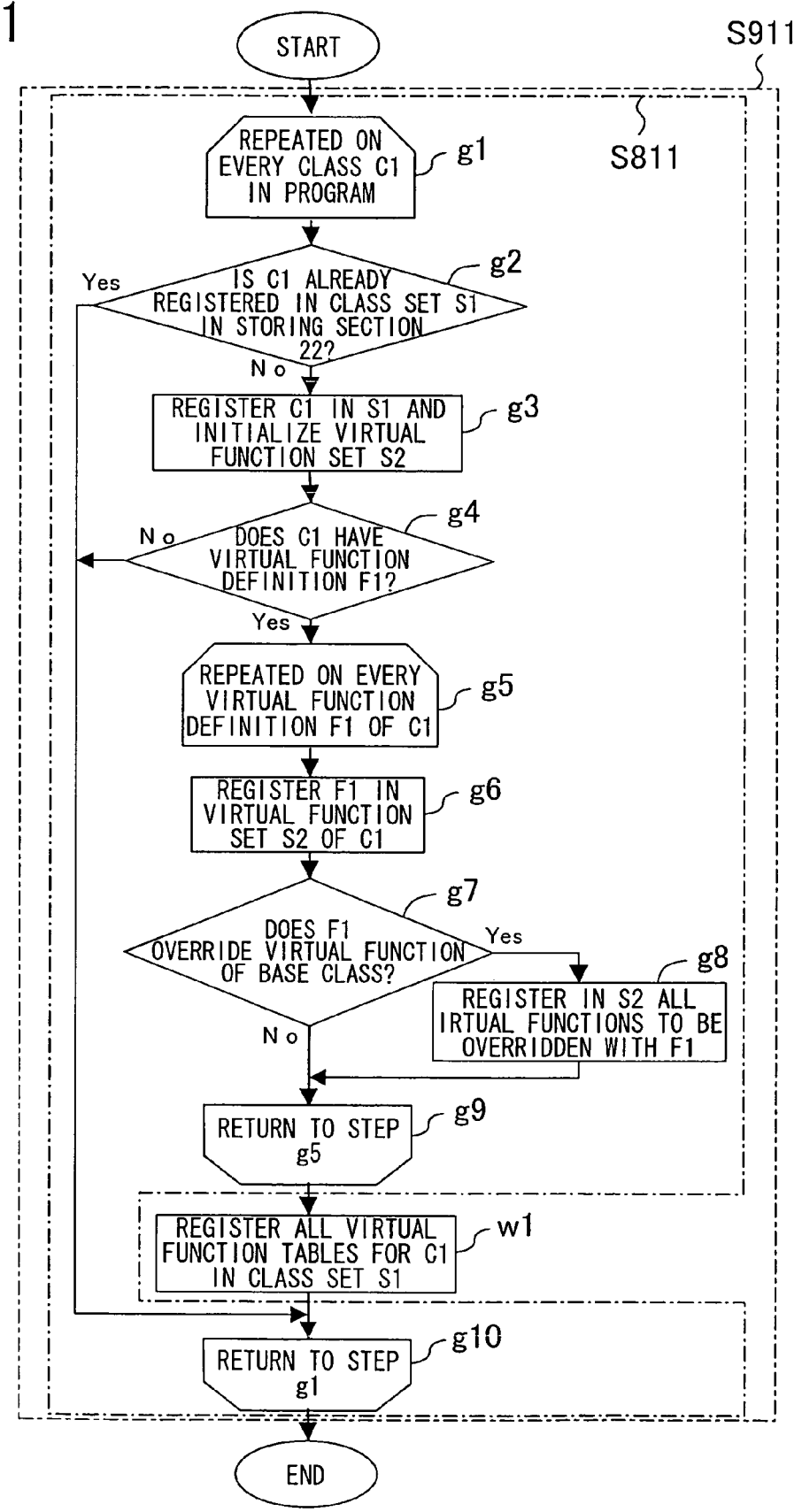
FIG. 41 is a flowchart showing a structure of a virtual function analyzing step S911.

Now, operations in the virtual function analyzing step S911 will be described with reference to FIG. 41. FIG. 41 is a flowchart showing a structure of the virtual function analyzing step S911.

As shown in FIG. 41, in the virtual function analyzing step S911, steps g1 through g10 and step w1 are performed. Out of these steps, description of steps g1 through g10 (shown in FIG. 12) already described in the third embodiment will be omitted. At step w1, all the virtual function tables for class C1 are registered in the class set S1. At this time, class C1 is class F, class G and class H. In a process performed on class F, for example, a virtual function table "vtbl_F" for class F is registered in the class set S1 stored in the analysis information storing section 22. The same process is also performed on classes G and H.

Then, in the object analyzing step S614, classes whose objects are created are analyzed and registered in an object creation class set S3, in the same manner as in the sixth embodiment (shown in FIG. 26B).

As a result of analyses in the class analyzing step S711, the virtual function analyzing step S911 and the object analyzing step S614, information shown in FIGS. 44A through 44E is held in the analysis information storing section 22. FIGS. 44A through 44E show class sets S1, virtual function sets S2 and object creation class sets S3 stored in the analysis information storing section 22 with respect to files "f.cc", "g.cc", "h.cc", "main.cc" and "sub.cc", respectively. In this embodiment, as shown in FIGS. 44A through 44E, a virtual function table is registered in the virtual function set S2 in each of the files.

Then, in the output step S615, a result of conversion of the program and analysis data stored in the analysis information storing section 22 are output to the object code storing section 23 in the same manner as in the sixth embodiment. The object code storing section 23 holds the conversion results and analysis information on the files "f.cc", "g.cc", "h.cc", "main.cc" and "sub.cc" as files "f.obj", "g.obj", "h.obj", "main.obj" and "sub.obj".

Figure 42:
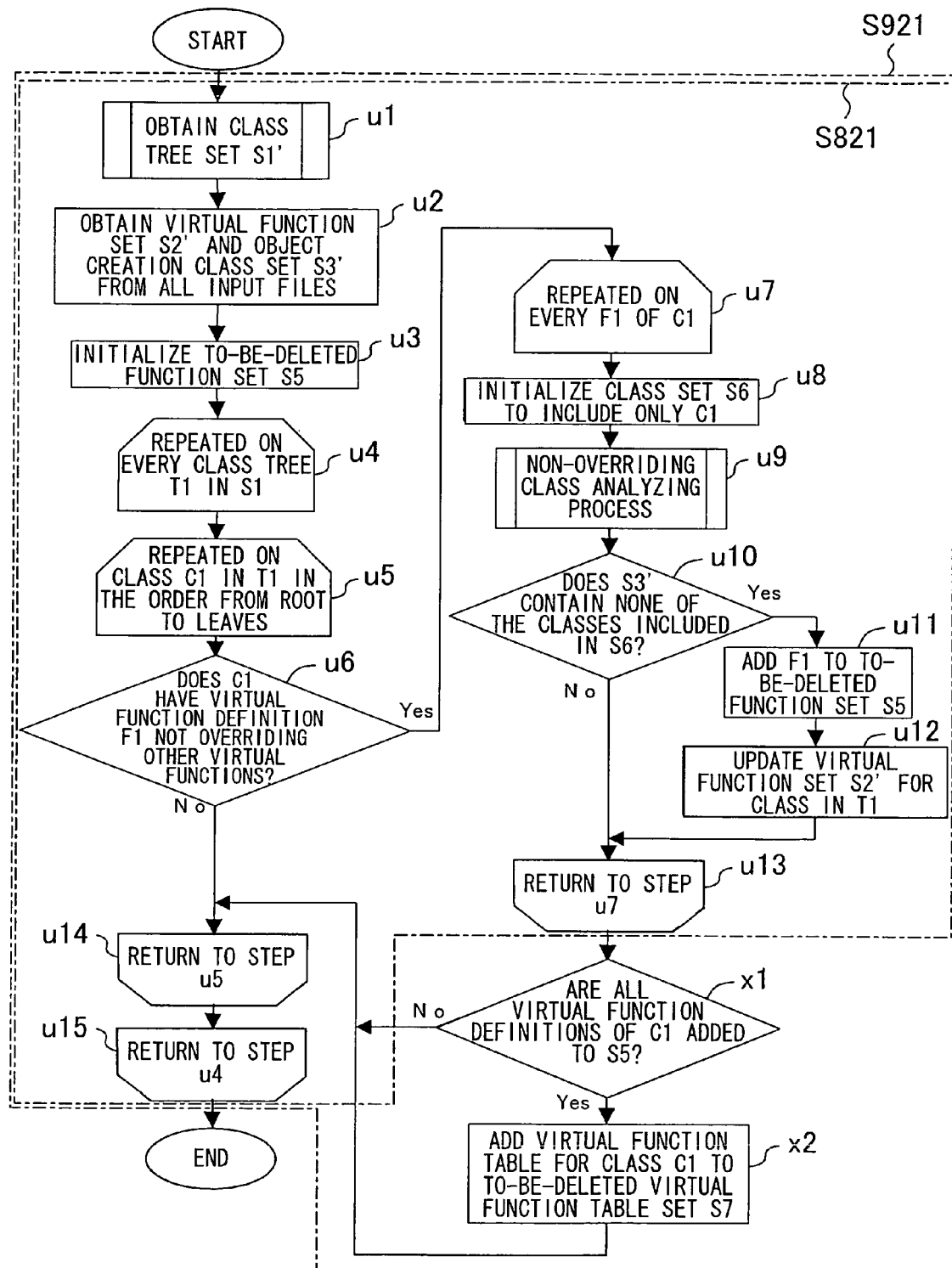
FIG. 42 is a flowchart showing a structure of an unnecessary function/data analyzing step S921.

Now, operations in the unnecessary function/data analyzing step S921 will be described with reference to FIG. 42. FIG. 42 is a flowchart showing a structure of the unnecessary function/data analyzing step S921.

As shown in FIG. 42, in the unnecessary function/data analyzing step S921, steps u1 through u15 and steps x1 and x2 are performed. Out of these steps, description of steps u1 through u15 (shown in FIG. 36) already described in the eighth embodiment will be omitted.

At step u1, a class tree set S1' shown in FIG. 45A is created. At step u2, a virtual function set S2' and an object creation class set S3' shown in FIGS. 45B and 45C, respectively, are created. FIGS. 45A through 45C respectively show the states of the class tree set S1', the virtual function set S2' and the object creation class set S3' in the ninth embodiment.

At step x1, it is determined whether or not all the virtual function definitions of class C1 are added to a to-be-deleted function set S5. At this time, class C1 is classes F, G and H. For example, when step x1 is performed on class F, a virtual function definition "F:m1" of class F has been already added to the to-be-deleted function set S5 (step u11). Accordingly, the determination result is Yes and the process proceeds to step x2.

At step x2, all the virtual function tables for class F are added to a to-be-deleted virtual function table set S7. Specifically, a virtual function table "Vtbl_F" for class F is added to the to-be-deleted virtual function table set S7. As a result of the foregoing process, the virtual function set S2', the class set S6, the to-be-deleted function set S5 and the to-be-deleted virtual function table set S7 are in the states shown in FIG. 46A. FIGS. 46A through 46C show changes in the states of the virtual function set S2', the class set S6, the to-be-deleted function set S5 and the to-be-deleted virtual function table set S7.

Then, step x1 is performed on class G. At this time, as shown in FIG. 46A, no virtual function definition of class G has been added to the to-be-deleted function set S5. Accordingly, the determination result is No and the process proceeds to step u14. In this manner, the analysis result shown in FIG. 46B is obtained.

Then, step x1 is performed on class H. At this time, as shown in FIG. 46A, no virtual function definition of class H has been added to the to-be-deleted function set S5. Accordingly, the determination result is No and the process proceeds to step u14. In this manner, the analysis result shown in FIG. 46C is obtained.

Figure 43:
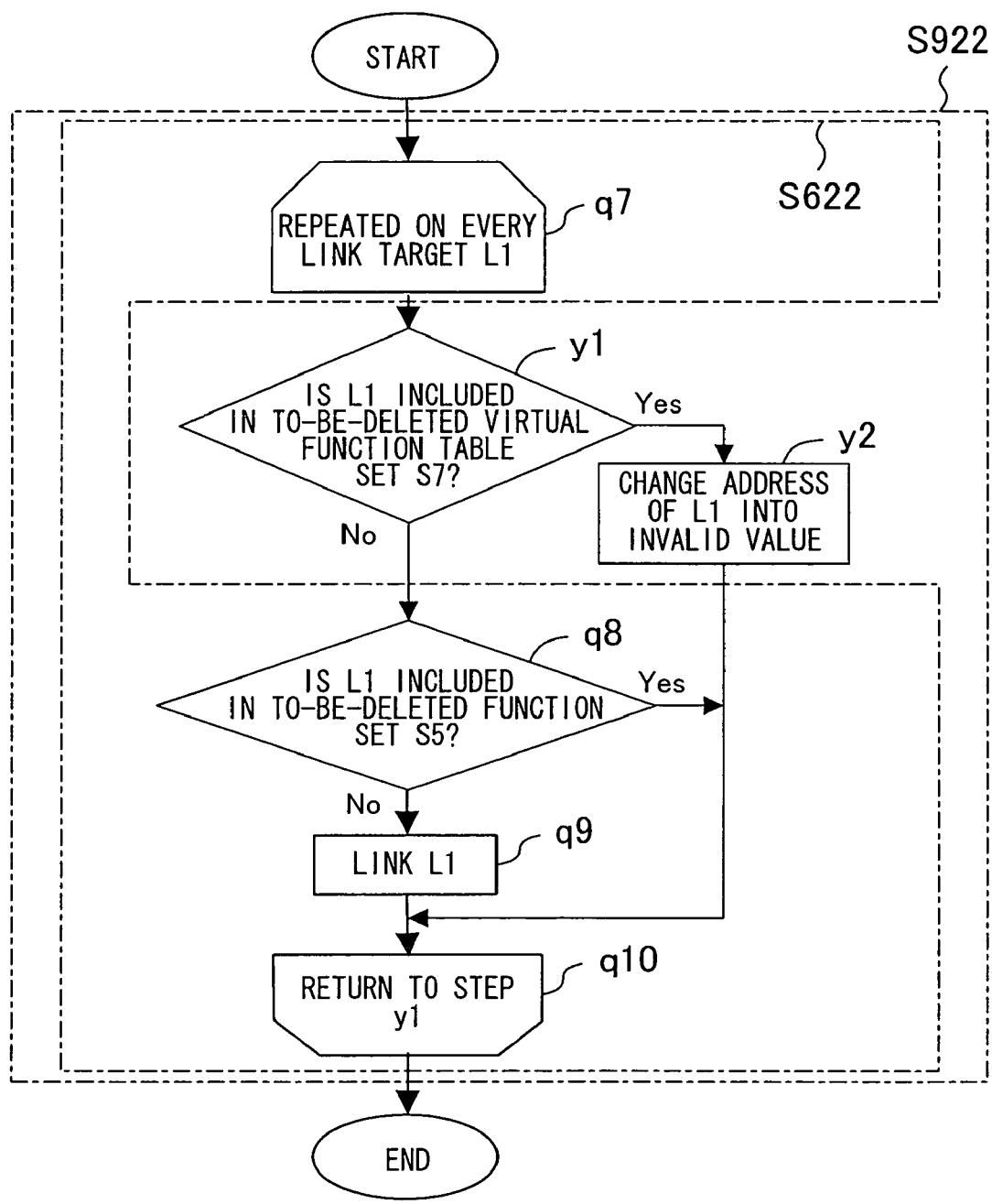
FIG. 43 is a flowchart showing a structure of the linking step S922.

Now, operations in the linking step S922 will be described with reference to FIG. 43. FIG. 43 is a flowchart showing a structure of the linking step S922.

In the linking step S922, as shown in FIG. 43, steps q7 through q10 and steps y1 and y2 are performed. Out of these steps, steps q7 through q10 are the same as those in the linking step S622 (shown in FIG. 27) in the sixth embodiment, and thus description thereof will be omitted.

At step y1, it is determined whether or not a link target L1 is data included in the to-be-deleted virtual function table set S7. For example, in a case where "vtbl_F" is a link target, "vtbl_F" is included in the to-be-deleted virtual function table set S7 shown in FIG. 46C, so that the determination result is Yes and the process proceeds to step y2.

At step y2, the address of "vtbl_F" is changed into an invalid value such as a null pointer so that the address of "vtbl_F" has an invalid value in a process in which addresses are needed. The process in which addresses are needed is a process in which addresses are referred to, for example.

On the other hand, at step y1, in a case where "vtbl_G" is a link target, for example, "vtbl_G" is not included in the to-be-deleted virtual function table set S7 shown in FIG. 46C, so that the determination result is No and the process proceeds to step q8.

In this embodiment, the same effects as in the eighth embodiment are obtained. In addition, data shown in the to-be-deleted virtual function table set S7 is deleted. Accordingly, effective code having a smaller size is created.

Embodiment 10

Figure 47:
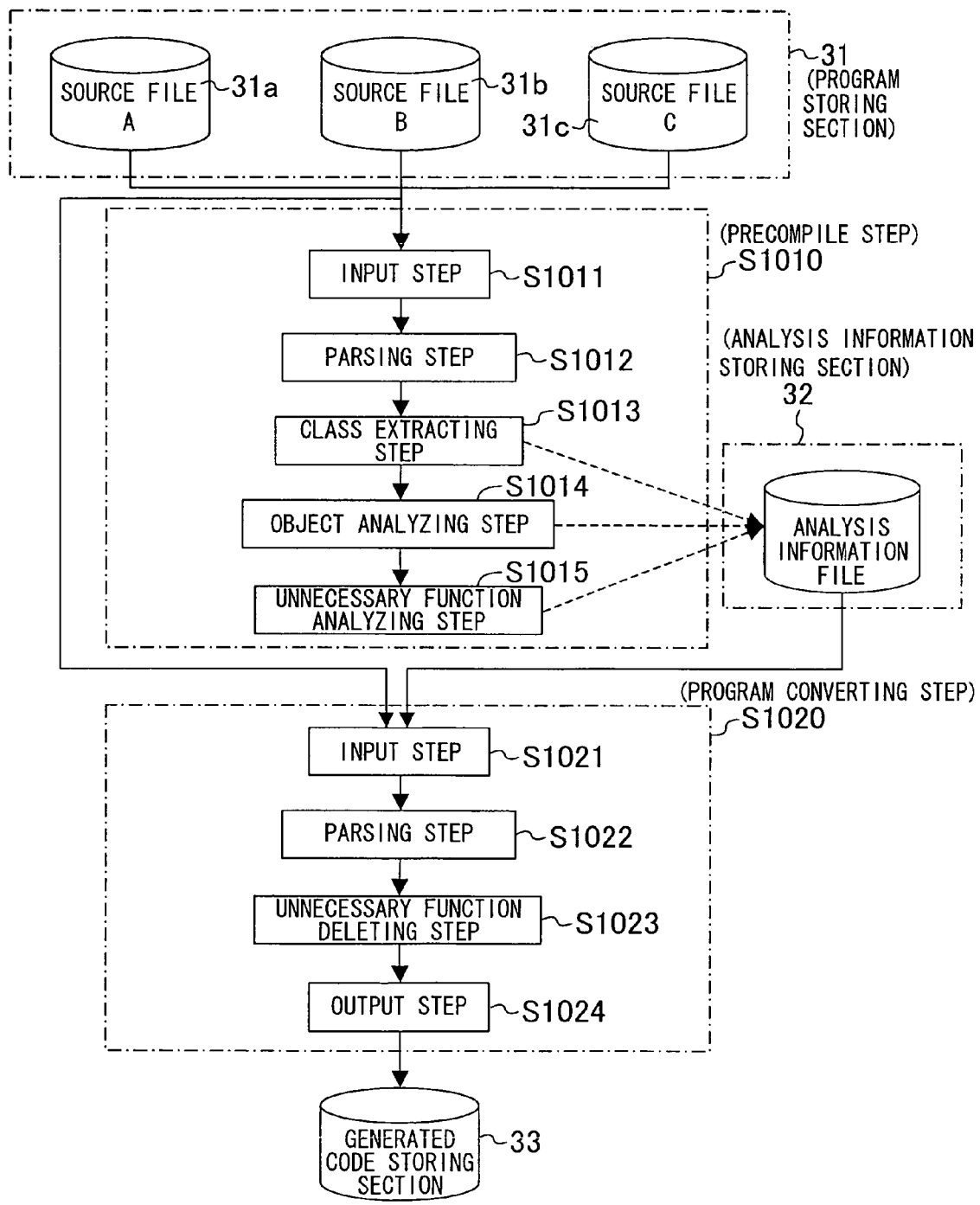
FIG. 47 is a flowchart showing structures of a precompile step S1010 and a program converting step S1020 and a storing section for holding information generated in steps S1010 and S1020 according to a tenth embodiment.

Hereinafter, a method for converting a program executed by a compiler (not shown) according to a tenth embodiment of the present invention will be described with reference to the drawings. In this program converting method, a program in which processing has been written is input to the compiler to make the compiler execute the processing. FIG. 47 is a flowchart showing structures of a precompile step S1010 and a program converting step S1020 and a storing section for holding information generated in steps S1010 and S1020 according to the tenth embodiment.

A program storing section 31 holds a program to be converted by dividing it into source files 31a, 31b and 31c.

The precompile step S1010 includes: an input step S1011 of inputting a program to be converted; a parsing step S1012 of parsing the program and generating a symbol table, a syntax tree and the like; a class extracting step S1013 of recording, in an analysis information storing section 32, information on classes included in the program; an object analyzing step S1014 of detecting classes whose objects are created out of the classes included in the program and of recording the result in the analysis information storing section 32; and an unnecessary function analyzing step S1015 of analyzing unnecessary functions based on a program converted through the foregoing steps and an analysis result stored in the analysis information storing section 32 and storing the result in the analysis information storing section 32.

The analysis information storing section 32 stores information analyzed at the class extracting step S1013, object analyzing step S1014 and the unnecessary function analyzing step S1015.

The program converting step S1020 includes: an input step S1021 of inputting analysis information stored in the analysis information storing section 32 and programs stored in the program storing section 31 one by one; a parsing step S1022 of generating a symbol table, a syntax tree and the like; an unnecessary function deleting step S1023 of acquiring information on unnecessary functions from analysis information input at the input step S1021 and deleting definitions of the unnecessary functions; and an output step S1024 of outputting, as an object program, a program converted through the foregoing steps to a generated code storing section 33.

The generated code storing section 33 holds the object program.

Now, operations at respective steps in the precompile step S1010 and the program converting step S1020 will be described in further detail. To show an example of a program, FIG. 3 used in the first embodiment is referred to again.

First, when the precompile step S1010 is initiated, the input step S1011 and the parsing step S1012 are performed. There steps are not principal features of the present invention, and thus detailed description thereof is omitted.

Next, in the class extracting step S1013, information on all the classes included in a program is extracted in the same manner as in the first embodiment (shown in FIG. 2A). As a result, class information shown in FIG. 4 as that in the first embodiment is obtained.

Then, in the object analyzing step S1014, classes whose objects are created are analyzed in the same manner as in the first embodiment (shown in FIG. 2B) and stored in the analysis information storing section 32. As a result, class information shown in FIG. 4B as in the first embodiment is obtained.

Thereafter, in the unnecessary function analyzing step S1015, unnecessary functions are analyzed based on analysis data stored in the analysis information storing section 32 in the same manner as in the first embodiment (shown in FIG. 2C) and the analysis result is stored in the analysis information storing section 32. As a result, a to-be-deleted function set S1 shown in FIG. 4C as in the first embodiment is obtained.

Then, when the program converting step S1020 is initiated, the input step S1021 and the parsing step S1022 are performed. There steps are not principal features of the present invention, and thus detailed description thereof is omitted.

Subsequently, in the unnecessary function deleting step S1023, unnecessary function definitions (e.g., function (A) shown in FIG. 3) is deleted from the to-be-deleted function set S1 in the same manner as in the first embodiment (shown in FIG. 2D).

According to this embodiment, in the precompile step, code size is also further reduced as compared to conventional techniques.

In this embodiment, the precompile step S1010 includes the class extracting step S1013, the object analyzing step S1014 and the unnecessary function analyzing step S1015. Alternatively, according to the present invention, instead of these steps, the precompile step S1010 may include the class analyzing step S201, the object analyzing step S104 and the unnecessary function analyzing step S202 described in the second embodiment. In such a case, the same effects as in the second embodiment are obtained.

Likewise, according to the present invention, the precompile step S1010 may include the class analyzing step S201, the virtual function analyzing step S301, the object analyzing step S104 and the unnecessary function analyzing step S302 described in the third embodiment. In such a case, the same effects as in the third embodiment are obtained.

Likewise, according to the present invention, the precompile step S1010 may include the class analyzing step S201, the virtual function analyzing step S301, the object analyzing step S104 and the unnecessary process/data analyzing step S401 described in the fourth embodiment and also include, instead of the unnecessary function deleting step S1023, the unnecessary process/data deleting step S402 described in the fourth embodiment. In such a case, the same effects as in the fourth embodiment are obtained.

Likewise, according to the present invention, the precompile step S1010 may include the class analyzing step S201, the object analyzing step S104, the unnecessary function analyzing step S202 and the deletion-designated function analyzing step S501 described in the fifth embodiment. In such a case, the same effects as in the fifth embodiment are obtained.

What is claimed is:

1. A program converting method, comprising a conversion step of converting an input program which is described in an object-oriented language and includes at least one class, wherein the conversion step includes:
an input step of inputting the input program;
an object analyzing step of analyzing the class in the input program to find out whether an object of the class is created or not, and of recording an analysis result in an object analysis information storing section;
an unnecessary process analyzing step of extracting an unnecessary process in accordance with the analysis result stored in the object analysis information storing section, and of recording an analysis result in an unnecessary process information storing section;
an unnecessary process deleting step of deleting the unnecessary process in accordance with the analysis result stored in the unnecessary process information storing section;
an output step of outputting an object program; and
a class analyzing step of analyzing an inheritance relationship of the class after the input step has been performed and before the unnecessary process analyzing step is performed,
wherein in the unnecessary process analyzing step, an analysis is performed to find out whether an object of a leaf class included in a class tree to which the class belongs is created or not, and if no object of the leaf class is created, a process on the leaf class is extracted as the unnecessary process, and
the leaf class is a class having no children in a class tree.

2. The method of claim 1, wherein if the class is found to be a no-object class whose object is not created in the object analyzing step, a function regarding the no-object class is extracted as the unnecessary process in the unnecessary process analyzing step.

3. The method of claim 1, wherein if the class is found to be a no-object class whose object is not created in the object analyzing step, a function of the no-object class is extracted as the unnecessary process in the unnecessary process analyzing step.

4. The method of claim 1, wherein the leaf class is a first leaf class, and in the unnecessary process analyzing step, if the class tree includes a second leaf class that becomes a leaf class by deleting the first leaf class and no object of the second leaf class is created, a process on the second leaf class is further extracted as the unnecessary process.

5. A processor-implemented program converting method, comprising a conversion step of automatically converting an input program which is described in an object-oriented language and includes at least one class,
wherein the conversion step includes:
an input step of inputting the input program;
an object analyzing step of analyzing the class in the input program to find out whether an object of the class is created or not, and of recording an analysis result in an object analysis information storing section;
an unnecessary process analyzing step of extracting an unnecessary process in accordance with the analysis result stored in the object analysis information storing section, and of recording an analysis result in an unnecessary process information storing section;
an unnecessary process deleting step of deleting the unnecessary process in accordance with the analysis result stored in the unnecessary process information storing section;
and an output step of outputting an object program,
wherein, after the input step has been performed and before the unnecessary process analyzing step is performed, the conversion step further includes:
a class analyzing step of analyzing an inheritance relationship of the class; and a virtual function analyzing step of analyzing a virtual function of the class, and the unnecessary process analyzing step includes the step of extracting a non-overriding-virtual-function-holding class that inherits characteristics of the class and has a virtual function not overriding the virtual function of the class, and the step of extracting the virtual function of the class as the unnecessary process if neither an object of the class nor an object of the non-overriding-virtual-function-holding class is created.

6. The method of claim 5, wherein the unnecessary process analyzing step further includes a specific unnecessary process analyzing step, and in the specific unnecessary process analyzing step, it is determined whether all the virtual functions of the class are unnecessary or not and, if all the virtual functions of the class are determined to be unnecessary, a process automatically created in a constructor is extracted as the unnecessary process.

7. The method of claim 5, wherein the unnecessary process analyzing step further includes a specific unnecessary data analyzing step, and in the specific unnecessary data analyzing step, it is determined whether all the virtual functions of the class are unnecessary or not and, if all the virtual functions of the class are determined to be unnecessary, data on the virtual functions of the class is extracted as the unnecessary process.

8. The method of claim 1, wherein the conversion step further includes a deletion-designated process analyzing step of analyzing a process designated as a process to be deleted by a to-be-deleted-process designation by a user, based on the to-be-deleted-process designation.

9. The method of claim 8, wherein the to-be-deleted process designation is a to-be-deleted-process designating description provided in the input program.

10. The method of claim 8, wherein the to-be-deleted-process designation is a command line option.

11. The method of claim 1, wherein the conversion step is repeated a plurality of times.

12. A processor-implemented program converting method for converting an input program which is described in an object-oriented language and includes at least one class, the method comprising: a translation step including an input step of inputting the input program,
   an object-related function extracting step of extracting a process regarding an object of the class,
   an object analyzing step of analyzing the class to find out whether an object of the class is created or not, and of recording an analysis result in an object analysis information storing section, and
   an output step of outputting the analysis result stored in the object analysis information storing section and a conversion result of the input program; and
   a concatenation step including
   an unnecessary process analyzing step of extracting an unnecessary process based on the output of the output step in the translation step, and
   a linking step of linking a link target in accordance with an analysis result of the unnecessary process analyzing step,
   wherein the translation step further includes a class analyzing step of analyzing an inheritance relationship of the class,
   an analysis result of the class analyzing step is also output in the output step, an analysis is performed to find out whether an object of a leaf class included in a class tree to which the class belongs is created or not, in the unnecessary process analyzing step,
   if no object of the leaf class is created, a process on the leaf class is extracted as the unnecessary process, and the leaf class is a class having no children in a class tree.

13. The method of claim 12, wherein in the object analyzing step, if the class is found to be a no-object class whose object is not created, a function of the no-object class is extracted as the unnecessary process in the unnecessary process analyzing step.

14. The method of claim 12, wherein the leaf class is a first leaf class, and
   in the unnecessary process analyzing step, if the class tree includes a second leaf class that becomes a leaf class by deleting the first leaf class and no object of the second leaf class is created, a process on the second leaf class is further extracted as the unnecessary process.

15. A processor-implemented program converting method for automatically converting an input program which is described in an object-oriented language and includes at least one class,
   the method comprising:
   a translation step including
   an input step of inputting the input program,
   an object-related function extracting step of extracting a process regarding an object of the class,
   an object analyzing step of analyzing the class to find out whether an object of the class is created or not, and of recording an analysis result in an object analysis information storing section, and
   an output step of outputting the analysis result stored in the object analysis information storing section and a conversion result of the input program; and
   a concatenation step including
   an unnecessary process analyzing step of extracting an unnecessary process based on the output of the output step in the translation step, and
   a linking step of linking a link target in accordance with an analysis result of the unnecessary process analyzing step,
   wherein the translation step further includes:
   a class analyzing step of analyzing an inheritance relationship of the class; and a virtual function analyzing step of analyzing a virtual function of the class,
   in the output step, analysis results of the class analyzing step and the virtual function analyzing step are also output, and
   the unnecessary process analyzing step includes the step of extracting a non-overriding-virtual-function-holding class that inherits characteristics of the class and has a virtual function not overriding a virtual function of the class, and the step of extracting the virtual function of the class as the unnecessary process if neither an object of the class nor an object of the non-overriding-virtual-function-holding class is created.

16. The method of claim 15, wherein the unnecessary process analyzing step further includes a specific unnecessary data analyzing step, and in the specific unnecessary data analyzing step, it is determined whether all the virtual functions of the class are unnecessary or not and, if all the virtual functions of the class are determined to be unnecessary, data on the virtual functions of the class is extracted as the unnecessary process.

17. A processor-implemented program converting method for converting an input program which is described in an object-oriented language and includes at least one class, the method comprising:
   a precompiled step including
   a first input step of inputting the input program, an object analyzing step of analyzing the class to find out whether an object of the class is created or not, and of recording an analysis result in an object analysis information storing section, and an unnecessary process analyzing step of extracting an unnecessary process in accordance with the analysis result stored in the object analysis information storing section; and a conversion step including a second input step of inputting the input program and an analysis result of the unnecessary process analyzing step, and an unnecessary process deleting step of deleing an unnecessary process in accordance with the analysis result of the unnecessary process analyzing step, wherein the precompiled step further includes a class analyzing step of analyzing an inheritance relationship of the class after the first input step has been performed and before the unnecessary process analyzing step is performed, in the unnecessary process analyzing step, an analysis is performed to find out whether an object of a leaf class included in a class tree to which the class belongs is created or not, and if no object of the leaf class is created, a process on the leaf class is extracted as the unnecessary process, and the leaf class is a class having no children in a class tree.

18. The method of claim 17, wherein if the class is found to be a no-object class whose object is not created in the object analyzing step, a function of the no-object class is extracted as the unnecessary process in the unnecessary process analyzing step.

19. The method of claim 17, wherein the leaf class is a first leaf class, and in the unnecessary process analyzing step, if the class tree includes a second leaf class that becomes a leaf class by deleting the first leaf class and no object of the second leaf class is created, a process on the second leaf class is further extracted as the unnecessary process.

20. A processor-implemented program converting method for automatically converting an input program which is described in an object-oriented language and includes at least one class, the method comprising:

a precompile step including a first input step of inputting the input program, an object analyzing step of analyzing the class to find out whether an object of the class is created or not, and of recording an analysis result in an object analysis information storing section, and an unnecessary process analyzing step of extracting an unnecessary process in accordance with the analysis result stored in the object analysis information storing section; and a conversion step including a second input step of inputting the input program and an analysis result of the unnecessary process analyzing step, and an unnecessary process deleting step of deleing an unnecessary process in accordance with the analysis result of the unnecessary process analyzing step, wherein the precompile step further includes:

a class analyzing step of analyzing an inheritance relationship of the class after the first input step has been performed and before the unnecessary process analyzing step is performed; and a virtual function analyzing step of analyzing a virtual function of the class, and the unnecessary process analyzing step includes the step of extracting a non- overriding-virtual-function-holding class that inherits characteristics of the class and has a virtual function not overriding the virtual function of the class, and the step of extracting the virtual function of the class as the unnecessary process if neither an object of the class nor an object of the non-overriding-virtual-function-holding class is created.

21. The method of claim 20, wherein the unnecessary process analyzing step further includes a specific unnecessary process analyzing step, and in the specific unnecessary process analyzing step, it is determined whether all the virtual functions of the class are unnecessary or not and, if all the virtual functions of the class are determined to be unnecessary, a process automatically created in a constructor is extracted as the unnecessary process.

22. The method of claim 20, wherein the unnecessary process analyzing step further includes a specific unnecessary data analyzing step, and in the specific unnecessary data analyzing step, it is determined whether all the virtual functions of the class are unnecessary or not and, if all the virtual functions of the class are determined to be unnecessary, data on the virtual functions of the class is extracted as the unnecessary process.

* * * * *